(12) United States Patent
Nigo et al.

(10) Patent No.: US 10,965,237 B2
(45) Date of Patent: Mar. 30, 2021

(54) DRIVING DEVICE, AIR CONDITIONER, AND DRIVING METHOD

(71) Applicant: Mitsubishi Electric Corporation, Tokyo (JP)

(72) Inventors: Masahiro Nigo, Tokyo (JP); Yuji Hirosawa, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 0 days.

(21) Appl. No.: 16/614,508

(22) PCT Filed: Jul. 25, 2017

(86) PCT No.: PCT/JP2017/026881
§ 371 (c)(1),
(2) Date: Nov. 18, 2019

(87) PCT Pub. No.: WO2019/021374
PCT Pub. Date: Jan. 31, 2019

(65) Prior Publication Data
US 2020/0186073 A1 Jun. 11, 2020

(51) Int. Cl.
*H02P 25/18* (2006.01)
*F25B 1/00* (2006.01)
*H02P 27/08* (2006.01)

(52) U.S. Cl.
CPC .............. *H02P 25/184* (2013.01); *F25B 1/00* (2013.01); *H02P 27/08* (2013.01)

(58) Field of Classification Search
CPC ........ H02P 25/184; H02P 25/18; H02P 27/06; H02P 27/08; H02P 1/00; H02P 1/04;
(Continued)

(56) References Cited

U.S. PATENT DOCUMENTS 4,084,406 A * 4/1978 Brenneman ......... F04D 27/0284
62/211
4,823,067 A * 4/1989 Weber ................... H02J 3/1892
318/775

(Continued)

FOREIGN PATENT DOCUMENTS

JP 2006-246674 A 9/2006
JP 2009-216324 A 9/2009

(Continued)

Primary Examiner — Antony M Paul
(74) Attorney, Agent, or Firm — Posz Law Group, PLC

(57) ABSTRACT

A driving device includes a connection switching unit to switch a connection state of coils between a first connection state and a second connection state in which a line voltage is lower than in the first connection state, a controller to control a motor and the connection switching unit, and a rotation speed detector to detect a rotation speed of the motor. When the connection state of the coils is the first connection state and the rotation speed detected by the rotation speed detector becomes higher than or equal to a first rotation speed, the controller causes the motor to rotate at a second rotation speed higher than the first rotation speed, and then causes the connection switching unit to switch the connection state of the coils from the first connection state to the second connection state.

17 Claims, 31 Drawing Sheets

(58) Field of Classification Search
CPC .... H02P 1/12; H02P 1/16; H02P 1/163; H02P 1/18; H02P 1/24; H02P 1/26; H02P 1/28; H02P 1/42; H02P 1/46; H02P 1/465; H02P 3/00; H02P 3/14; H02P 6/00; H02P 7/00; H02P 8/00; H02P 9/00; H02P 11/00; H02P 13/00; H02P 23/00; H02P 27/00; H02P 27/04; F25B 1/00; H02M 5/00; H02M 7/00
USPC .......... 318/400.01, 700, 701, 727, 799, 800, 318/801, 430, 599, 811
See application file for complete search history.

(56) References Cited

U.S. PATENT DOCUMENTS

| | | | | |
|---|---|---|---|---|
| 5,013,990 | A | * | 5/1991 | Weber .................... H02P 23/26 318/812 |
| 8,183,814 | B2 | * | 5/2012 | Fuchs ................. H02P 21/0089 318/524 |
| 2019/0245470 | A1 | | 8/2019 | Nigo |
| 2019/0245471 | A1 | | 8/2019 | Nigo |
| 2020/0021222 | A1 | | 1/2020 | Nigo |

FOREIGN PATENT DOCUMENTS

| | | |
|---|---|---|
| JP | 2016-85005 A | 5/2016 |
| WO | 2018/078835 A1 | 5/2018 |
| WO | 2018/078840 A1 | 5/2018 |
| WO | 2018/078845 A1 | 5/2018 |

* cited by examiner

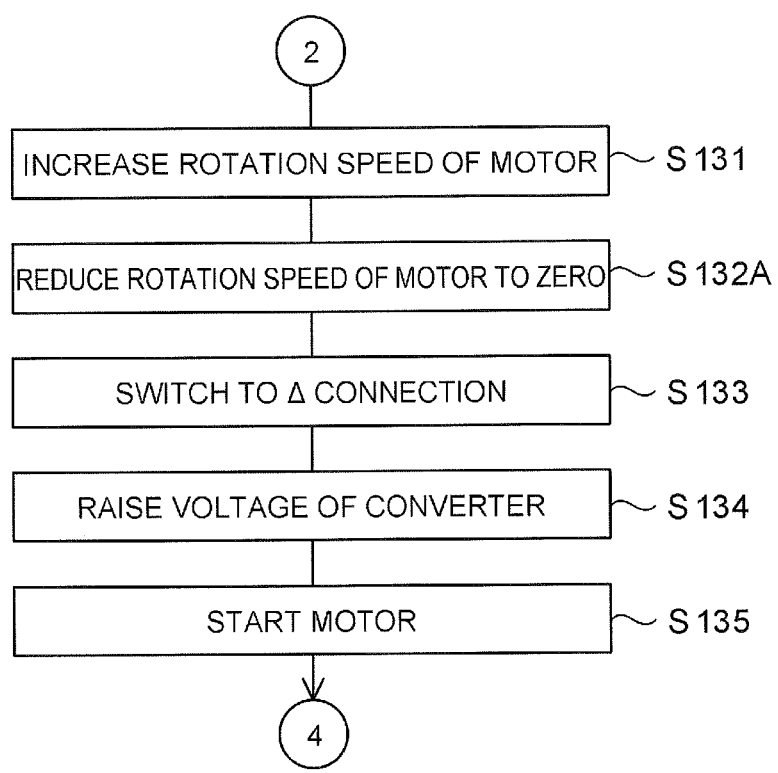

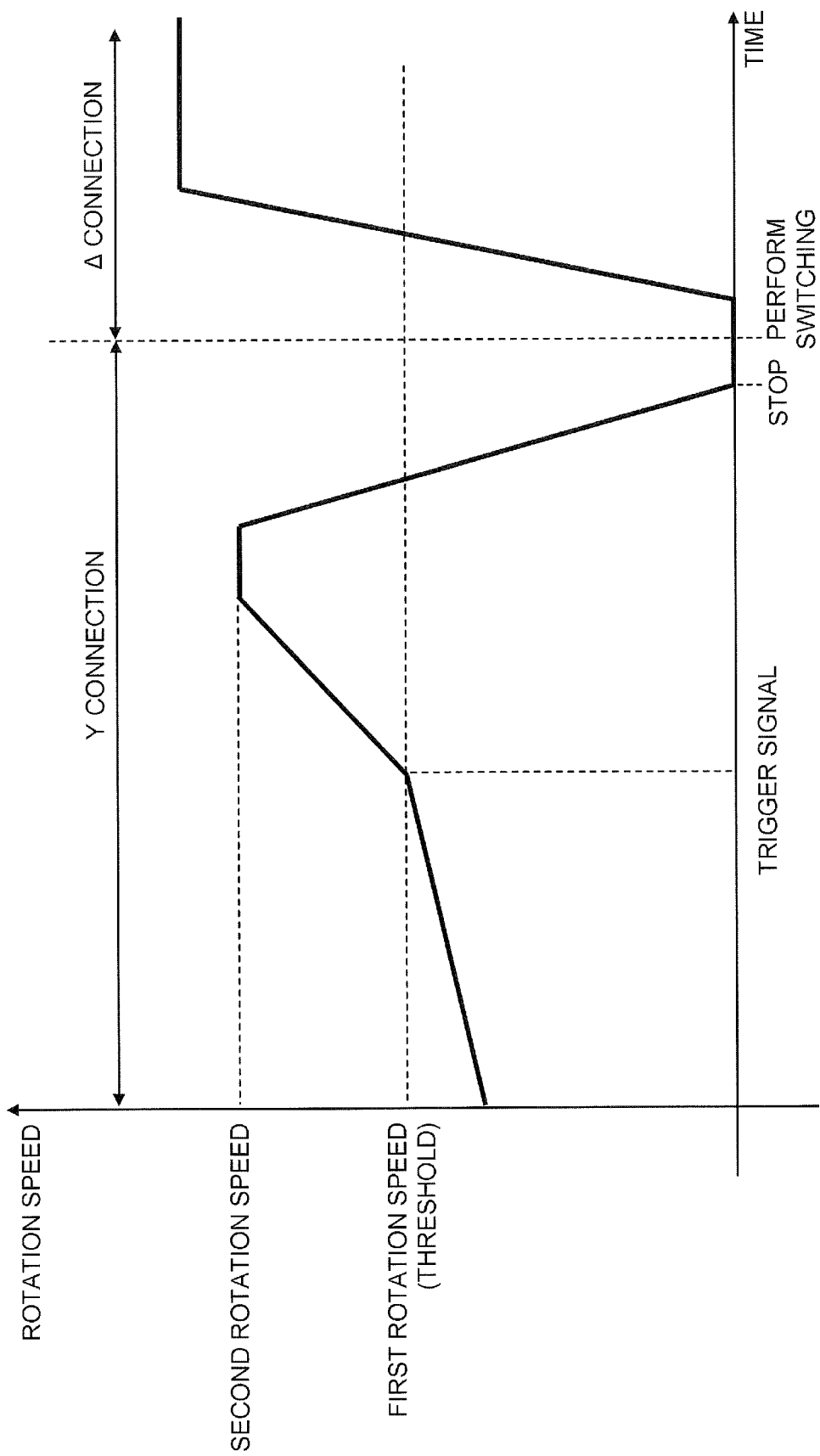

DRIVING DEVICE, AIR CONDITIONER, AND DRIVING METHOD

CROSS REFERENCE TO RELATED APPLICATION

This application is a U.S. national stage application of International Patent Application No. PCT/JP2017/026881 filed on Jul. 25, 2017, the disclosure of which is incorporated herein by reference.

TECHNICAL FIELD

The present invention relates to a driving device for driving a motor, an air conditioner including the motor, and a driving method for driving the motor.

BACKGROUND

In an air conditioner, a connection state of coils of a motor for driving a compressor is switched between a Y connection (also referred to as a star connection) and a delta connection (also referred to as a Δ connection) in order to enhance an operation efficiency during low-speed rotation and high-speed rotation of the motor (see, for example, Patent Reference 1).

Switching of the connection state of the coils is performed in a state where rotation of the motor is stopped, taking into consideration reliability or the like of a device (see, for example, Patent Reference 2).

PATENT REFERENCE

Patent Reference 1: Japanese Patent Application Publication No. 2016-85005
Patent Reference 2: Japanese Patent Application Publication No. 2009-216324

However, since rotation of the motor is stopped when the connection state of the coils is switched, operation of the air conditioner is temporarily stopped and comfort for a user decreases. In particular, switching from the Y connection to the delta connection is performed in a situation in which an air-conditioning load increases, and thus the stopping of the air conditioner results in a large decrease in comfort.

SUMMARY

The present invention is made to solve the problem described above, and an object of the present invention is to suppress decrease in comfort when a connection state of coils of a motor is switched.

A driving device according to the present invention is a driving device to drive a motor having coils, and the driving device includes a connection switching unit to switch a connection state of the coils between a first connection state and a second connection state in which a line voltage is lower than in the first connection state, a controller to control the motor and the connection switching unit, and a rotation speed detector to detect a rotation speed of the motor. When the connection state of the coils is the first connection state and the rotation speed detected by the rotation speed detector becomes higher than or equal to a first rotation speed, the controller causes the motor to rotate at a second rotation speed higher than the first rotation speed, and then causes the connection switching unit to switch the connection state of the coils from the first connection state to the second connection state.

Further, a driving device according to the present invention is a driving device to drive a motor having coils, and the driving device includes a connection switching unit to switch a connection state of the coils between a first connection state and a second connection state in which a line voltage is lower than in the first connection state, a controller to control the motor and the connection switching unit, and an operation frequency acquiring unit to acquire an operation frequency of the motor. When the connection state of the coils is the first connection state and the operation frequency acquired by the operation frequency acquiring unit becomes higher than or equal to a first operation frequency, the controller causes the motor to rotate at a second rotation speed higher than a first rotation speed corresponding to the first operation frequency, and then causes the connection switching unit to switch the connection state of the coils from the first connection state to the second connection state.

Further, a driving device according to the present invention is a driving device to drive a motor having coils, and the driving device includes a connection switching unit to switch a connection state of the coils between a first connection state and a second connection state in which a line voltage is lower than in the first connection state, a controller to control the motor and the connection switching unit, and a temperature sensor to detect an indoor temperature. When the connection state of the coils is the first connection state and a temperature difference between the indoor temperature detected by the temperature sensor and a set temperature becomes larger than or equal to a set temperature difference, the controller causes the motor to rotate at a second rotation speed higher than a first rotation speed at a time when the temperature difference becomes larger than or equal to the set temperature difference, and then causes the connection switching unit to switch the connection state of the coils from the first connection state to the second connection state.

Further, a driving device according to the present invention is a driving device to drive a motor having coils, and the driving device includes a connection switching unit to switch a connection state of the coils between a first connection state and a second connection state in which a line voltage is lower than in the first connection state, and a controller to control the motor and the connection switching unit. When the connection state of the coils is the first connection state and a motor efficiency in the first connection state becomes lower than a motor efficiency in the second connection state, the controller causes the motor to rotate at a second rotation speed higher than a first rotation speed at a time when the motor efficiency in the first connection state becomes lower than the motor efficiency in the second connection state, and then causes the connection switching unit to switch the connection state of the coils from the first connection state to the second connection state.

Further, a driving device according to the present invention is a driving device to drive a motor having coils, and the driving device includes an inverter to output a voltage to the coils to thereby control rotation of the motor, a connection switching unit to switch a connection state of the coils between a first connection state and a second connection state in which a line voltage is lower than in the first connection state, and a controller to control the inverter and the connection switching unit. When the connection state of the coils is the first connection state and an output voltage of the inverter becomes higher than or equal to a set voltage, the controller causes the inverter to rotate the motor at a second rotation speed higher than a first rotation speed at a time when the output voltage of the inverter becomes higher than or equal to the set voltage, and then causes the connection switching unit to switch the connection state of the coils from the first connection state to the second connection state.

Further, a driving device according to the present invention is a driving device to drive a motor having coils, and the driving device includes an inverter to output a voltage to the coils to control rotation of the motor, the inverter performing field-weakening control in accordance with a rotation speed of the motor, a connection switching unit to switch a connection state of the coils between a first connection state and a second connection state in which a line voltage is lower than in the first connection state, and a controller to control the inverter and the connection switching unit. When the connection state of the coils is the first connection state and the inverter starts the field-weakening control, the controller causes the inverter to rotate the motor at a second rotation speed higher than a first rotation speed at a time when the field-weakening control is started, and then causes the connection switching unit to switch the connection state of the coils from the first connection state to the second connection state.

Further, a driving device according to the present invention is a driving device to drive a motor having coils, and the driving device includes a connection switching unit to switch a connection state of the coils between a first connection state and a second connection state in which a line voltage is lower than in the first connection state, and a controller to control the motor and the connection switching unit. When the connection state of the coils is the first connection state and the controller receives a signal as a trigger to switch the connection state of the coils to the second connection state, the controller causes the motor to rotate at a second rotation speed higher than a first rotation speed at a time when the signal is received, and then causes the connection switching unit to switch the connection state of the coils from the first connection state to the second connection state.

According to the present invention, the rotation speed of the motor is increased before the connection state of the coils is switched from the first connection state to the second connection state. In a case where the motor is used in an air conditioner, a capacity of the air conditioner is enhanced by the increase in the rotation speed of the motor. Accordingly, when the connection state is thereafter switched while reducing the rotation speed of the motor (or stopping rotation of the motor), decrease in comfort can be suppressed.

BRIEF DESCRIPTION OF THE DRAWINGS

FIG. 35 is a flowchart showing a switching operation from the Y connection to the delta connection in the third embodiment.

FIG. 36 is a graph showing changes in rotation speed of the motor in the third embodiment.

FIRST EMBODIMENT (Motor Configuration)

Figure 1:
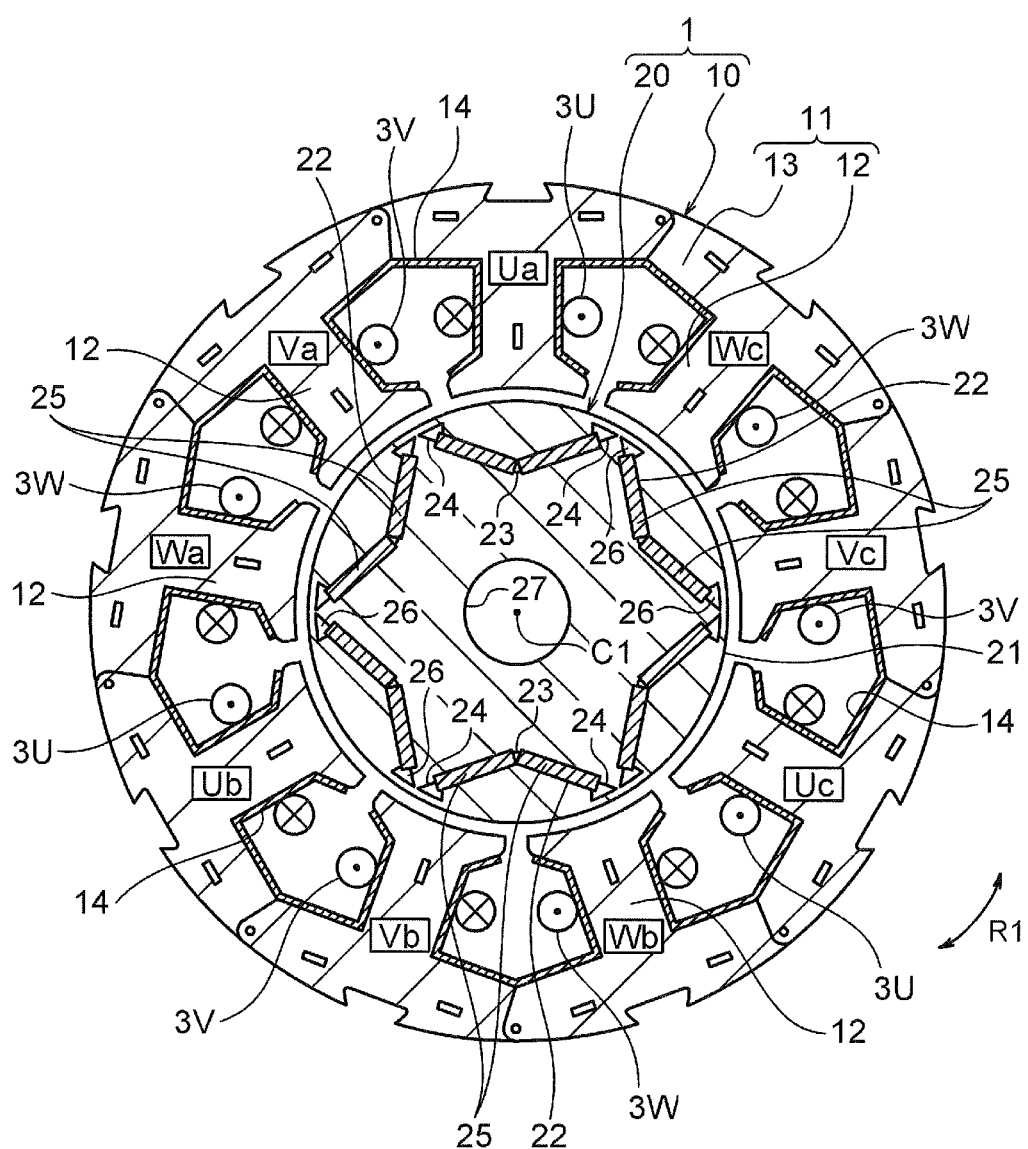
FIG. 1 is a sectional view illustrating a configuration of a motor according to a first embodiment.

A first embodiment of the present invention will be described. FIG. 1 is a sectional view illustrating a configuration of a motor 1 according to the first embodiment of the present invention. The motor 1 is a permanent magnet-embedded motor, and is used for, for example, a rotary compressor. The motor 1 includes a stator 10 and a rotor 20 rotatably disposed on an inner side of the stator 10. An air gap of, for example, 0.3 to 1 mm is formed between the stator 10 and the rotor 20. FIG. 1 is a sectional view in a plane perpendicular to a rotation axis of the rotor 20.

Hereinafter, the rotation axis of the rotor 20 will be referred to as an "axis C1." A direction of the axis C1 (i.e., a direction of the rotation axis of the rotor 20) will be referred to as an "axial direction." A circumferential direction about the axis C1 (indicated by an arrow R1 in FIG. 1) will be referred to as a "circumferential direction." A radial direction about the axis C1 will be referred to as a radial direction.

The stator 10 includes a stator core 11 and coils 3 wound around the stator core 11. The stator core 11 is obtained by stacking a plurality of electromagnetic steel sheets each having a thickness of 0.1 to 0.7 mm (0.35 mm in this example) in the axial direction and fastening the sheets by crimping.

The stator core 11 has an annular yoke 13 and a plurality of teeth 12 projecting inward in the radial direction from the yoke 13. The number of teeth 12 is nine in this example, but is not limited to nine. Slots are formed each between adjacent two of the teeth 12. The number of slots is equal to the number of teeth 12. Each of the teeth 12 has a tooth tip portion at an inner end in the radial direction, and the tooth tip portion has a wider width (dimension in the circumferential direction).

The coil 3 as a stator winding is wound around each of the teeth 12 via an insulator 14. The coil 3 is obtained by, for example, winding a magnet wire having a wire diameter (diameter) of 0.8 mm around each tooth 12 by concentrated winding in 110 turns. The number of turns and the wire diameter of the coil 3 are determined depending on characteristics (rotation speed, torque or the like) required for the motor 1, a supply voltage, or a cross-sectional area of the slot.

The coils 3 are constituted by three-phase windings of a U-phase, a V-phase, and a W-phase (hereinafter referred to as coils 3U, 3V, and 3W). Both terminals of the coil 3 in each phase are open. That is, the coils 3 have six terminals in total. The connection state of the coils 3 is switchable between a Y connection and a delta connection, which will be described later. The insulator 14 is made of, for example, a film of polyethylene terephthalate (PET), and has a thickness of 0.1 mm to 0.2 mm.

The stator core 11 has a configuration in which a plurality of blocks (referred to as split cores) are coupled to each other via thin portions. Each of the split cores has one tooth. The number of split cores is nine in this example, but is not limited to nine. The magnet wire is wound around each tooth 12 in a state where the stator core 11 is extended in a belt shape, and then the stator core 11 is bent into a ring shape and both ends of the stator core are welded.

As described above, the insulator 14 is made of a thin film and the stator core 11 has a divided structure for facilitating winding. This configuration is effective for increasing the number of turns of the coil 3 in the slot. The stator core 11 is not limited to the configuration in which the plurality of split cores are coupled to each other.

The rotor 20 includes a rotor core 21 and permanent magnets 25 attached to the rotor core 21. The rotor core 21 is obtained by stacking a plurality of electromagnetic steel sheets each having a thickness of 0.1 mm to 0.7 mm (0.35 mm in this example) in the direction of the rotation axis and fastening the sheets by crimping.

The rotor core 21 has a cylindrical shape, and a shaft hole 27 (center hole) is formed at a center of the rotor core 21. A shaft serving as the rotation axis of the rotor 20 (for example, a shaft 90 of a rotary compressor 8 illustrated in FIG. 2) is fixed to the shaft hole 27 by shrinkage fitting, press fitting, or the like.

A plurality of (six in this example) magnet insertion holes 22 in which the permanent magnets 25 are inserted are formed along an outer peripheral surface of the rotor core 21. The magnet insertion holes 22 are openings, and each magnet insertion hole 22 corresponds to one magnetic pole. Since the six magnet insertion holes 22 are provided in this example, the rotor 20 has six poles in total. The number of the magnet insertion holes 22 (i.e., the number of poles) is not limited to six.

Each magnet insertion hole 22 has a V shape such that a center portion in the circumferential direction projects inward in the radial direction in this example. The shape of the magnet insertion hole 22 is not limited to the V shape, and may be a straight shape, for example.

Two permanent magnets 25 are disposed in each magnet insertion hole 22. That is, two permanent magnets 25 are disposed for one magnetic pole. In this example, the rotor 20 has six poles as described above, and thus twelve permanent magnets 25 are disposed in total.

Each permanent magnet 25 is a flat-plate member elongated in the axial direction of the rotor core 21, has a width in the circumferential direction of the rotor core 21 and a thickness in the radial direction of the rotor core 21. The permanent magnet 25 is constituted by, for example, a rare earth magnet containing neodymium (Nd), iron (Fe), and boron (B) as main components.

Each permanent magnet 25 is magnetized in the thickness direction. Two permanent magnets 25 disposed in one magnet insertion hole 22 are magnetized in such a manner that the same magnetic poles face the same side in the radial direction.

Flux barriers 26 are formed at both ends of the magnet insertion hole 22 in the circumferential direction. The flux barriers 26 are openings formed continuously with the magnet insertion hole 22. The flux barriers 26 are provided for suppressing magnetic flux leakage between adjacent magnetic poles (i.e., magnetic fluxes flowing through inter-pole parts).

In the rotor core 21, a first magnet retention portion 23 that is a projection is formed at a center of each magnet insertion hole 22 in the circumferential direction. In the rotor core 21, second magnet retention portions 24 that are projections are formed at both ends of the magnet insertion hole 22 in the circumferential direction. The first magnet retention portion 23 and the second magnet retention portions 24 are configured to position and retain the permanent magnets 25 in the magnet insertion hole 22.

As described above, the number of slots of the stator 10 (i.e., the number of teeth 12) is nine, and the number of poles of the rotor 20 is six. That is, in the motor 1, a ratio of the number of poles of the rotor 20 to the number of slots of the stator 10 is 2:3.

In the motor 1, the connection state of the coils 3 is switched between a Y connection and a delta connection. When the delta connection is used, a cyclic current may flow and may degrade performance of the motor 1. The cyclic current is caused by a third harmonic wave generated in an induced voltage in the winding of each phase. It is known that in the case of the concentrated winding where the ratio of the number of poles to the number of slots is 2:3, no third harmonic wave is generated in the induced voltage on the assumption that there is no influence of magnetic saturation or the like, and thus no performance degradation is caused by the cyclic current.

(Configuration of Rotary Compressor)

Figure 2:
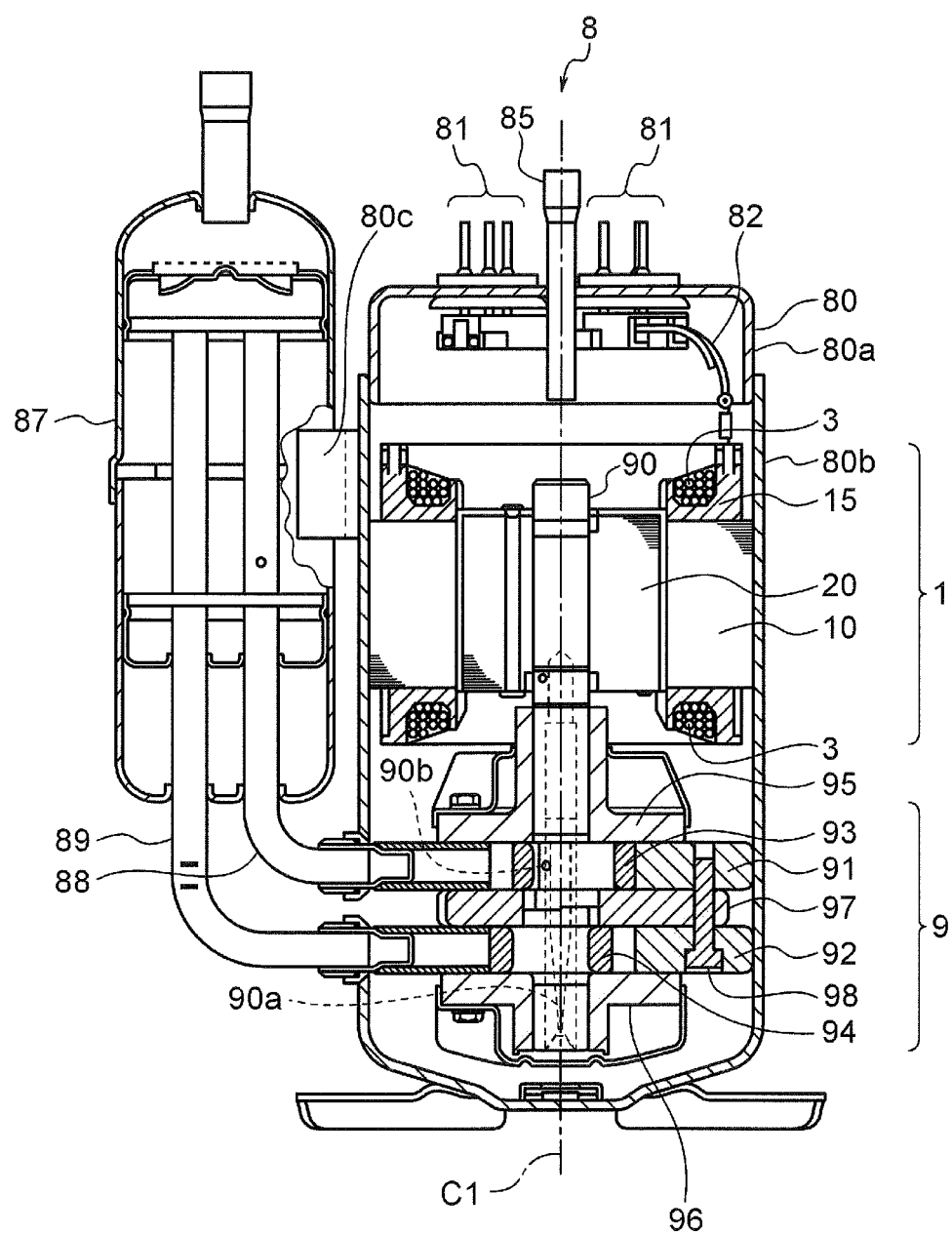
FIG. 2 is a sectional view illustrating a configuration of a rotary compressor according to the first embodiment.

Next, the rotary compressor 8 using the motor 1 will be described. FIG. 2 is a sectional view illustrating a configuration of the rotary compressor 8. The rotary compressor 8 includes a shell 80, a compression mechanism 9 disposed in the shell 80, and the motor 1 for driving the compression mechanism 9. The rotary compressor 8 further includes a shaft 90 (crank shaft) coupling the motor 1 and the compression mechanism 9 to each other so that a driving force can be transferred. The shaft 90 is fitted in the shaft hole 27 (FIG. 1) of the rotor 20 of the motor 1.

The shell 80 is a closed container made of, for example, a steel sheet, and covers the motor 1 and the compression mechanism 9. The shell 80 includes an upper shell 80*a* and a lower shell 80*b*. The upper shell 80*a* is provided with glass terminals 81 serving as a terminal portion for supplying electric power from the outside of the rotary compressor 8 to the motor 1, and a discharge pipe 85 for discharging refrigerant compressed in the rotary compressor 8 to the outside. In this example, total six lead wires are drawn out from the glass terminals 81, and the six lead wires include two wires for each of the U-phase, the V-phase, and the W-phase of the coils 3 of the motor 1 (FIG. 1). The lower shell 80*b* houses the motor 1 and the compression mechanism 9.

The compression mechanism 9 has an annular first cylinder 91 and an annular second cylinder 92 along the shaft 90. The first cylinder 91 and the second cylinder 92 are fixed to an inner peripheral portion of the shell 80 (the lower shell 80*b*). An annular first piston 93 is disposed on an inner peripheral side of the first cylinder 91, and an annular second piston 94 is disposed on an inner peripheral side of the second cylinder 92. The first piston 93 and the second piston 94 are rotary pistons that rotate together with the shaft 90.

A partition plate 97 is provided between the first cylinder 91 and the second cylinder 92. The partition plate 97 is a disk-shaped member having a through hole at a center thereof. Vanes (not shown) are provided in cylinder chambers of the first cylinder 91 and the second cylinder 92 to divide each cylinder chamber into a suction side and a compression side. The first cylinder 91, the second cylinder 92, and the partition plate 97 are integrally fixed using bolts 98.

An upper frame 95 is disposed above the first cylinder 91 so as to close an upper side of the cylinder chamber of the first cylinder 91. A lower frame 96 is disposed below the second cylinder 92 so as to close a lower side of the cylinder chamber of the second cylinder 92. The upper frame 95 and the lower frame 96 rotatably support the shaft 90.

Refrigerating machine oil (not shown) for lubricating sliding portions of the compression mechanism 9 is stored at a bottom of the lower shell 80*b* of the shell 80. The refrigerating machine oil flows upward in a hole 90*a* formed in the axial direction in the shaft 90 and is supplied to the sliding portions via oil supply holes 90*b* formed at a plurality of positions of the shaft 90.

The stator 10 of the motor 1 is attached to an inner side of the shell 80 by shrinkage fitting. Electric power is supplied to the coils 3 of the stator 10 via the glass terminals 81 attached to the upper shell 80*a*. The shaft 90 is fixed to the shaft hole 27 (FIG. 1) of the rotor 20.

An accumulator 87 for storing refrigerant gas is attached to the shell 80. The accumulator 87 is held by, for example, a holding portion 80*c* provided on an outer side of the lower shell 80*b*. A pair of suction pipes 88 and 89 are attached to the shell 80, and refrigerant gas is supplied from the accumulator 87 to the cylinders 91 and 92 through the suction pipes 88 and 89.

As the refrigerant, R410A, R407C, or R22, for example, may be used. From the viewpoint of prevention of global warming, it is preferable to use low global warming potential (GWP) refrigerant. As the low-GWP refrigerant, for example, the following refrigerants can be used.

(1) First, a halogenated hydrocarbon having a double bond of carbon in its composition, such as hydro-fluoro-orefin (HFO)-1234yf (CF3CF=CH2) can be used. The GWP of HFO-1234yf is 4.

(2) Further, a hydrocarbon having a double bond of carbon in its composition, such as R1270 (propylene), may be used. The GWP of R1270 is 3, which is lower than that of HFO-1234yf, but flammability of R1270 is higher than that of HFO-1234yf.

(3) Further, a mixture containing at least one of a halogenated hydrocarbon having a double bond of carbon in its composition or a hydrocarbon having a double bond of carbon in its composition, such as a mixture of HFO-1234yf and R32, may be used. Since the above described HFO-1234yf is a low-pressure refrigerant and tends to cause an increase in pressure loss, its use may cause degradation of performance of a refrigeration cycle (especially, an evaporator). Thus, it is practically preferable to use a mixture with R32 or R41, which is a higher pressure refrigerant than HFO-1234yf.

A basic operation of the rotary compressor 8 is as follows. Refrigerant gas supplied from the accumulator 87 is supplied to the cylinder chambers of the first cylinder 91 and the second cylinder 92 through the suction pipes 88 and 89. When the motor 1 is driven and the rotor 20 rotates, the shaft 90 rotates together with the rotor 20. Then, the first piston 93 and the second piston 94 fitted to the shaft 90 rotate eccentrically in the cylinder chambers and compress the refrigerant in the cylinder chambers. The compressed refrigerant flows upward in the shell 80 through holes (not shown) provided in the rotor 20 of the motor 1 and is discharged to the outside from the discharge pipe 85.

The compressor for which the motor 1 is used is not limited to the rotary compressor, but may be a scroll compressor, for example.

(Configuration of Air Conditioner)

Figure 3:
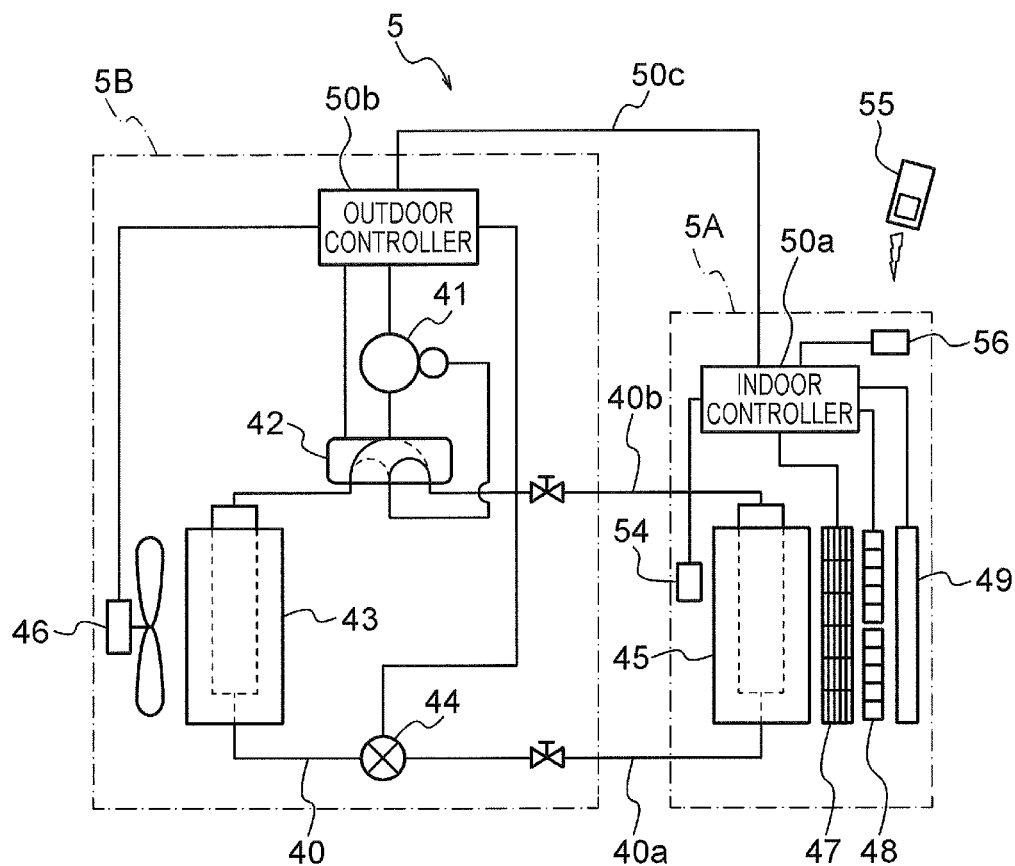
FIG. 3 is a block diagram illustrating a configuration of an air conditioner according to the first embodiment.

Next, the air conditioner 5 including the driving device according to the first embodiment will be described. FIG. 3 is a block diagram illustrating a configuration of the air conditioner 5. The air conditioner 5 includes an indoor unit 5A placed in a room (air conditioning target space) and an outdoor unit 5B placed outdoors. The indoor unit 5A and the outdoor unit 5B are connected by connecting pipes 40a and 40b through which refrigerant flows. Liquid refrigerant passing through a condenser flows through the connection pipe 40a. Gas refrigerant passing through an evaporator flows through the connection pipe 40b.

The outdoor unit 5B includes a compressor 41 that compresses and discharges refrigerant, a four-way valve (refrigerant channel switching valve) 42 that switches a flow direction of the refrigerant, an outdoor heat exchanger 43 that exchanges heat between outside air and the refrigerant, and an expansion valve (decompression device) 44 that depressurizes high-pressure refrigerant to a low pressure. The compressor 41 is constituted by the rotary compressor 8 (FIG. 2) described above. The indoor unit 5A includes an indoor heat exchanger 45 that performs heat exchange between indoor air and the refrigerant.

The compressor 41, the four-way valve 42, the outdoor heat exchanger 43, the expansion valve 44, and the indoor heat exchanger 45 are connected by a pipe 40 including the above described connection pipes 40a and 40b to constitute a refrigerant circuit. These components constitute a compression type refrigeration cycle (compression type heat pump cycle) in which refrigerant is circulated by the compressor 41.

In order to control an operation of the air conditioner 5, an indoor controller 50a is disposed in the indoor unit 5A, and an outdoor controller 50b is disposed in the outdoor unit 5B. Each of the indoor controller 50a and the outdoor controller 50b has a control board on which various circuits for controlling the air conditioner 5 are formed. The indoor controller 50a and the outdoor controller 50b are connected to each other by a communication cable 50c. The communication cable 50c is bundled together with the connecting pipes 40a and 40b described above.

In the outdoor unit 5B, an outdoor fan 46 that is a fan is disposed so as to face the outdoor heat exchanger 43. The outdoor fan 46 rotates to generate an air flow passing through the outdoor heat exchanger 43. The outdoor fan 46 is constituted by, for example, a propeller fan.

The four-way valve 42 is controlled by the outdoor controller 50b and switches the direction of flow of refrigerant. When the four-way valve 42 is in the position indicated by the solid line in FIG. 3, gas refrigerant discharged from the compressor 41 is sent to the outdoor heat exchanger 43 (condenser). When the four-way valve 42 is in the position indicated by the broken line in FIG. 3, gas refrigerant flowing from the outdoor heat exchanger 43 (evaporator) is sent to the compressor 41. The expansion valve 44 is controlled by the outdoor controller 50b, and changes its opening degree to reduce the pressure of high-pressure refrigerant to a low pressure.

In the indoor unit 5A, an indoor fan 47 that is a fan is disposed so as to face the indoor heat exchanger 45. The indoor fan 47 rotates to generate an air flow passing through the indoor heat exchanger 45. The indoor fan 47 is constituted by, for example, a crossflow fan.

In the indoor unit 5A, an indoor temperature sensor 54 as a temperature sensor is provided. The indoor temperature sensor 54 measures an indoor temperature Ta, which is an air temperature in the room (air conditioning target space), and sends information (information signal) on the measured temperature to the indoor controller 50a. The indoor temperature sensor 54 may be constituted by a temperature sensor used in a general air conditioner. It is also possible to use a radiant temperature sensor detecting a surface temperature of a wall, a floor or the like in a room.

In the indoor unit 5A, a signal receiver 56 is also provided. The signal receiver 56 receives an instruction signal (operation instruction signal) transmitted from a remote controller 55 (remote operation device) serving as an operation unit operated by a user. The remote controller 55 is used by the user to give an instruction of an operation input (start and stop of operation) or operation content (set temperature, wind speed, or the like) to the air conditioner 5.

The compressor 41 is configured to be capable of changing an operating rotation speed in a range from 20 rps to 130 rps during a normal operation. As the rotation speed of the compressor 41 increases, a circulation amount of refrigerant in the refrigerant circuit increases. The rotation speed of the compressor 41 is controlled by the controller 50 (more specifically, the outdoor controller 50b) in accordance with a temperature difference ΔT between the current indoor temperature Ta obtained by the indoor temperature sensor 54 and a set temperature Ts set by the user with the remote controller 55. As the temperature difference ΔT increases, the compressor 41 rotates at a higher rotation speed to increase the circulation amount of refrigerant.

Rotation of the indoor fan 47 is controlled by the indoor controller 50a. The rotation speed of the indoor fan 47 can be switched to a plurality of stages. In this example, the rotation speed can be switched to, for example, three stages including strong wind, middle wind, and soft wind. When the wind speed setting is set to an automatic mode with the remote controller 55, the rotation speed of the indoor fan 47 is switched in accordance with the temperature difference ΔT between the measured indoor temperature Ta and the set temperature Ts.

Rotation of the outdoor fan 46 is controlled by the outdoor controller 50b. The rotation speed of the outdoor fan 46 can be switched to a plurality of stages. In this example, the rotation speed of the outdoor fan 46 is switched in accordance with the temperature difference ΔT between the measured indoor temperature Ta and the set temperature Ts.

The indoor unit 5A further includes a lateral wind direction plate 48 and a vertical wind direction plate 49. The lateral wind direction plate 48 and the vertical wind direction plate 49 change a blowing direction when conditioned air subjected to heat exchange in the indoor heat exchanger 45 is blown into the room by the indoor fan 47. The lateral wind direction plate 48 changes the blowing direction laterally, and the vertical wind direction plate 49 changes the blowing direction vertically. An angle of each of the lateral wind direction plate 48 and the vertical wind direction plate 49, i.e., a wind direction of the blown air is controlled by the indoor controller 50*a* based on the setting of the remote controller 55.

The basic operation of the air conditioner 5 is as follows. In a cooling operation, the four-way valve 42 is switched to a position indicated by the solid line, and high-temperature and high-pressure gas refrigerant discharged from the compressor 41 flows into the outdoor heat exchanger 43. In this case, the outdoor heat exchanger 43 operates as a condenser. When air passes through the outdoor heat exchanger 43 by rotation of the outdoor fan 46, heat of condensation of the refrigerant is taken by the air through heat exchange. The refrigerant is condensed into high-pressure and low-temperature liquid refrigerant, and is adiabatically expanded by the expansion valve 44 to become low-pressure and low-temperature two-phase refrigerant.

The refrigerant passing through the expansion valve 44 flows into the indoor heat exchanger 45 of the indoor unit 5A. The indoor heat exchanger 45 operates as an evaporator. When air passes through the indoor heat exchanger 45 by rotation of the indoor fan 47, the air is deprived of heat of vaporization by the refrigerant through heat exchange, and the cooled air is supplied to the room. The refrigerant evaporates to become low-temperature and low-pressure gas refrigerant, and is compressed again into high-temperature and high-pressure refrigerant by the compressor 41.

In a heating operation, the four-way valve 42 is switched to a position indicated by the dotted line, and high-temperature and high-pressure gas refrigerant discharged from the compressor 41 flows into the indoor heat exchanger 45. In this case, the indoor heat exchanger 45 operates as a condenser. When air passes through the indoor heat exchanger 45 by rotation of the indoor fan 47, the air takes heat of condensation from the refrigerant through heat exchange, and the heated air is supplied to the room. The refrigerant is condensed into high-pressure and low-temperature liquid refrigerant, and is adiabatically expanded by the expansion valve 44 to become low-pressure and low-temperature two-phase refrigerant.

The refrigerant passing through the expansion valve 44 flows into the outdoor heat exchanger 43 of the outdoor unit 5B. The outdoor heat exchanger 43 operates as an evaporator. When air passes through the outdoor heat exchanger 43 by rotation of the outdoor fan 46, the air is deprived of heat of vaporization by the refrigerant through heat exchange. The refrigerant evaporates to become low-temperature and low-pressure gas refrigerant, and is compressed again into high-temperature and high-pressure refrigerant by the compressor 41.

Figure 4:
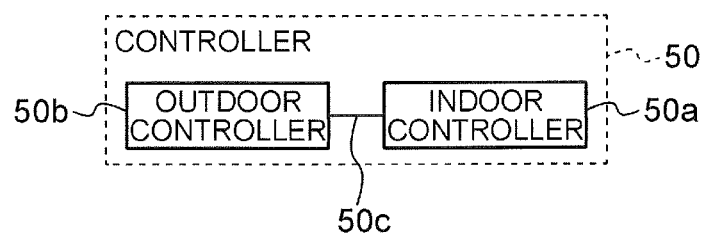
FIG. 4 is a conceptual diagram illustrating a basic configuration of a control system of the air conditioner according to the first embodiment.

FIG. 4 is a conceptual diagram showing a basic configuration of a control system of the air conditioner 5. The indoor controller 50*a* and the outdoor controller 50*b* described above exchange information with each other through the communication cable 50*c* to control the air conditioner 5. In this example, the indoor controller 50*a* and the outdoor controller 50*b* are collectively referred to as a controller 50.

Figure 5A:
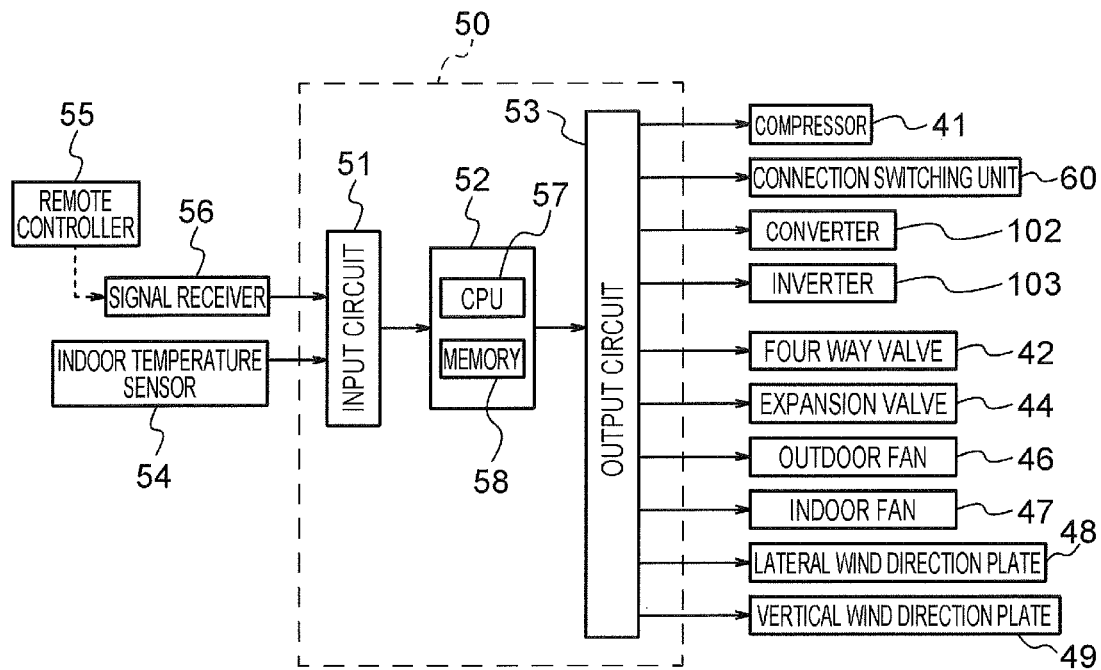
FIG. 5(A) is a block diagram illustrating the control system of the air conditioner according to the first embodiment.

FIG. 5(A) is a block diagram showing a control system of the air conditioner 5. The controller 50 is constituted by, for example, a microcomputer. The controller 50 incorporates an input circuit 51, an arithmetic circuit 52, and an output circuit 53.

The input circuit 51 receives an instruction signal received by the signal receiver 56 from the remote controller 55. The instruction signal includes, for example, signals for setting an operation input, an operation mode, a set temperature, an airflow rate, or a wind direction. The input circuit 51 also receives temperature information indicating an indoor temperature detected by the indoor temperature sensor 54. The input circuit 51 outputs the received information to the arithmetic circuit 52.

The arithmetic circuit 52 includes a central processing unit (CPU) 57 and a memory 58. The CPU 57 performs calculation processing and determination processing. The memory 58 stores various set values and programs for use in controlling the air conditioner 5. The arithmetic circuit 52 performs calculation and determination based on the information received from the input circuit 51, and outputs the result to the output circuit 53.

The output circuit 53 outputs control signals to the compressor 41, a connection switching unit 60 (described later), a converter 102, an inverter 103, the compressor 41, the four-way valve 42, the expansion valve 44, the outdoor fan 46, the indoor fan 47, the lateral wind direction plate 48, and the vertical wind direction plate 49, based on the information input from the arithmetic circuit 52.

As described above, the indoor controller 50*a* and the outdoor controller 50*b* (FIG. 4) exchange information with each other through the communication cable 50*c* and control the various devices of the indoor unit 5A and the outdoor unit 5B. Thus, in this example, the indoor controller 50*a* and the outdoor controller 50*b* are collectively referred to as the controller 50. Practically, each of the indoor controller 50*a* and the outdoor controller 50*b* is constituted by a microcomputer. A controller may be provided in only one of the indoor unit 5A and the outdoor unit 5B to control various devices of the indoor unit 5A and the outdoor unit 5B.

Figure 5B:
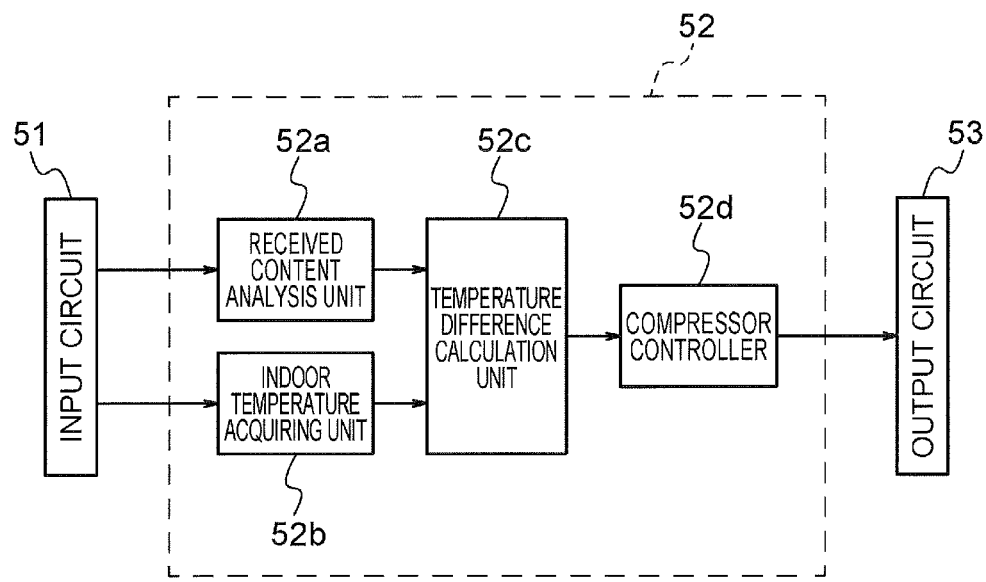
FIG. 5(B) is a block diagram illustrating a section that controls the motor of the compressor based on an indoor temperature.

FIG. 5(B) is a block diagram showing a section of the controller 50 for controlling the motor 1 of the compressor 41 based on the indoor temperature Ta. The arithmetic circuit 52 of the controller 50 includes a received content analysis unit 52*a*, an indoor temperature acquiring unit 52*b*, a temperature difference calculation unit 52*c*, and a compressor controller 52*d*. These components are included in, for example, the CPU 57 of the arithmetic circuit 52.

The received content analysis unit 52*a* analyzes an instruction signal input from the remote controller 55 via the signal reception unit 56 and the input circuit 51. Based on the analysis result, the received content analysis unit 52*a* outputs, for example, the operation mode and the set temperature Ts to the temperature difference calculation unit 52*c*. The indoor temperature acquiring unit 52*b* acquires the indoor temperature Ta input from the indoor temperature sensor 54 via the input circuit 51, and outputs the acquired indoor temperature Ta to the temperature difference calculation unit 52*c*.

The temperature difference calculation unit 52*c* calculates a temperature difference $\Delta T$ between the indoor temperature Ta input from the indoor temperature acquiring unit 52*b* and the set temperature Ts input from the received content analysis unit 52*a*. If the operation mode input from the received content analysis unit 52*a* is the heating operation, a temperature difference $\Delta T=Ts-Ta$ is calculated. If the operation mode is the cooling operation, a temperature difference $\Delta T=Ta-Ts$ is calculated. The temperature difference calculation unit 52c outputs the calculated temperature difference ΔT to the compressor controller 52d.

Based on the temperature difference ΔT input from the temperature difference calculation unit 52c, the compressor controller 52d controls the driving device 100 to thereby control the rotation speed of the motor 1 (i.e., the rotation speed of the compressor 41).

(Configuration of Driving Device)

Figure 6:
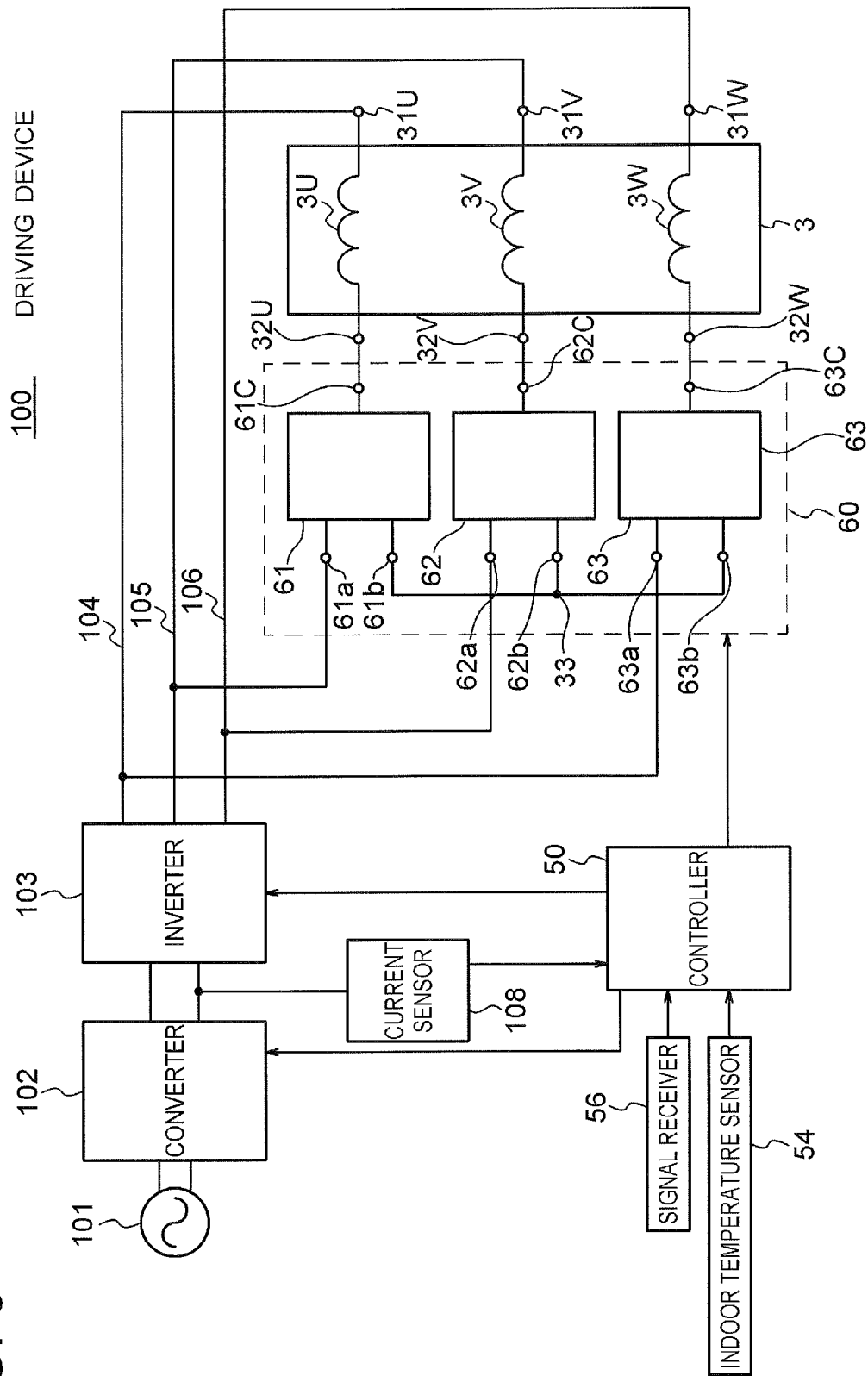
FIG. 6 is a block diagram illustrating a configuration of a driving device according to the first embodiment.

Next, the driving device 100 for driving the motor 1 will be described. FIG. 6 is a block diagram illustrating a configuration of the driving device 100. The driving device 100 includes the converter 102 for rectifying an output of a power supply 101, the inverter 103 for outputting an alternating-current voltage to the coils 3 of the motor 1, the connection switching unit 60 for switching the connection state of the coils 3, a current sensor 108 for detecting a current (bus current) output from the converter 102, and the controller 50. The converter 102 is supplied with electric power by the power supply 101 serving as an alternating-current (AC) power supply.

As the current sensor, a Hall element, a transformer (using electromagnetic induction), or a shunt resistor or the like may be used. The current sensor may be provided in a coil of one phase, coils of two phases, or coils of three phases. In the example illustrated in FIG. 6, a one-shunt current detection method is used, and one current sensor 108 is provided.

The power source 101 is, for example, an AC power source of 200 V (effective voltage). The converter 102 is a rectifier circuit, and outputs a direct-current (DC) voltage of, for example, 280 V. The voltage output from the converter 102 is referred to as a bus voltage, and a current output from the converter 102 is referred to as a bus current. The output voltage from the converter 102 is controlled by the controller 50.

The inverter 103 is supplied with a bus voltage from the converter 102, converts the bus voltage to an AC voltage, and outputs a line voltage (also referred to as an inverter output voltage) to the coils 3 of the motor 1. The output of the inverter 103 is controlled based on a pulse width modulation (PWM) signal input from the controller 50 to the inverter 103. Wires 104, 105, and 106 connected to the coils 3U, 3V, and 3W, respectively, are connected to the inverter 103.

The controller 50 controls the converter 102, the inverter 103, and the connection switching unit 60. The configuration of the controller 50 is as described with reference to FIG. 5. The controller 50 receives the operation instruction signal from the remote controller 55 received by the signal receiving unit 56 and also receives the indoor temperature detected by the indoor temperature sensor 54, and a current value detected by the current detecting circuit 108. Based on the received information, the controller 50 outputs a voltage switching signal to the converter 102, outputs an inverter driving signal to the inverter 103, and outputs a connection switching signal to the connection switching unit 60.

In particular, the controller 50 calculates an inverter output voltage instruction value (i.e., operation frequency instruction value) based on a temperature difference ΔT between an indoor temperature Ta and a set temperature Ts, and outputs a PWM signal as an inverter driving signal based on the inverter output voltage instruction value.

The coil 3U has terminals 31U and 32U. The coil 3V has terminals 31V and 32V. The coil 3W has terminals 31W and 32W. The wire 104 is connected to the terminal 31U of the coil 3U. The wire 105 is connected to the terminal 31V of the coil 3V. The wire 106 is connected to the terminal 31W of the coil 3W.

The connection switching unit 60 includes semiconductor switches (semiconductor elements) 61, 62, and 63. Each of the semiconductor switches 61, 62, and 63 is constituted by, for example, a circuit including a metal-oxide-semiconductor field-effect transistor (MOS transistor).

The semiconductor switch 61 includes a first terminal 61a connected to the wire 105 (V phase), a second terminal 61b connected to a neutral point 33, and a third terminal 61c connected to the terminal 32U of the coil 3U and to one of the first terminal 61a and the second terminal 61b.

The semiconductor switch 62 includes a first terminal 62a connected to the wire 106 (W phase), a second terminal 62b connected to the neutral point 33, and a third terminal 62c connected to the terminal 32V of the coil 3V and to one of the first terminal 62a and the second terminal 62b.

The semiconductor switch 63 includes a first terminal 63a connected to the wire 104 (U phase), a second terminal 63b connected to the neutral point 33, and a third terminal 63c connected to the terminal 32W of the coil 3W and to one of the first terminal 63a and the second terminal 63b.

Figure 33:
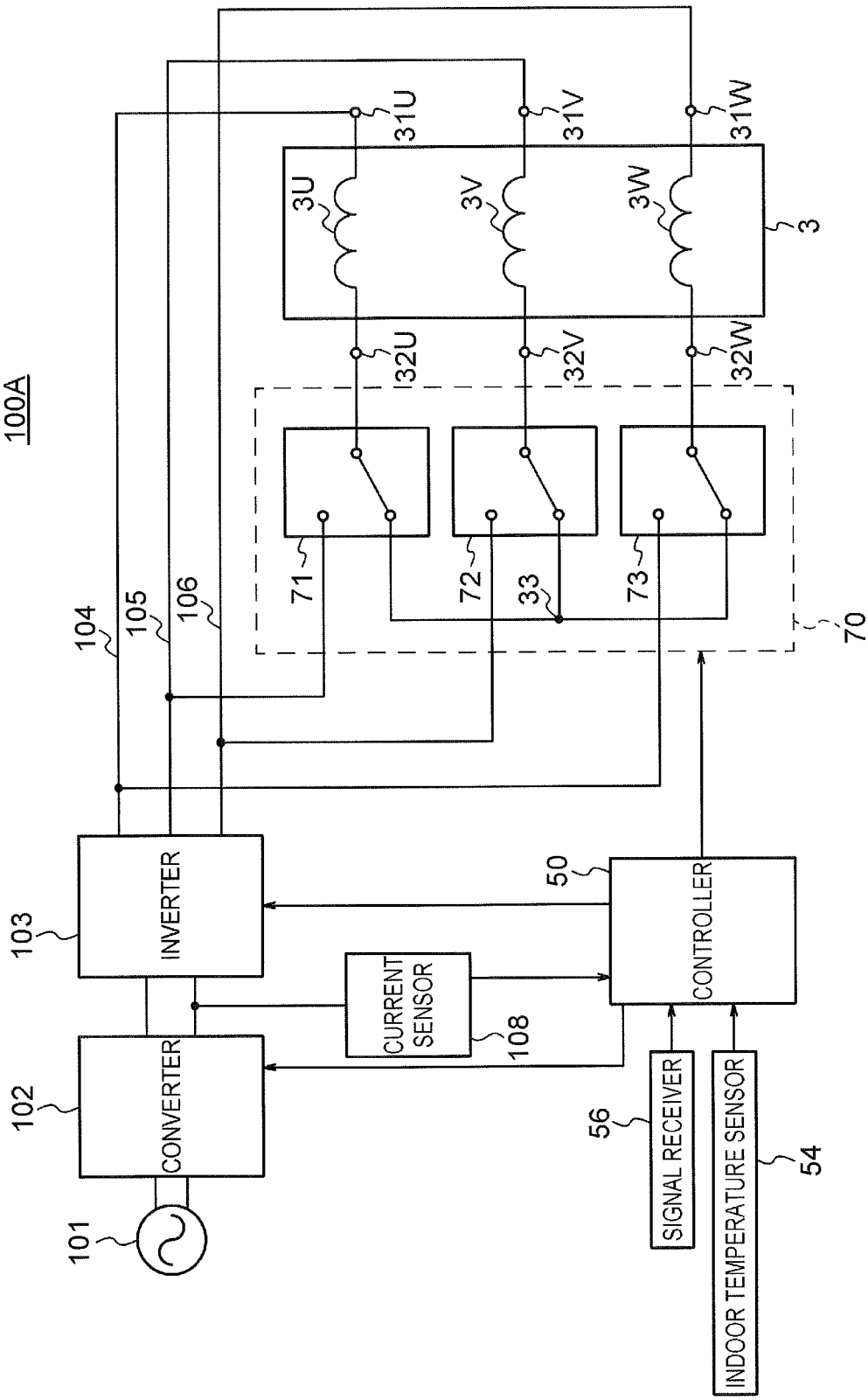
FIG. 33 is a block diagram illustrating a configuration of a driving device according to a third embodiment.

The semiconductor switches 61, 62, and 63 of the connection switching unit 60 may be replaced by relay contacts. This will be described in a third embodiment (FIG. 33).

Here, the semiconductor switch 61 connects the terminal 32U of the coil 3U to the neutral point 33, the semiconductor switch 62 connects the terminal 32V of the coil 3V to the neutral point 33, and the semiconductor switch 63 connects the terminal 32W of the coil 3W to the neutral point 33. In this case, the terminals 31U, 31V, and 31W of the coils 3U, 3V, and 3W are connected to the inverter 103, and the terminals 32U, 32V, and 32W are connected to the neutral point 33.

Figure 7A:
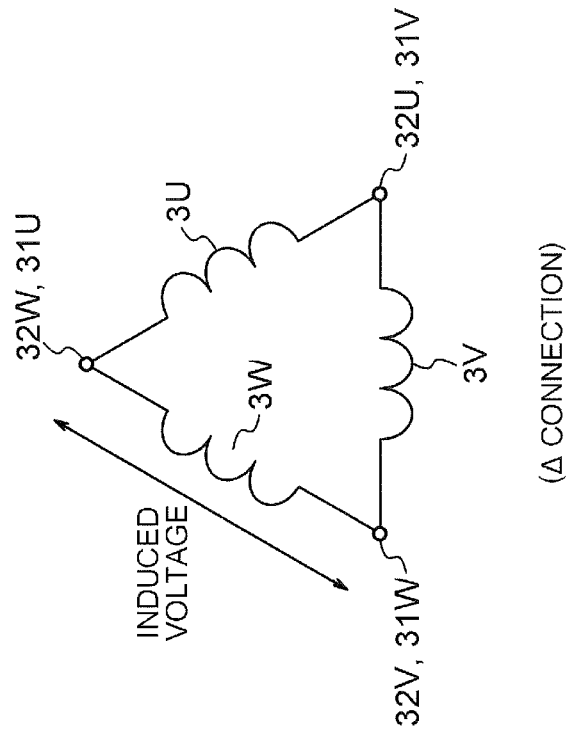
FIGS. 7(A) and 7(B) are schematic diagrams illustrating a switching operation of a connection state of coils according to the first embodiment.

FIG. 7(A) is a schematic diagram illustrating a connection state of the coils 3U, 3V, and 3W when the semiconductor switch 61 connects the terminal 32U of the coil 3U to the neutral point 33, the semiconductor switch 62 connects the terminal 32V of the coil 3V to the neutral point 33, and the semiconductor switch 63 connects the terminal 32W of the coil 3W to the neutral point 33.

The coils 3U, 3V, and 3W are connected to the neutral point 33 at the terminals 32U, 32V, and 32W, respectively. Thus, the connection state of the coils 3U, 3V, and 3W is the Y connection (star connection).

Figure 7B:
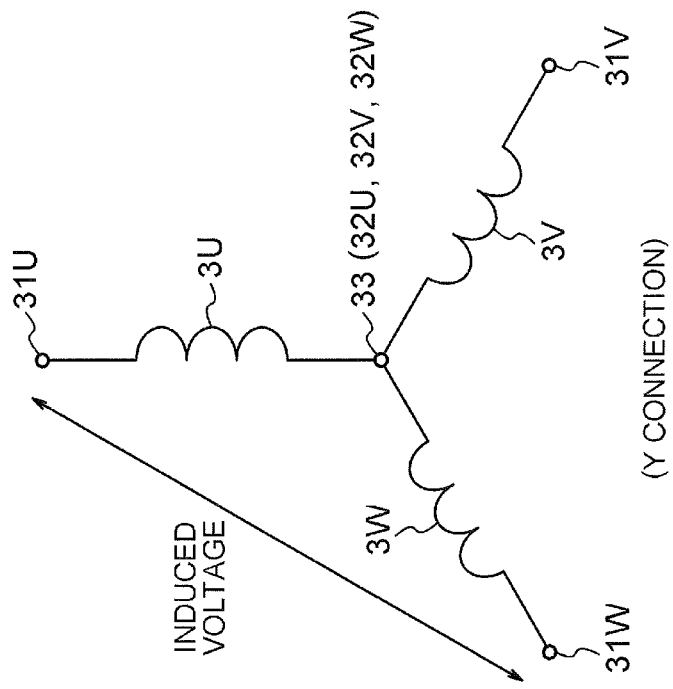

FIG. 7(B) is a schematic diagram illustrating a connection state of the coils 3U, 3V, and 3W when the semiconductor switch 61 connects the terminal 32U of the coil 3U to the wire 105, the semiconductor switch 62 connects the terminal 32V of the coil 3V to the wire 106, and the semiconductor switch 63 connects the terminal 32W of the coil 3W to the wire 104.

The terminal 32U of the coil 3U is connected to the terminal 31V of the coil 3V through the wire 105 (FIG. 6). The terminal 32V of the coil 3V is connected to the terminal 31W of the coil 3W through the wire 106 (FIG. 6). The terminal 32W of the coil 3W is connected to the terminal 31U of the coil 3U through the wire 104 (FIG. 6). Thus, the connection state of the coils 3U, 3V, and 3W is the delta connection.

In this manner, the connection switching unit 60 switches the connection state of the coils 3U, 3V, and 3W of the motor 1 between the Y connection (first connection state) and the delta connection (second connection state) by switching the switches 61, 62, and 63.

Figure 8:
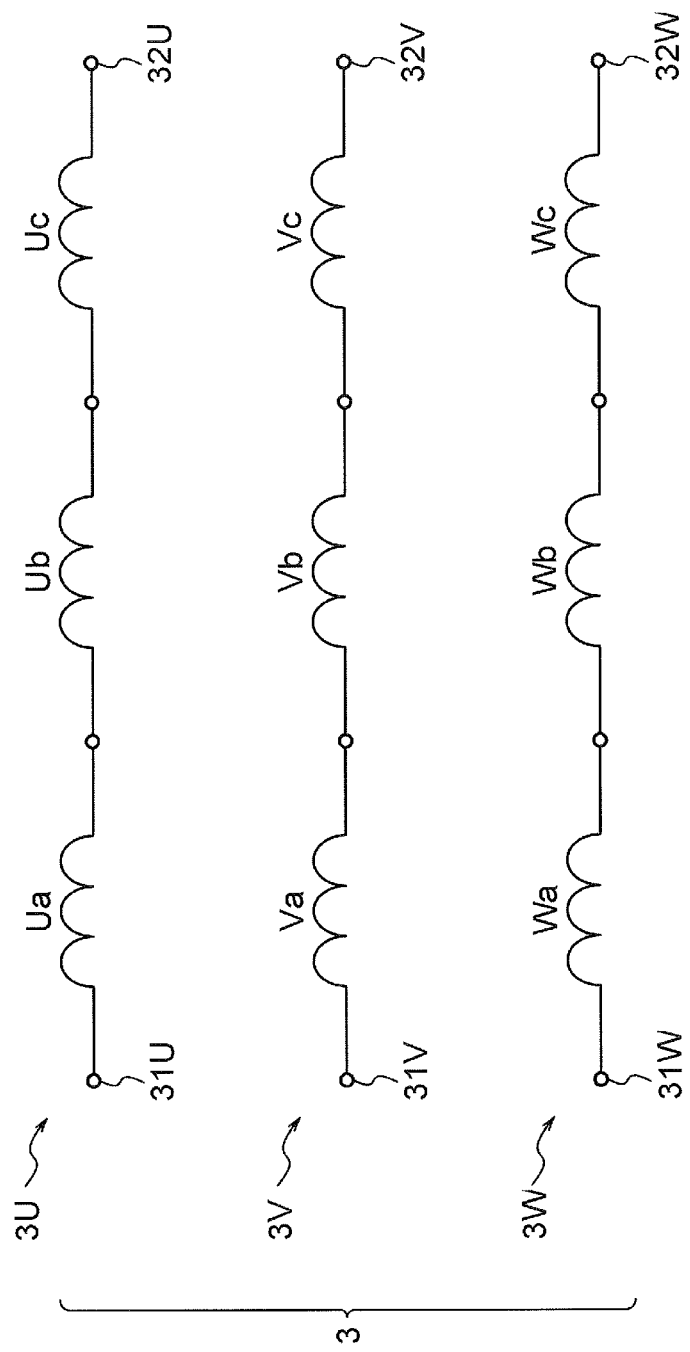
FIG. 8 is a schematic diagram illustrating a connection state of the coils according to the first embodiment.

FIG. 8 is a schematic diagram illustrating coil portions of the coils 3U, 3V, and 3W. As described above, the motor 1 has nine teeth 12 (FIG. 1), and each of the coils 3U, 3V, and 3W is wound around three teeth 12. That is, the coil 3U is obtained by connecting, in series, U-phase coil portions Ua, Ub, and Uc wound around the three teeth 12. Similarly, the coil 3V is obtained by connecting, in series, V-phase coil portions Va, Vb, and Vc wound around the three teeth 12. The coil 3W is obtained by connecting, in series, W-phase coil portions Wa, Wb, and Wc wound around the three teeth 12.

(Operation of Air conditioner)

Figure 9:
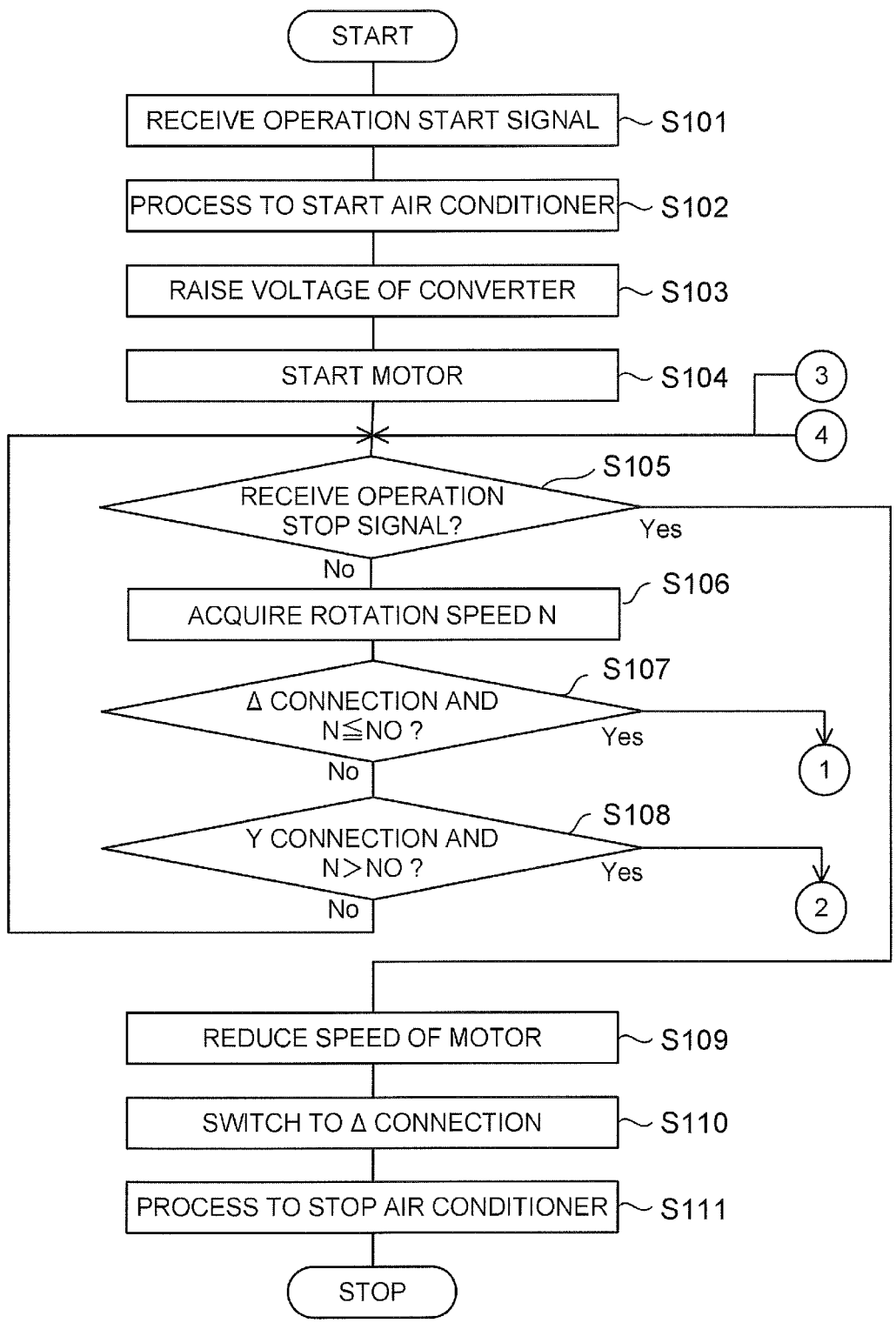
FIG. 9 is a flowchart showing a basic operation of the air conditioner according to the first embodiment.

FIG. 9 is a flowchart showing a basic operation of the air conditioner 5. The controller 50 of the air conditioner 5 starts an operation when the signal reception unit 56 receives a start signal from the remote controller 55 (step S101). In this example, the CPU 57 of the controller 50 is activated. As will be described later, since the connection state of the coils 3 is switched to the delta connection when the preceding operation of the air conditioner 5 is terminated, the connection state of the coils 3 is the delta connection when the operation is started (at start-up).

Next, the controller 50 performs a start process of the air conditioner 5 (step S102). Specifically, fan motors of the indoor fan 47 and the outdoor fan 46 are driven, for example.

Then, the controller 50 outputs a voltage switching signal to the converter 102 to raise a bus voltage of the converter 102 to a bus voltage (for example, 390 V) corresponding to the delta connection (step S103). The bus voltage of the converter 102 is the maximum voltage applied from the inverter 103 to the motor 1.

Then, the controller 50 starts the motor 1 (step S104). Thus, the motor 1 is started while the connection state of the coils 3 is set to the delta connection. Further, the controller 50 controls the output voltage of the inverter 103 to control the rotation speed of the motor 1.

Specifically, the controller 50 increases the rotation speed of the motor 1 stepwise at a preset speed in accordance with the temperature difference $\Delta T$ between the indoor temperature detected by the indoor temperature sensor 54 and the set temperature Ts. An allowable maximum rotation speed of the rotation speed of the motor 1 is, for example, 130 rps. As a result, the circulation amount of refrigerant by the compressor 41 is increased, and a cooling capacity is increased in the case of the cooling operation whereas a heating capacity is increased in the case of the heating operation.

Further, when the indoor temperature Ta approaches the set temperature Ts due to air conditioning effect and the temperature difference $\Delta T$ shows a decreasing tendency, the controller 50 reduces the rotation speed of the motor 1 in accordance with the temperature difference $\Delta T$. When the temperature difference $\Delta T$ decreases to a preset temperature near zero (but larger than zero), the controller 50 drives the motor 1 at an allowable minimum rotation speed (for example, 20 rps).

Further, when the temperature Ta reaches the set temperature Ts (i.e., when the temperature difference $\Delta T$ is zero or less), the controller 50 stops rotation of the motor 1 in order to prevent overcooling (or overheating). Accordingly, the compressor 41 is stopped. Then, when the temperature difference $\Delta T$ becomes larger than zero again, the controller 50 restarts rotation of the motor 1. The controller 50 restricts restart of rotation of the motor 1 in a short time period so as not to repeat rotation and stop of the motor 1 in a short time period.

When the rotation speed of the motor 1 reaches a preset rotation speed, the inverter 103 starts field-weakening control. The field-weakening control will be described later with reference to FIGS. 19 through 29.

The controller 50 determines whether or not an operation stop signal (signal to stop an operation of the air conditioner 5) is received from the remote controller 55 through the signal receiving unit 56 (step S105). If the operation stop signal is not received, the controller 50 proceeds to step S106. If the operation stop signal is received, the controller 50 proceeds to step S109.

In step S106, the controller 50 acquires a rotation speed (referred to as a rotation speed N) of the motor 1. Then, the controller 50 compares the rotation speed N of the motor 1 to a set rotation speed N0 (first rotation speed) as a threshold, and determines whether or not to switch the connection state of the coils 3 from the delta connection to the Y connection (step S107). Here, the rotation speed N of the motor 1 is a frequency (i.e., operation frequency) of the output current of the inverter 103, and is detected by using a current value detected by the current sensor 108 (FIG. 6) as a rotation speed detector (or an operation frequency acquiring unit or an operation frequency detector).

In the case of the heating operation, the set rotation speed N0 (first rotation speed) in step S107 is preferably a value (more preferably, an intermediate value) between a rotation speed N1 corresponding to an intermediate heating condition and a rotation speed N2 corresponding to a rated heating condition. In the case of the cooling operation, the set rotation speed N0 is preferably a value (more preferably, an intermediate value) between a rotation speed N1 corresponding to an intermediate cooling condition and a rotation speed N2 corresponding to a rated cooling condition.

For example, in the case of the household air conditioner having a refrigeration capacity of 6.3 kW, the rotation speed N1 corresponding to the intermediate heating condition is 35 rps and the rotation speed N2 corresponding to the rated heating condition is 85 rps. Thus, the set rotation speed N0 in step S107 is preferably 60 rps, which is an intermediate value between the rotation speed N1 and the rotation speed N2.

The rotation speed N of the motor 1 may fluctuate. Thus, in this step S107, it is also possible to determine whether or not a state where the rotation speed N of the motor 1 is equal to or higher than the set rotation speed N0 continues for a preset time period. Determination on whether or not the rotation speed N of the motor 1 is equal to or higher than the set rotation speed N0 may be repeated a plurality of times.

As a result of the comparison in step S107, if the connection state of the coils 3 is the delta connection, and the rotation speed of the motor 1 is lower than or equal to the set rotation speed N0, the process proceeds to step S121 (FIG. 10) in order to switch to the Y connection.

Figure 10:
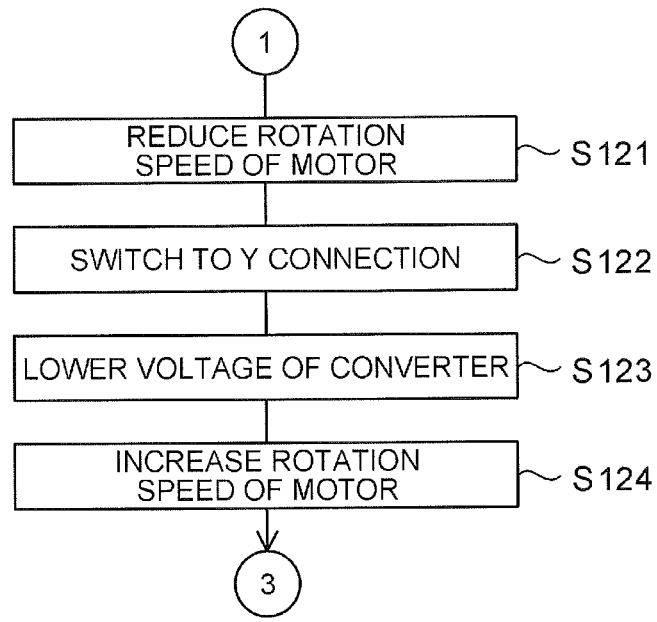
FIG. 10 is a flowchart showing a switching operation from the delta connection to the Y connection in the first embodiment.

In step S121 shown in FIG. 10, the controller 50 outputs a speed-reducing signal to the inverter 103, and reduces the rotation speed of the motor 1 from a first rotation speed (i.e., the set rotation speed N0), which is a rotation speed immediately before step S121 (i.e., step S106), to a third rotation speed lower than the first rotation speed. The third rotation speed is, for example, 20 rps. The reason why the rotation speed of the motor 1 is reduced before the connection switching in this manner is to ensure reliability of operation of the device (for example, the connection switching unit 60).

Then, the controller 50 outputs a connection switching signal to the connection switching unit 60, and switches the connection state of the coils 3 from the delta connection to the Y connection (step S122). Subsequently, the controller 50 outputs a voltage switching signal to the converter 102, and lowers a bus voltage of the converter 102 to a voltage (280 V) corresponding to the Y connection (step S123).

Then, the controller 50 increases the rotation speed of the motor 1 to the first rotation speed that is the original rotation speed (i.e., rotation speed before the reduction to the third rotation speed in step S121) (step S124). Thereafter, the process returns to step S105 (FIG. 9) described above.

As a result of the comparison in step S107, if the connection state of the coils 3 is not the delta connection or if the rotation speed of the motor 1 is higher than the set rotation speed N0, the process proceeds to step S108. In step S108, it is determined whether the connection state of the coils 3 is the Y connection and the rotation speed of the motor 1 is higher than the set rotation speed N0.

In step S108, it is also possible to determine whether the state where the rotation speed N of the motor 1 is higher than the set rotation speed N0 continues for the preset time period, since there is a possibility that the rotation speed N of the motor 1 may fluctuate. Alternatively, the determination on whether the rotation speed N of the motor 1 is higher than the set rotation speed N0 may be repeated a plurality of number of times.

As a result of the comparison in step S108, if the connection state of the coils 3 is the Y connection and the rotation speed of the motor 1 is higher than the set rotation speed N0, the process proceeds to step S131 (FIG. 11) in order to switch to the delta connection.

Figure 11:
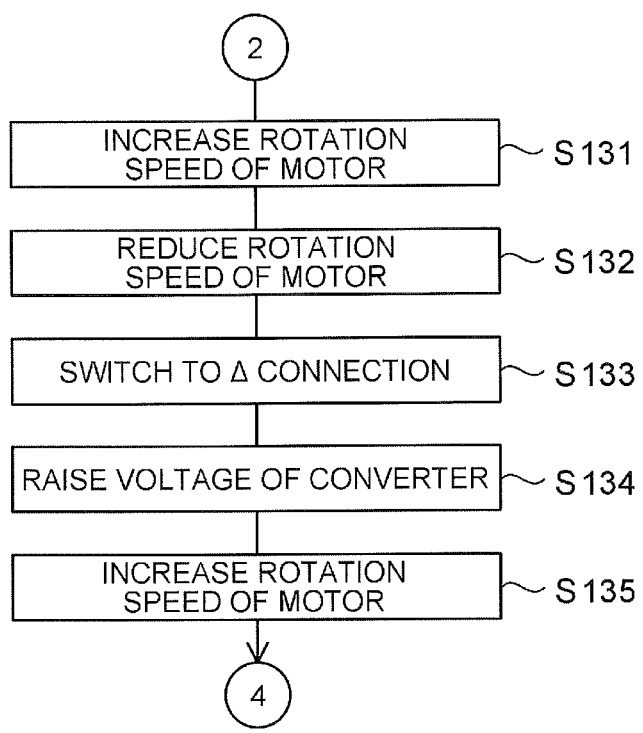
FIG. 11 is a flowchart showing a switching operation from the Y connection to the delta connection in the first embodiment.

In step S131 shown in FIG. 11, the controller 50 increases the rotation speed of the motor 1 from the first rotation speed (i.e., the set rotation speed N0), which is a rotation speed immediately before step 131 (i.e., step S106), to a second rotation speed (step S131) higher than the first rotation speed. The second rotation speed is, for example, 85 rps corresponding to the rated heating condition in the case of the heating operation, and corresponding to the rated cooling condition in the case of the cooling operation.

By increasing the rotation speed of the motor 1 as described above, an output of the compressor 41 increases so that the circulation amount of refrigerant in the air conditioner 5 increases. That is, a heating capacity increases in the heating operation, and a cooling capacity increases in the cooling operation. Thus, it is possible to suppress decrease in comfort caused by reducing the rotation speed of the motor 1 in steps S132 through S133 described later.

The second rotation speed is 85 rps corresponding to the rated condition (the rated heating condition or the rated cooling condition). However, this embodiment is not limited to such an example. In order to increase a heating capacity or a cooling capacity of the air conditioner 5 before connection switching, it is preferable that the second rotation speed is higher than or equal to 1.2 times the first rotation speed.

Further, it is also possible to calculate a necessary heating capacity or a necessary cooling capacity based on the temperature detected by the indoor temperature sensor 54 or the like, and to determine the second rotation speed based on the calculated capacity.

Then, the controller 50 reduces the rotation speed of the motor 1 to the third rotation speed lower than the first rotation speed (step S132). The third rotation speed is, for example, 20 rps. By reducing the rotation speed of the motor 1, an output of the compressor 41 decreases so that the circulation amount of the refrigerant decreases, and the capacity of the air conditioner 5 decreases. However, since the air conditioner 5 exhibits a high heating or cooling capacity in the preceding step S131, decrease in comfort is suppressed.

Subsequently, the controller 50 outputs the connection switching signal to the connection switching unit 60, and switches the connection state of the coils 3 from the Y connection to the delta connection (step S133). Subsequently, the controller 50 outputs the voltage switching signal to the converter 102, and raises the bus voltage of the converter 102 to a voltage (390 V) corresponding to the delta connection (step S134).

Then, the controller 50 increases the rotation speed of the motor 1 to the first rotation speed that is the original rotation speed (i.e., rotation speed in step S106) (step S135). Thereafter, the process returns to step S105 (FIG. 9) described above.

If the connection state of the coils 3 is the delta connection and the rotation speed of the motor 1 is higher than the set rotation speed N0, or if the connection state of the coils 3 is the Y connection and the rotation speed of the motor 1 is lower than or equal to the set rotation speed N0, determination results in steps S107 and S108 are both NO, and thus the process returns to step S105.

If the operation stop signal is received in step S105 described above, the rotation speed of the motor 1 is reduced to the third rotation speed described above (for example, 20 rps) (step S109). Thereafter, the controller 50 switches the connection state of the coils 3 from the Y connection to the delta connection (step S110). If the connection state of the coils 3 is already the delta connection, the connection state is unchanged. In this regard, although not shown in FIG. 9, if the operation stop signal is received in steps S106 through S108, the process proceeds to step S109 and rotation of the motor 1 is reduced.

Thereafter, the controller 50 performs a stop process of the air conditioner 5 (step S111). Specifically, the fan motors of the indoor fan 47 and the outdoor fan 46 are stopped. Thereafter, the CPU 57 of the controller 50 is stopped, and the operation of the air conditioner 5 is terminated.

(Advantages Obtained by Raising Rotation Speed Before Connection Switching)

Then, advantages obtained by raising the rotation speed of the motor 1 before switching from the Y connection to the delta connection (step S131 in FIG. 11) will be described.

Figure 12:
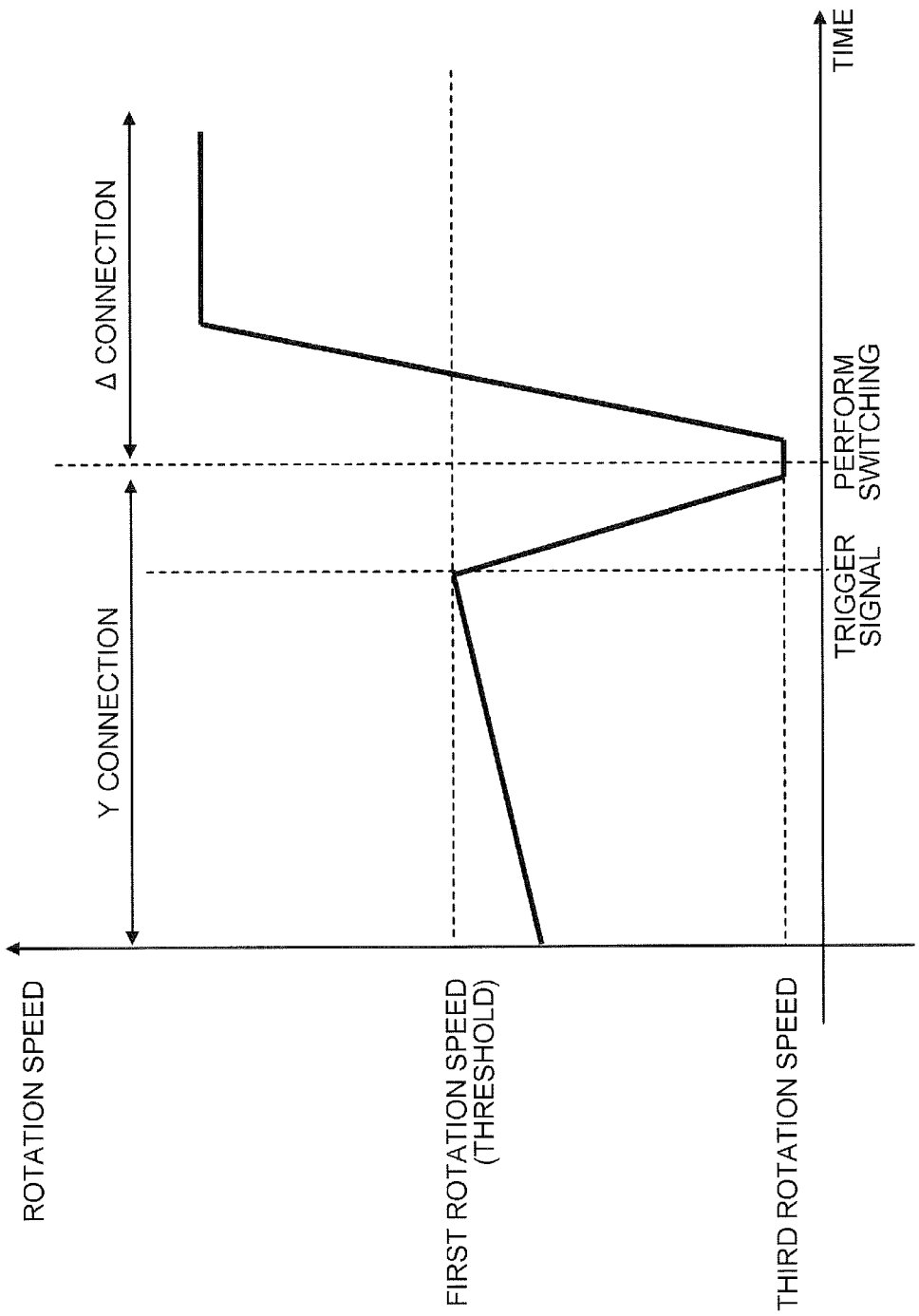
FIG. 12 is a graph showing a change in rotation speed of a motor in a comparative example.

FIG. 12 is a graph showing a change in the rotation speed of the motor 1 in a case where the rotation speed of the motor 1 is not increased before switching from the Y connection to the delta connection (i.e., a case where step S131 in FIG. 11 is not performed). The vertical axis represents the rotation speed of the motor 1, and the horizontal axis represents the time.

When the rotation speed of the motor 1 increases due to an increase in air-conditioning load, the rotation speed of the motor 1 reaches the first rotation speed (for example, 60 rps) as the set rotation speed N0. When the rotation speed of the motor 1 reaches the first rotation speed, the controller 50 reduces the rotation speed of the motor 1 to the third rotation speed (for example, 20 rps) in order to switch the connection state from the Y connection to the delta connection.

After the rotation speed of the motor 1 decreases to the third rotation speed (for example, 20 rps), switching from the Y connection to the delta connection is performed by the connection switching unit 60. Since the rotation speed of the motor 1 is reduced before the connection switching, reliability of the device (for example, the connection switching unit 60) can be ensured.

After switching to the delta connection, the rotation speed of the motor 1 increases again. In the delta connection, the motor 1 can rotate to a higher rotation speed than that in the Y connection. Thus, the rotation speed after the connection switching is higher than the first rotation speed (for example, 60 rps).

Switching from the Y connection to the delta connection is performed in a situation where the rotation speed of the motor 1 increases, that is, in a situation where the air-conditioning load increases. If the rotation speed of the motor 1 is reduced before the connection switching as shown in FIG. 12, the circulation amount of refrigerant by the compressor 41 decreases, and the heating capacity or the cooling capacity of the air conditioner 5 decreases. This results in decrease in comfort.

Figure 13:
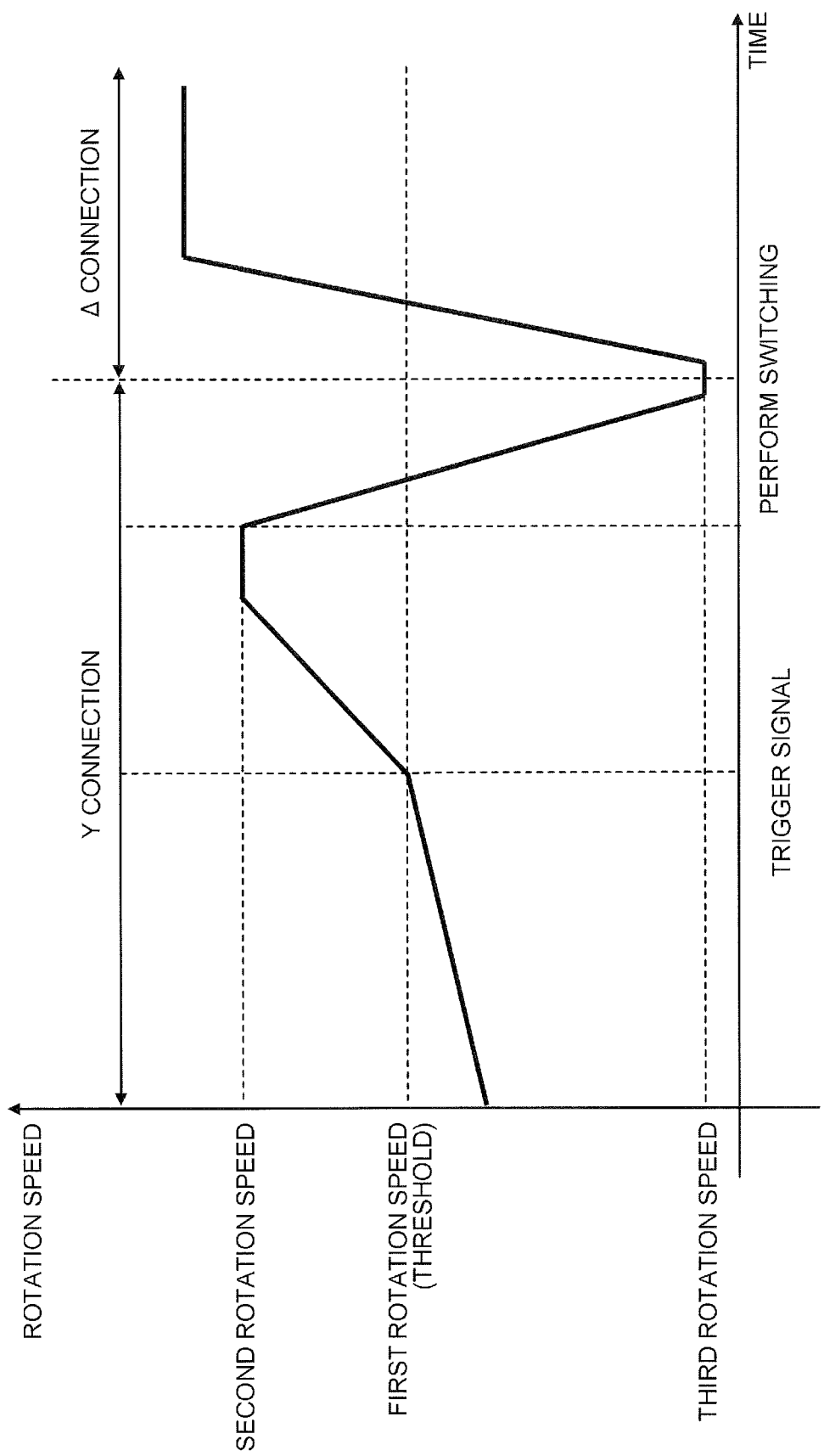
FIG. 13 is a graph showing a change in rotation speed of the motor according to the first embodiment.

FIG. 13 is a graph showing a change in the rotation speed of the motor 1 in a case where the rotation speed of the motor 1 is increased before switching from the Y connection to the delta connection (i.e., the case where step S131 in FIG. 11 is performed). The vertical axis represents the rotation speed of the motor 1, and the horizontal axis represents the time.

When the rotation speed of the motor 1 increases due to an increase in air-conditioning load and reaches the first rotation speed (for example, 60 rps) as the set rotation speed N0, the controller 50 increases the rotation speed of the motor 1 to a second rotation speed (for example, 85 rps) higher than the first rotation speed.

Since the rotation speed of the motor 1 is increased as described above, the circulation amount of refrigerant by the compressor 41 increases, and the heating capacity or the cooling capacity of the air conditioner 5 increases. A sum of a time for the speed to increase from the first rotation speed to the second rotation speed (acceleration time) and a time during which the second rotation speed is maintained is, for example, 5 to 20 minutes.

Thereafter, in order to switch from the Y connection to the delta connection, the rotation speed of the motor 1 is reduced to the third rotation speed (for example, 20 rps). In this state, switching from the Y connection to the delta connection is performed by the connection switching unit 60.

Since the rotation speed of the motor 1 is reduced to the third rotation speed (for example, 20 rps), the circulation amount of refrigerant by the compressor 41 decreases, and the heating capacity or the cooling capacity of the air conditioner 5 decreases. However, the air conditioner 5 exhibits a high heating or cooling capacity due to the preceding increase in the rotation speed of the motor 1, and thus decrease in comfort is suppressed.

After switching to the delta connection, the rotation speed of the motor 1 increases again. In the delta connection, the motor 1 can rotate to a higher rotation speed than that in the Y connection. Thus, the rotation speed of the motor 1 after the connection switching is higher than the first rotation speed (for example, 60 rps) and the second rotation speed (for example, 85 rps).

Figure 14:
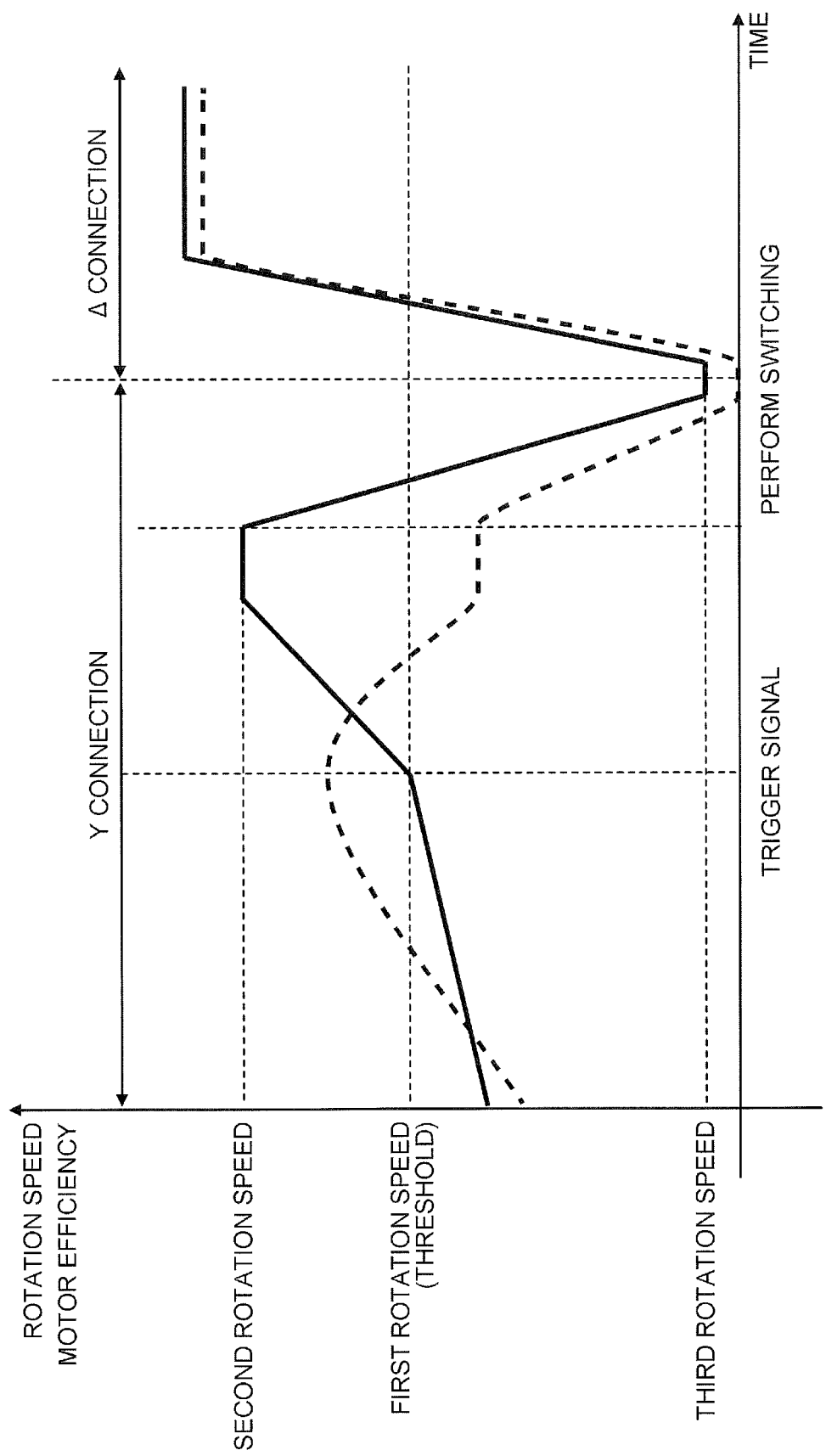
FIG. 14 is a graph showing changes in rotation speed and motor efficiency of the motor according to the first embodiment.

FIG. 14 is a graph in which a change in motor efficiency is added to the graph of FIG. 13. In FIG. 14, the motor efficiency is indicated by a broken line, and the rotation speed of the motor 1 is indicated by a solid line. In the motor 1, a winding number of the coil 3 or the like is set so that the motor efficiency is at the maximum at the first rotation speed (for example, 60 rps) or a rotation speed slightly lower than the first rotation speed.

When the rotation speed of the motor 1 reaches the first rotation speed (for example, 60 rps), a line voltage output from the inverter 103 reaches an inverter maximum output voltage. Thus, while the rotation speed of the motor 1 increases from the first rotation speed to the second rotation speed (for example, 85 rps), field-weakening control is performed. When the field-weakening control is started, the motor efficiency decreases temporarily.

Thereafter, when the rotation speed of the motor 1 is reduced to the third rotation speed (for example, 20 rps), the motor efficiency further decreases. After the connection state is switched to the delta connection, the bus voltage of the converter 102 also increases. Thus, the field-weakening control is stopped, and the motor efficiency also increases.

As described above, in this first embodiment, before the connection switching unit 60 switches the connection state of the coils 3 from the Y connection to the delta connection, the motor 1 is rotated at the second rotation speed higher than the first rotation speed (i.e., the set rotation speed N0), and the heating capacity or the cooling capacity of the air conditioner 5 is temporarily increased. Thus, even if the rotation speed of the motor 1 is thereafter reduced to the third rotation speed and the capacity of the air conditioner 5 decreases, decrease in comfort can be suppressed.

In this example, the rotation speed of the motor 1 is detected based on a current value of the inverter 103 detected by the current sensor 108 (FIG. 6). Alternatively, a sensor (for example, magnetic sensor) for detecting rotation of the rotor 20 may be provided in the motor 1, and the rotation speed of the motor 1 may be detected by using the sensor.

As will be described later with reference to FIGS. 19 through 29, the air conditioner 5 of the first embodiment is configured to obtain a high operation efficiency in both of the Y connection and the delta connection. Thus, even if the motor efficiency temporarily decreases when the connection switching is performed, an influence on power consumption of the air conditioner 5 is small.

In this example, the rotation speed of the motor 1 is increased before switching from the Y connection to the delta connection (step S131 in FIG. 11). In addition to this, it is also possible to increase the rotation speed of the motor 1 before switching from the delta connection to the Y connection (step S121 in FIG. 10).

(Examples of Connection Switching)

In steps S106 through S108 in FIG. 9 described above, the connection state of the coils 3 is switched based on the rotation speed of the motor 1. The rotation speed of the motor 1 is a rotation speed detected based on the current value detected by the current sensor 108, and thus can also be referred to as an operation frequency of the motor 1.

In this case, step S106 of FIG. 9 corresponds to a step of acquiring the operation frequency by an operation frequency acquiring unit (i.e., the current sensor 108). Step S107 corresponds to a step of comparing the operation frequency of the motor 1 with a set frequency (first operation frequency) and determining whether or not to switch the connection state of the coils 3 from the delta connection to the Y connection. Step S108 corresponds to a step of comparing the operation frequency of the motor 1 with the set frequency (first operation frequency) and determining whether or not to switch the connection state of the coils 3 from the Y connection to the delta connection.

The controller 50 may acquire, as the operation frequency, an operation frequency instruction value (i.e., inverter output voltage instruction value) calculated based on, for example, the temperature difference $\Delta T$ between the indoor temperature Ta and the set temperature Ts, without using the current sensor 108. In this case, the controller 50 serves as the operation frequency acquiring unit.

Step S121 in FIG. 10 corresponds to a step of reducing the rotation speed of the motor 1 from the first rotation speed (i.e., the set rotation speed N0) corresponding to the first operation frequency to the third rotation speed lower than the first rotation speed. Step S131 in FIG. 11 corresponds to a step of increasing the rotation speed of the motor 1 from the first rotation speed (i.e., the set rotation speed N0) corresponding to the first operation frequency to the second rotation speed higher than the first rotation speed.

The steps S106 and S107 in FIG. 9 can also be referred to as a step of receiving a signal serving as a trigger for switching from the delta connection to the Y connection. Similarly, steps S106 and S108 can also be referred to as a step of receiving a signal serving as a trigger for switching from the Y connection to the delta connection.

In this case, step S121 in FIG. 10 corresponds to a step of reducing the rotation speed of the motor 1 to the third rotation speed lower than the first rotation speed (i.e., the set rotation speed N0) at a time when the signal as the trigger for switching from the delta connection to the Y connection is received. Step S131 in FIG. 11 corresponds to a step of increasing the rotation speed of the motor 1 to the second rotation speed higher than the first rotation speed (i.e., the set rotation speed N0) when the signal as the trigger for switching from the Y connection to the delta connection is received.

Here, description has been made of the switching operation of the connection state of the coils 3 based on the rotation speed or the operation frequency of the motor 1 or the trigger signal. Hereinafter, other examples of the connection switching will be described with reference to FIGS. 15 through 18.

(Connection Switching Based on Temperature)

Figure 15:
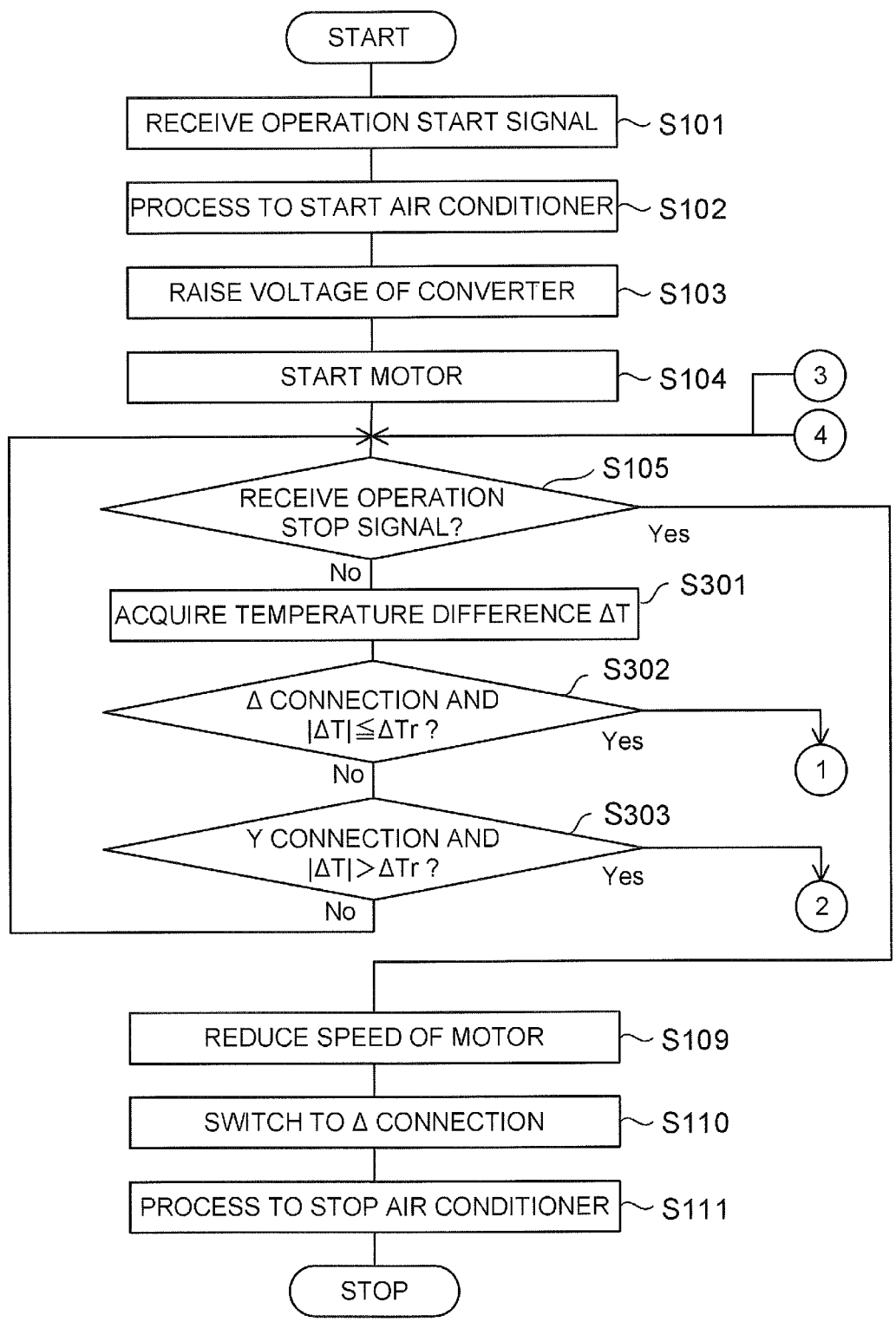
FIG. 15 is a flowchart showing another example of the basic operation of the air conditioner according to the first embodiment.

FIG. 15 is a flowchart showing a basic operation in a case where connection switching is performed based on the temperature difference $\Delta T$ between the indoor temperature Ta detected by the indoor temperature sensor 54 and the set temperature Ts.

The processes in steps S101 through S105 in FIG. 15 are similar to those in steps S101 through S105 shown in FIG. 9. In step S301, the controller 50 acquires the temperature difference $\Delta T$ between the indoor temperature Ta detected by the indoor temperature sensor 54 and the set temperature Ts set by the remote controller 55.

Subsequently, the controller 50 compares an absolute value of the temperature difference $\Delta T$ with a set temperature difference (threshold) $\Delta Tr$ and determines whether or not to switch the connection state of the coils 3 from the delta connection to the Y connection. That is, the controller 50 determines whether the connection state of the coils 3 is the delta connection and the absolute value of the temperature difference $\Delta T$ is less than or equal to the set temperature difference $\Delta Tr$ (step S302). The set temperature difference $\Delta Tr$ is a temperature difference corresponding to an air-conditioning load that is small enough to allow switching to the Y connection.

As described above, the temperature difference $\Delta T$ is expressed as $\Delta T=Ts-Ta$ when the operation mode is the heating operation, and expressed as $\Delta T=Ta-Ts$ when the operation mode is the cooling operation. Thus, in this example, determination on whether connection switching is necessary or not is performed by comparing the absolute value of $\Delta T$ and the set temperature difference $\Delta Tr$.

As a result of the comparison in step S302, if the connection state of the coils 3 is the delta connection and the absolute value of the temperature difference $\Delta T$ is less than or equal to the set temperature difference $\Delta Tr$, the process proceeds to step S121 in FIG. 10 in order to switch to the Y connection, and steps S121 through S124 described above are performed.

In this case, step S121 in FIG. 10 corresponds to a step of reducing the rotation speed of the motor 1 to the third rotation speed lower than the first rotation speed (i.e., the set rotation speed N0) at a time when the temperature difference $\Delta T$ becomes less than or equal to the set temperature difference $\Delta Tr$. Steps S122 through S124 are as described above.

As a result of the comparison in step S302 described above, if the connection state of the coils 3 is not the delta connection or if the absolute value of the temperature difference $\Delta T$ is larger than the set temperature difference $\Delta Tr$, the process proceeds to step S303.

In step S303, it is determined whether the connection state of the coils 3 is the Y connection and the absolute value of the temperature difference $\Delta T$ is larger than the set temperature difference $\Delta Tr$. As a result of the comparison in step S303, if the connection state of the coils 3 is the Y connection and the absolute value of the temperature difference $\Delta T$ is larger than the set temperature difference $\Delta Tr$, the process proceeds to step S131 in FIG. 11 in order to switch to the delta connection, and steps S131 through S135 described above are performed.

In this case, step S131 in FIG. 11 corresponds to a step of increasing the rotation speed of the motor 1 to the second rotation speed higher than the first rotation speed (i.e., the set rotation speed N0) at a time when the temperature difference $\Delta T$ becomes larger than the set temperature difference $\Delta Tr$. Steps S132 through S135 are as described above.

If the connection state of the coils 3 is the delta connection and the absolute value of the temperature difference $\Delta T$ is larger than the set temperature difference $\Delta Tr$, or if the connection state of the coils 3 is the Y connection and the absolute value of the temperature difference $\Delta T$ is less than or equal to the set temperature difference $\Delta Tr$, determination results in steps S302 and S303 are both NO, and thus the process returns to step S105. Steps S109 through S111 are as described above with reference to FIG. 9.

As described above, in the example shown in FIG. 15, if the absolute value of the temperature difference $\Delta T$ between the indoor temperature Ta and the set temperature Ts is less than or equal to the set temperature difference $\Delta Tr$ (i.e., if the air-conditioning load is small), the motor 1 is operated in the Y connection that achieves high efficiency. If the absolute value of the temperature difference $\Delta T$ is larger than the set temperature difference $\Delta Tr$ (i.e., if the air-conditioning load is large), the motor is operated 1 in the delta connection that enables coping with a larger load. Accordingly, the operation efficiency of the air conditioner 5 can be enhanced.

In particular, fluctuation in temperature is small in a short time period, and thus whether or not to perform connection switching can be determined in a short time period. Accordingly, it is possible to promptly cope with a rapid load change as in the case where a window of the room is opened, for example. Thus, comfort provided by the air conditioner 5 can be enhanced.

Steps S301 and S302 shown in FIG. 15 can also be referred to as a step of receiving a signal as a trigger for switching from the delta connection to the Y connection. Similarly, steps S301 and S303 can also be referred to as a step of receiving a signal as a trigger for switching from the Y connection to the delta connection.

(Connection Switching Based on Motor Efficiency)

Figure 16:
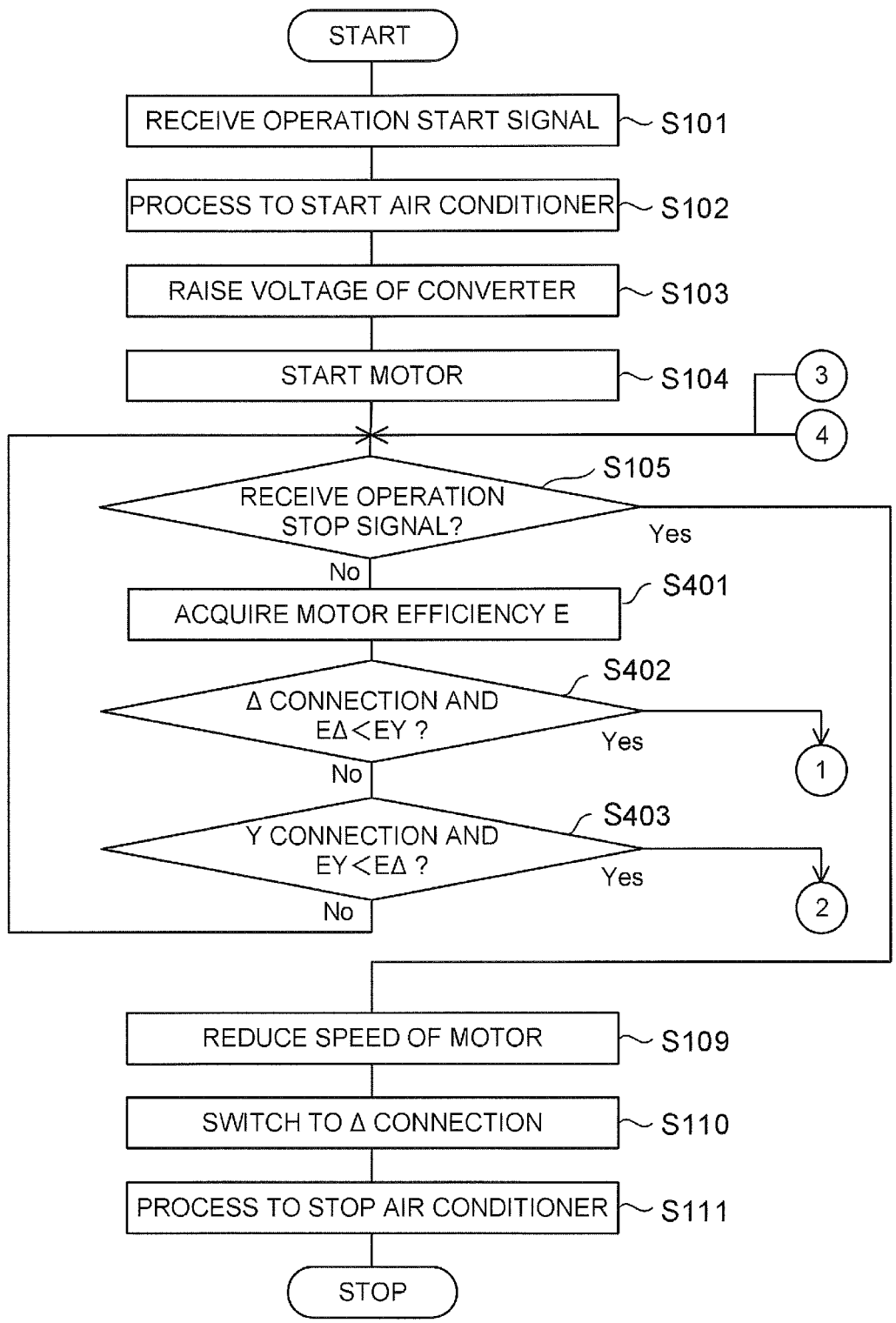
FIG. 16 is a flowchart showing still another example of the basic operation of the air conditioner according to the first embodiment.

FIG. 16 is a flowchart showing an operation to perform connection switching based on a motor efficiency (i.e., efficiency of the motor 1). In this example, the controller 50 previously stores a relationship between a current value (corresponding to the rotation speed of the motor 1) and a motor efficiency for each of the cases of the Y connection and the delta connection. The relationship is stored as a graph, for example.

Processes in steps S101 through S105 in FIG. 16 are similar to those in steps S101 through S105 shown in FIG. 9. In step S401, the controller 50 acquires the motor efficiency from the previously stored relationship, based on the current value detected by the current sensor 108.

Subsequently, based on the motor efficiency, the controller 50 determines whether or not to switch the connection state of the coils 3 from the delta connection to the Y connection. That is, the controller 50 determines whether the connection state of the coils 3 is the delta connection and the motor efficiency (represented as $E_\Delta$) acquired in step S401 is lower than a motor efficiency (represented as $E_Y$) at the same rotation speed in the Y connection (step S402).

As a result of the comparison in step S402, if the connection state of the coils 3 is the delta connection, and the motor efficiency $E_\Delta$ in the delta connection is lower than the motor efficiency $E_Y$ in the Y connection ($E_\Delta<E_Y$), the process proceeds to step S121 in FIG. 10 in order to switch to the Y connection, and steps S121 through S124 described above are performed.

In this case, step S121 in FIG. 10 corresponds to a step of reducing the rotation speed of the motor 1 to the third rotation speed lower than the first rotation speed (i.e., the set rotation speed N0) at a time when the temperature efficiency $E_\Delta$ becomes lower than the motor efficiency $E_Y$. Steps S122 through S124 are as described above.

As a result of the comparison in step S402, if the connection state of the coils 3 is not the delta connection, or if the motor efficiency $E_\Delta$ in the delta connection is larger than or equal to the motor efficiency $E_Y$ in the Y connection, the process proceeds step S403.

In step S403, it is determined whether the connection state of the coils 3 is the Y connection and the motor efficiency $E_Y$ acquired in step S105 is lower than the motor efficiency $E_\Delta$ at the same rotation speed in the delta connection.

As a result of the comparison in step S403, if the connection state of the coils 3 is the Y connection and the motor efficiency $E_Y$ in the Y connection is lower than the motor efficiency $E_\Delta$ in the delta connection ($E_Y<E_\Delta$), the process proceeds to step S131 in FIG. 11 in order to switch to the delta connection, and steps S131 through S135 described above are performed.

In this case, step S131 in FIG. 11 corresponds to a step of increasing the rotation speed of the motor 1 to the second rotation speed higher than the first rotation speed (i.e., the set rotation speed N0) at a time when the temperature efficiency $E_Y$ becomes lower than the motor efficiency $E_\Delta$. Steps S132 through S135 are as described above.

If the connection state of the coils 3 is the delta connection and the motor efficiency $E_\Delta$ is larger than or equal to the motor efficiency $E_Y$, or if the connection state of the coils 3 is the Y configuration and the motor efficiency $E_Y$ is larger than or equal to the motor efficiency $E_\Delta$, determination results in steps S402 and S403 are both NO, and thus the process returns to step S105. Steps S109 through S111 are as described above with reference to FIG. 9.

As described above, in the example shown in FIG. 16, the motor efficiency $E_Y$ in the Y connection and the motor efficiency $E_\Delta$ in the delta connection are compared, and a connection state in which a higher motor efficiency is obtained is selected. Thus, the motor 1 can be always driven in the connection state in which a high motor efficiency is obtained, and the operation efficiency of the air conditioner 5 can be enhanced.

(Connection Switching Based on Output Voltage of Inverter)

Figure 17:
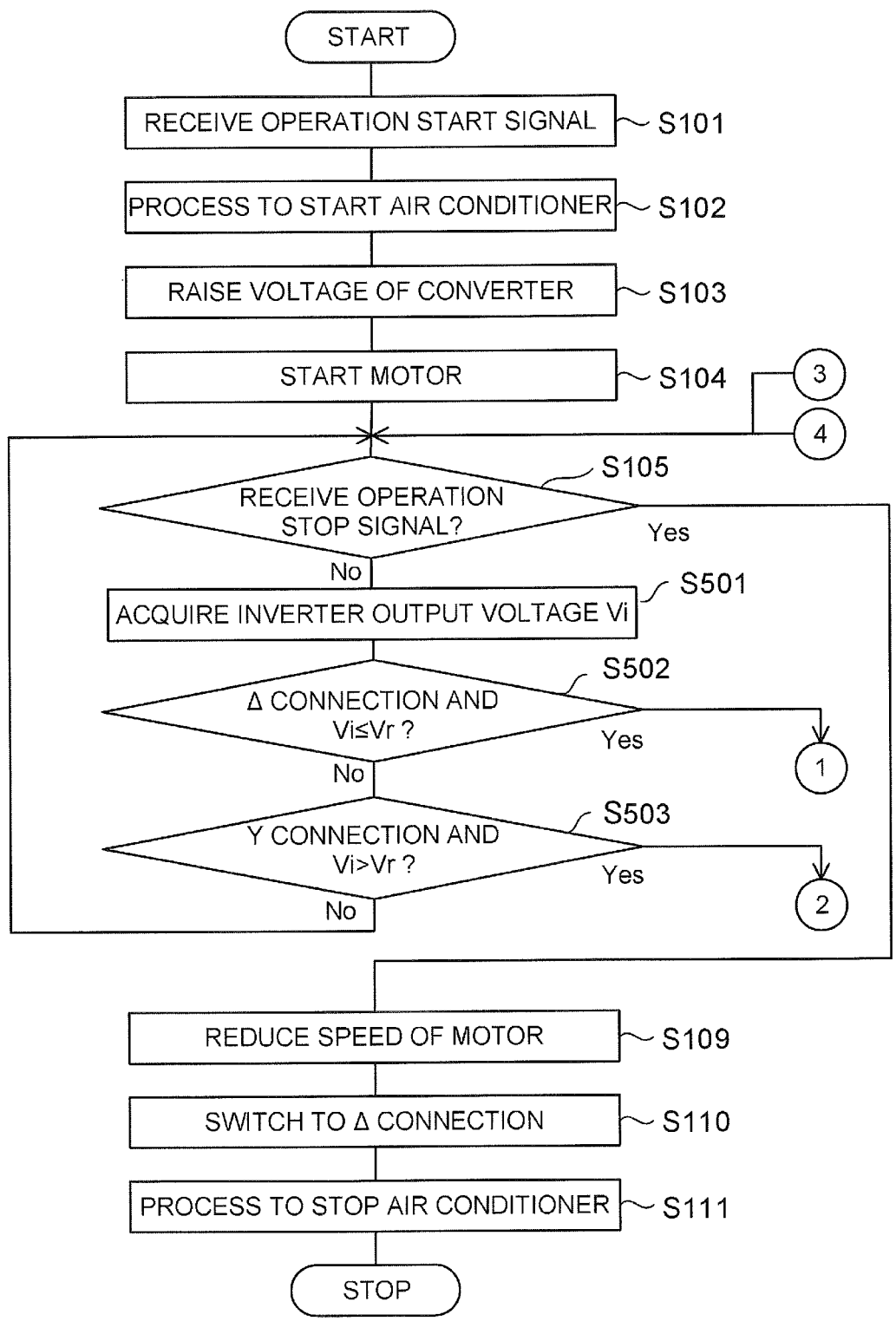
FIG. 17 is a flowchart showing yet another example of the basic operation of the air conditioner according to the first embodiment.

FIG. 17 is a flowchart showing an operation to perform connection switching based on an output voltage of the inverter 103. The output voltage of the inverter 103 is determined by the inverter output voltage instruction value calculated by the controller 50 based on the temperature difference ΔT between the indoor temperature Ta and the set temperature Ts. Thus, the controller 50 can obtain the output voltage of the inverter 103 based on the inverter output voltage instruction value calculated by the controller 50 itself.

Processes in steps S101 through S105 in FIG. 17 are similar to those in steps S101 through S105 in FIG. 9. In step S501, the controller 50 acquires an output voltage of the inverter 103 (referred to as an inverter output voltage Vi) based on the inverter output voltage instruction value calculated by the controller 50.

Subsequently, the controller 50 compares the inverter output voltage Vi acquired in step S501 with a set voltage Vt, and determines whether or not to switch the connection state of the coils 3 from the delta connection to the Y connection. Since the inverter output voltage is controlled by the controller 50 based on the temperature difference ΔT between the indoor temperature Ta and the set temperature Ts, the inverter output voltage corresponds to an air-conditioning load. The set voltage (threshold) Vt is an inverter output voltage corresponding to an air-conditioning load which is small enough to allow switching to the Y connection.

Specifically, it is first determined whether the connection state of the coils 3 is the delta connection and the inverter output voltage Vi is lower than or equal to the set voltage Vt (step S502).

As a result of the comparison in step S502, if the connection state of the coils 3 is the delta connection and the inverter output voltage Vi is lower than or equal to the set voltage Vt (Vi≤Vt), the process proceeds to step S121 in FIG. 10 in order to switch to the Y connection, and steps S121 through S124 described above are performed.

In this case, step S121 in FIG. 10 corresponds to a step of reducing the rotation speed of the motor 1 to the third rotation speed lower than the first rotation speed (i.e., the set rotation speed N0) at a time when the inverter output voltage Vi becomes lower than or equal to the set voltage Vt. Steps S122 through S124 are as described above.

As a result of the comparison in step S502 described above, if the connection state of the coils 3 is not the delta connection or if the inverter output voltage Vi is higher than the set voltage Vt, the process proceeds to step S503.

In step S503, it is determined whether the connection state of the coils 3 is the Y connection and the inverter output voltage Vi is higher than the set voltage Vt (Vi>Vt). As a result of the comparison in step S503, if the inverter output voltage Vi is higher than the set voltage Vt, the process proceeds to step S131 in FIG. 11 in order to switch to the delta connection, and steps S131 through S135 described above are performed.

In this case, step S131 in FIG. 11 corresponds to a step of increasing the rotation speed of the motor 1 to the second rotation speed higher than the first rotation speed (i.e., the set rotation speed N0) at a time when the inverter output voltage Vi becomes higher than the set voltage Vt. Steps S132 through S135 are as described above.

If the connection state of the coils 3 is the delta connection and the inverter output voltage Vi is higher than the set voltage Vt, or if the connection state of the coils 3 is the Y connection and the inverter output voltage Vi is lower than or equal to the set voltage Vt, determination results in steps S502 and S503 are both NO, and the process returns to step S105. Steps S109 through S111 are as described above with reference to FIG. 9.

As described above, in the example shown in FIG. 17, if the inverter output voltage Vi is lower than or equal to the set voltage Vt (i.e., if the air-conditioning load is small), the motor 1 is operated in the Y connection that achieves high efficiency. If the inverter output voltage Vi is higher than the set voltage Vt (i.e., if the air-conditioning load is large), the motor 1 is operated in the delta connection that enables coping with a larger load. Accordingly, the operation efficiency of the air conditioner 5 can be enhanced.

(Connection Switching Based on Start of Field-Weakening Control)

Figure 18:
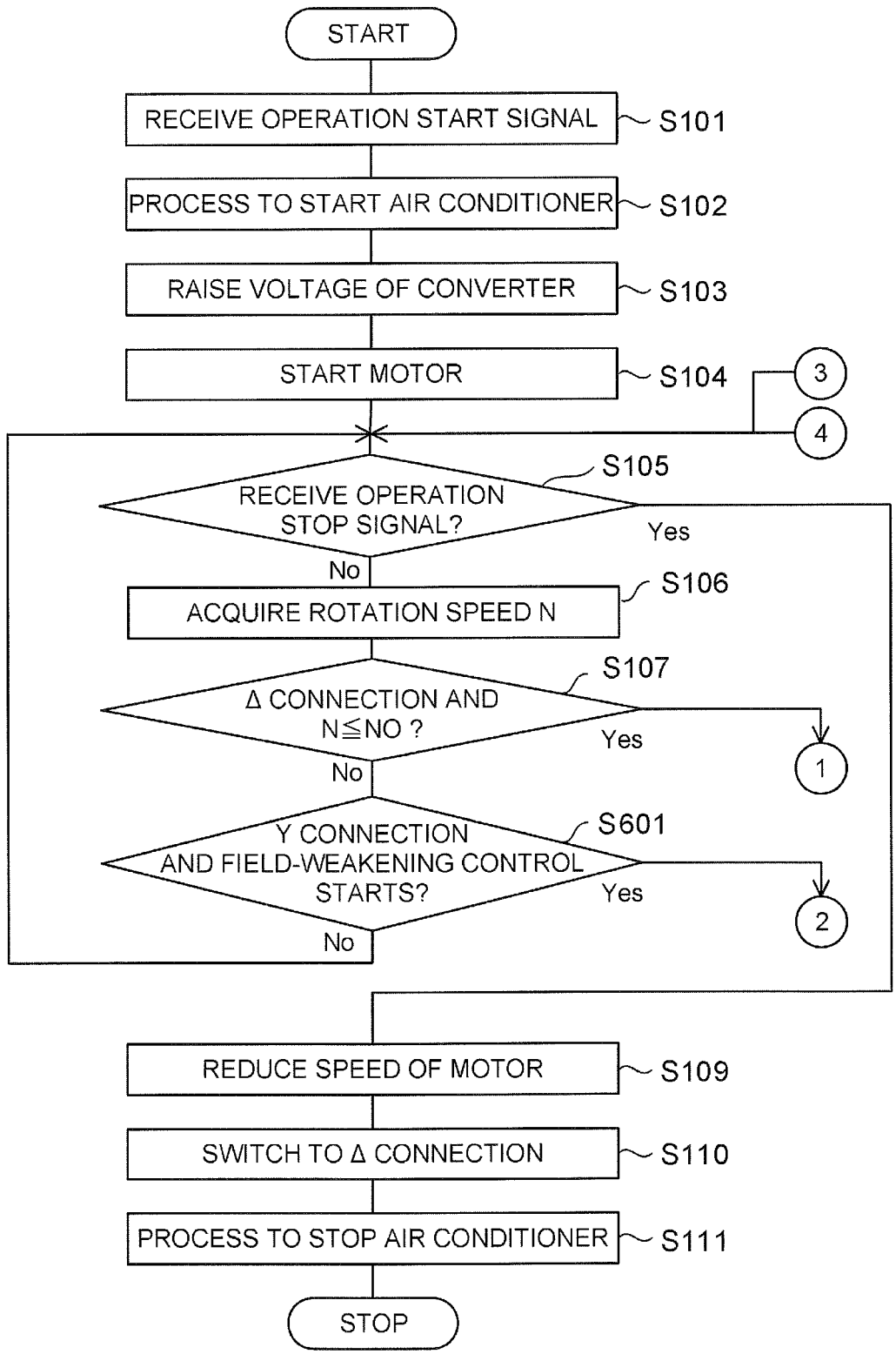
FIG. 18 is a flowchart showing further example of the basic operation of the air conditioner according to the first embodiment.

FIG. 18 is a flowchart showing an operation to perform connection switching based on start of field-weakening control by the inverter 103. A line voltage output from the inverter 103 increases as the rotation speed of the motor 1 increases, and when the line inverter reaches the inverter maximum output, the line voltage does not increase any more. Thus, when the rotation speed of the motor 1 further increases, the inverter 103 starts field-weakening control.

In the field-weakening control, the induced voltage is weakened by causing a current in a d-axis phase (in a direction to cancel magnetic fluxes of the permanent magnets 25) to flow in the coils 3. Since it is necessary to allow a weakening current to flow in addition to a usual current for generating the motor torque, a copper loss caused by the resistance of the coils 3 increases, and a conduction loss of the inverter 103 also increases. That is, when the field-weakening control is started, the motor efficiency decreases.

In the example shown in FIG. 18, when the field-weakening control is started, connection switching from the Y connection to the delta connection is performed. Switching from the delta connection to the Y connection may be performed in any one of the methods shown in FIGS. 9, and 15 through 18 (for example, the method shown in FIG. 9 in this example).

Processes in steps S101 through S105 in FIG. 18 are similar to those in steps S101 through S105 in FIG. 9. In step S106, the rotation speed of the motor 1 is acquired. In step S107, the rotation speed N of the motor 1 is compared with the set rotation speed N0, and it is determined whether or not to switch the connection state of the coils 3 from the Y connection to the delta connection.

In step S601, it is determined whether the connection state of the coils 3 is the Y connection and the field-weakening control is started. As a result of the comparison in step S601, if the connection state of the coils 3 is the Y configuration and the field-weakening control is started, the process proceeds to step S131 in FIG. 11 in order to switch to the delta connection, and steps S131 through S135 described above are performed.

In this case, step S131 in FIG. 11 corresponds to a step of increasing the rotation speed of the motor 1 to the second rotation speed higher than the first rotation speed at a time when the field-weakening control is started. Steps S132 through S135 are as described above.

If the connection state of the coils 3 is the delta connection and the rotation speed N of the motor 1 is higher than the set rotation speed N0, or if the connection state of the coils 3 is the Y connection and the field-weakening control is not started, determination results in steps S107 and S601 are both NO, and thus the process returns to step S105. Steps S109 through S111 are as described above with reference to FIG. 9.

As described above, in the example shown FIG. 18, if the connection state of the coils 3 is the Y connection and the field-weakening control is performed, that is, if the air-conditioning load is large and high-speed rotation is needed, the motor 1 can be operated in the delta connection that enables coping with a larger load.

As described above, switching of the connection state of the coils 3 is performed based on one of the rotation speed N of the motor 1 (FIG. 9), the temperature difference $\Delta T$ between the indoor temperature Ta and the set temperature Ts (FIG. 15), the motor efficiency $E_A/E_Y$ in accordance with the connection state (FIG. 16), the inverter output voltage Vi (FIG. 17), or whether the field-weakening control is started or not (FIG. 18). Thus, the motor 1 can be operated in the connection state of the coils 3 suitable for the air-conditioning load.

(Switching of Bus Voltage in Accordance with Connection State of Coils)

Next, description will be made of the weakening field control by the inverter and the raising of the bus voltage by the converter. In general, household air conditioners are subject to Energy Conservation Act, and it is mandatory to reduce $CO_2$ emissions from the viewpoint of global environments. With the advance of technology, compression efficiency of compressors, operation efficiency of motors of the compressors, heat transfer coefficient of heat exchangers and the like have been improved, a coefficient of performance (COP) of energy consumption efficiency of the air conditioners has been increased year by year, and running costs (power consumption) and $CO_2$ emissions of the air conditioners have also been reduced.

The COP is used for evaluating performance of operation under a certain temperature condition, and an operating condition of the air conditioner for each season is not taken into consideration. However, when the air conditioner is actually used, capacity and power consumption necessary for heating or cooling change with a change in outdoor air temperature. Thus, in order to perform evaluation in a state close to actual use, an annual performance factor (APF) is used as an index of energy saving. The APF is efficiency obtained by determining a certain model case, and calculating a total load and a total electric power consumption throughout the year.

In particular, in the inverter motor, which is a current mainstream, the capacity varies depending on the rotation speed of the compressor, and thus there is a problem in performing evaluation close to actual use only under the rated condition.

The APF of a household air conditioner is obtained by calculating a power consumption amount in accordance with annual total load at five evaluation points: a rated cooling condition, an intermediate cooling condition, a rated heating condition, an intermediate heating condition, and a low heating temperature. As the calculated value is larger, energy saving performance is evaluated to be higher.

As a breakdown of the annual total load, the ratio of the intermediate heating condition is very large (50%), and the ratio of the rated heating condition is the next largest (25%). Thus, in order to enhance energy saving performance of air conditioners, it is effective to increase the motor efficiency under the intermediate heating condition and the rated heating condition. Thus, in the following description, the intermediate heating condition and the rated heating condition will be mainly described (FIGS. 19 through 29).

The rotation speed of a motor of a compressor under evaluation load conditions of the APF varies depending on a capacity of an air conditioner and performance of a heat exchanger. For example, in a household air conditioner having a refrigeration capacity of 6.3 kW, a rotation speed N1 (first rotation speed) under the intermediate heating condition is 35 rps, and a rotation speed N2 (second rotation speed) under the rated heating condition is 85 rps.

The motor 1 is intended to obtain high motor efficiency and high motor torque at the rotation speed N1 corresponding to the intermediate heating condition and the rotation speed N2 corresponding to the rated heating condition. That is, out of the two load conditions for which performance is to be improved, the rotation speed at a low-speed side is N1 and the rotation speed at a high-speed side is N2.

In the motor 1 in which the permanent magnets 25 are mounted on the rotor 20, when the rotor 20 rotates, the magnetic fluxes of the permanent magnets 25 interlink with the coils 3 of the stator 10, and an induced voltage is generated in the coils 3. The induced voltage is proportional to the rotation speed (rotation velocity) of the rotor 20 and is also proportional to the number of turns of each coil 3. As the rotation speed of the motor 1 increases and the number of turns of the coil 3 increases, the induced voltage increases.

The line voltage (inverter voltage, or motor voltage) output from the inverter 103 is equal to a sum of the induced voltage and a voltage generated by a resistance and an inductance of the coils 3. The resistance and the inductance of the coils 3 are negligibly small as compared with the induced voltage, and thus the line voltage is practically dominated by the induced voltage. A magnet torque of the motor 1 is proportional to the product of the induced voltage and a current flowing through the coils 3.

As the number of turns of the coil 3 increases, the induced voltage increases. Thus, as the number of turns of the coil 3 increases, a current for generating a necessary magnet torque decreases. Consequently, a conduction loss of the inverter 103 can be reduced, and the operation efficiency of the motor 1 can be enhanced. Meanwhile, since the induced voltage increases, the line voltage dominated by the induced voltage reaches an inverter maximum output voltage (i.e., a bus voltage supplied from the converter 102 to the inverter 103) at a lower rotation speed, and the rotation speed cannot be increased higher than that.

Further, when the number of turns of the coil 3 is reduced, the induced voltage decreases and the line voltage dominated by the induced voltage does not reach the inverter maximum output voltage even at a higher rotation speed, and high-speed rotation is made possible. However, since the induced voltage decreases, the current for generating the necessary magnet torque increases, and thus the conduction loss of the inverter 103 increases, so that operation efficiency of the motor 1 decreases.

Further, from the viewpoint of the switching frequency of the inverter 103, a harmonic component caused by an ON/OFF duty of switching of the inverter 103 decreases as the line voltage is closer to the inverter maximum output voltage, and thus an iron loss caused by the high harmonic component of the current can be reduced.

Figure 19:
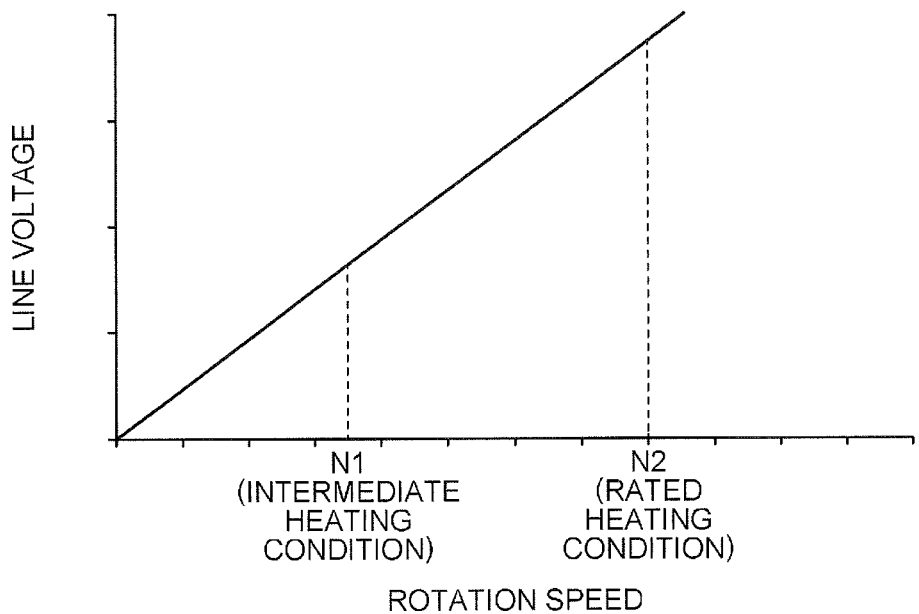
FIG. 19 is a graph showing a relationship between a line voltage and a rotation speed in a case where the coils are connected in the Y connection in the motor.
Figure 20:
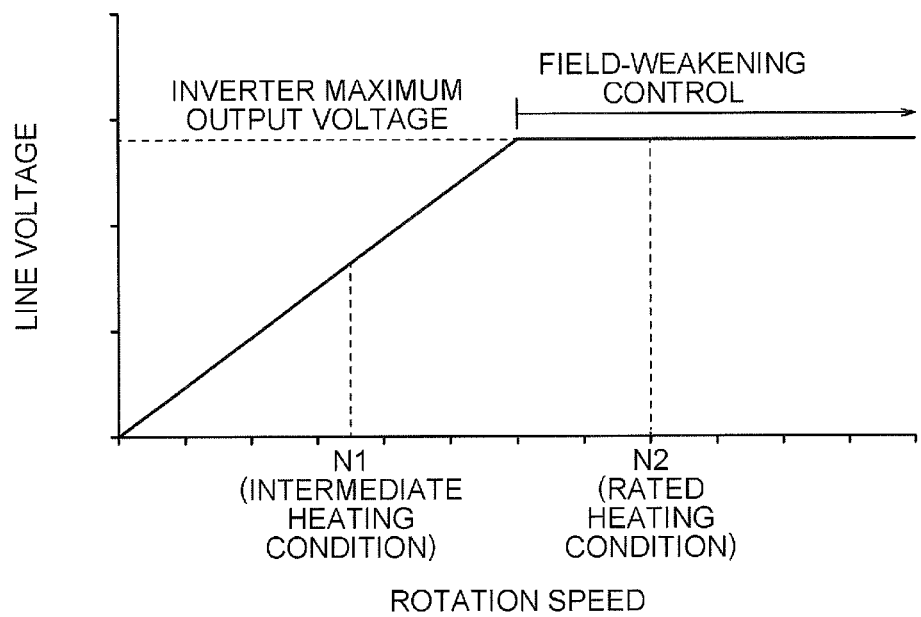
FIG. 20 is a graph showing a relationship between the line voltage and the rotation speed of the motor in a case where the coils are connected in the Y connection and field-weakening control is performed.

FIGS. 19 and 20 are graphs each showing a relationship between the line voltage and the rotation speed in the motor 1. The connection state of the coils 3 is the Y connection. The line voltage is proportional to the product of a field magnetic field and a rotation speed. If the field magnetic field is constant, the line voltage and the rotation speed are proportional as shown in FIG. 19. In this regard, in FIG. 19, the rotation speed N1 corresponds to the intermediate heating condition, and the rotation speed N2 corresponds to the rated heating condition.

The line voltage increases as the rotation speed increases. However, as shown in FIG. 20, when the line voltage reaches the inverter maximum output voltage, the line voltage cannot be increased higher than that, and thus field-weakening control by the inverter 103 is started. In FIG. 20, it is assumed that the field-weakening control is started at a rotation speed between the rotation speeds N1 and N2.

In the field-weakening control, the induced voltage is weakened by causing a current having a d-axis phase (in a direction of canceling magnetic fluxes of the permanent magnets 25) to flow in the coils 3. This current will be referred to as a weakening current. Since the weakening current is needed to flow in addition to a usual current for generating motor torque, a copper loss due to the resistance of the coils 3 increases, and the conduction loss of the inverter 103 also increases.

Figure 21:
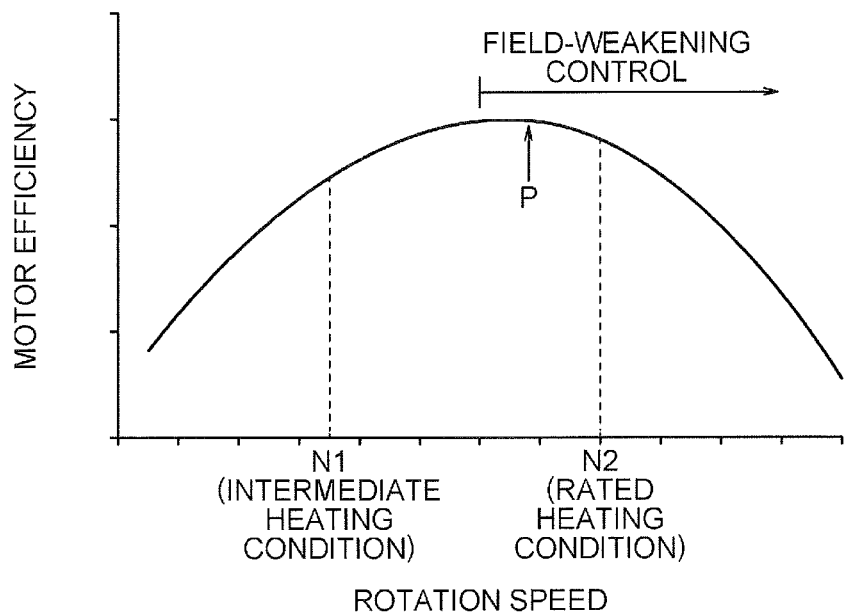
FIG. 21 is a graph showing a relationship between a motor efficiency and a rotation speed in a case where the field-weakening control shown in FIG. 20 is performed.

FIG. 21 is a graph showing a relationship between the motor efficiency and the rotation speed in a case where the field-weakening control shown in FIG. 20 is performed. As shown in FIG. 21, the motor efficiency increases as the rotation speed increases, and immediately after the field-weakening control starts, the motor efficiency reaches its peak as indicated by an arrow P.

When the rotation speed further increases, the weakening current flowing in the coils 3 also increases, and thus the copper loss increases accordingly so that the motor efficiency decreases. In the overall efficiency that is the product of the motor efficiency and the inverter efficiency, a change represented by a curve similar to that in FIG. 21 is observed.

Figure 22:
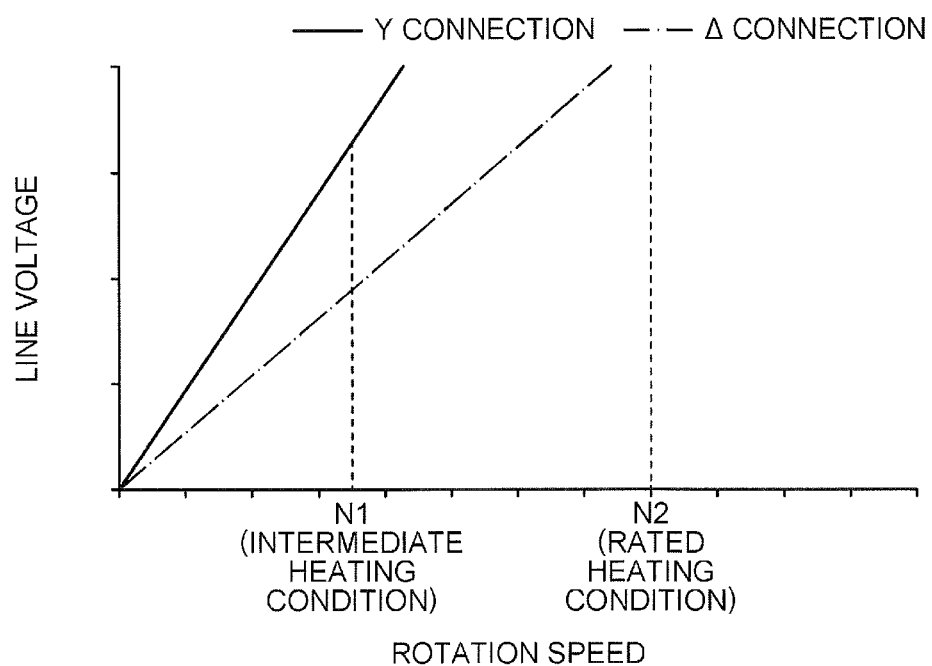
FIG. 22 is a graph showing relationships between the line voltage and the rotation speed in a case where the connection state of the coils is the Y connection and in a case where the connection state of the coils is the delta connection.

FIG. 22 is a graph showing relationships between the line voltage and the rotation speed for the Y connection and the delta connection. In a case where the connection state of the coils 3 is the delta connection, a phase impedance of the coils 3 is $1/\sqrt{3}$ times as large as a phase impedance in a case where the connection state of the coils 3 is the Y connection, suppose that the number of turns is the same in both cases. Thus, a line voltage (chain line) in the case where the connection state of the coils 3 is the delta connection is $1/\sqrt{3}$ times as high as a line voltage (solid line) in the case where the connection state of the coils 3 is the Y connection, suppose that the rotation speed is the same in both cases.

That is, when the coils 3 are connected in the delta connection, if the number of turns is made $\sqrt{3}$ times as large as the number of turns in the case of the Y connection, the line voltage (motor voltage) is equivalent to that in the case of the Y connection for the same rotation speed N. Thus, an output current of the inverter 103 is also equivalent to that in the case of the Y connection.

In motors in which the number of turns around each tooth is several tens or more, the Y connection is more often used than the delta connection for the following reasons. One reason is that the number of turns of each coil in the delta connection is larger than that in the Y connection, and thus the time necessary for winding the coils is longer in a manufacturing process. Another reason is that there is a possibility that a circulating current may occur in the case of the delta connection.

In general, in a motor employing the Y connection, the number of turns of the coil is adjusted so that the line voltage (motor voltage) reaches the inverter maximum output voltage at the rotation speed N2 (i.e., the rotation speed at the high-speed side of the rotation speeds for which performance is to be enhanced). In this case, however, the motor is operated with the line voltage lower than the inverter maximum output voltage at the rotation speed N1 (i.e., the rotation speed at the low-speed side of the rotation speeds for which performance is to be enhanced), and thus it is difficult to obtain high motor efficiency.

Thus, the connection state of the coils is set to the Y-connection, the number of turns is adjusted so that the line voltage reaches the inverter maximum output voltage at a rotation speed slightly lower than the rotation speed N1, and control is performed to switch the connection state of the coils to the delta connection before the motor reaches the rotation speed N2.

Figure 23:
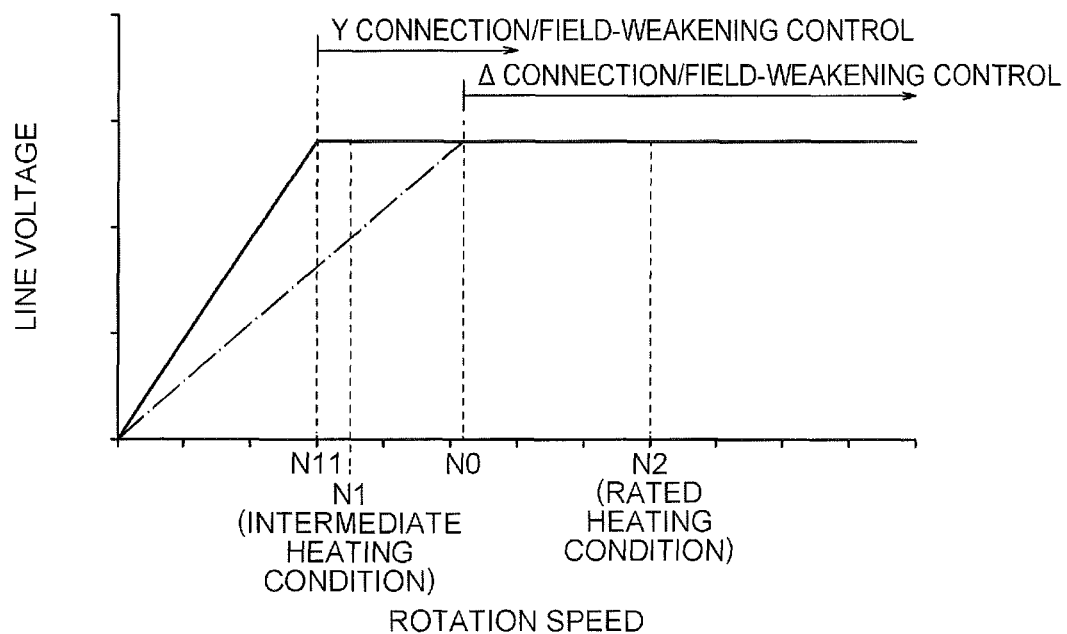
FIG. 23 is a graph showing a relationship between the line voltage and the rotation speed in a case where switching from the Y connection to the delta connection is performed.

FIG. 23 is a graph showing a relationship between the line voltage and the rotation speed in the case where switching from the Y connection to the delta connection is performed. In the example shown in FIG. 23, when the rotation speed reaches a rotation speed (hereinafter referred to as a rotation speed N11) slightly lower than the rotation speed N1 (intermediate heating condition), the field-weakening control is started. When the rotation speed N further increases and reaches a rotation speed N0 (threshold, or set rotation speed), switching from the Y connection to the delta connection is performed. Here, the rotation speed N11 is 5% lower than the rotation speed N1 (i.e., N11=N1×0.95).

By switching to the delta connection, the line voltage decreases to be $1/\sqrt{3}$ times as high as that in the Y connection, and thus the degree of field-weakening can be reduced (i.e., the weakening current can be reduced). Accordingly, a copper loss due to the weakening current can be reduced, and decreases in motor efficiency and motor torque can be suppressed.

Figure 24:
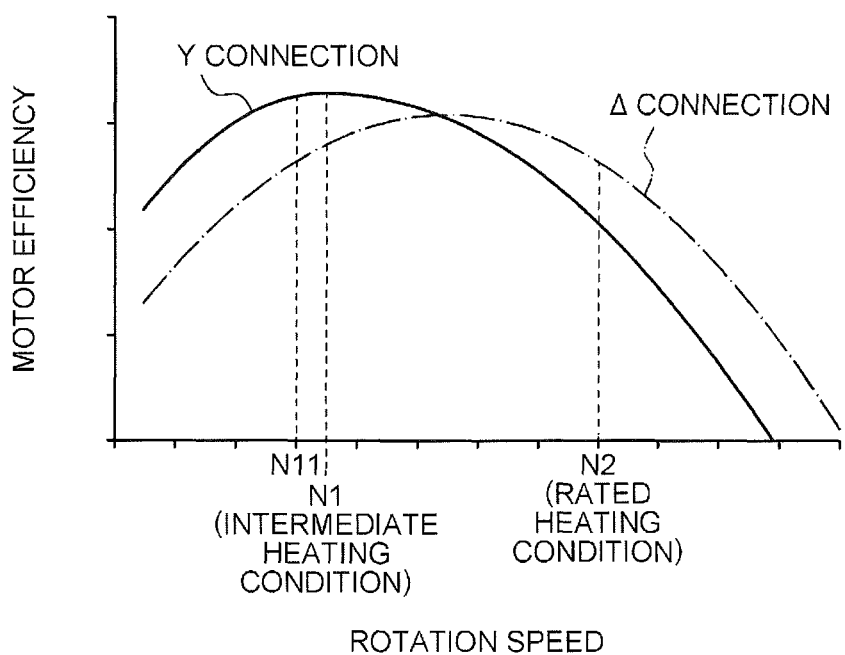
FIG. 24 is a graph showing relationships between the motor efficiency and the rotation speed in the case where the connection state of the coils is the Y connection and in the case where the connection state of the coils is the delta connection.

FIG. 24 is a graph showing relationships between the motor efficiency and the rotation speed for the Y connection and the delta connection. As described above, the connection state of the coils 3 is the Y connection and the number of turns is adjusted so that the line voltage reaches the inverter maximum output voltage at the rotation speed N11 slightly lower than the rotation speed N1. Thus, as indicated by the solid line in FIG. 24, high motor efficiency can be obtained at the rotation speed N1.

Meanwhile, in the case of the delta connection, the motor efficiency higher than that in the Y connection can be obtained at the rotation speed N2 as indicated by the chain line in FIG. 24, suppose that the number of turns of the coil 3 is the same. Thus, by switching from the Y connection to the delta connection at an intersection of the solid line and the chain line shown in FIG. 24, the high motor efficiency can be obtained at both of the rotation speed N1 (intermediate heating condition) and the rotation speed N2 (rated heating condition).

Thus, as described with reference to FIG. 23, the connection state of the coils 3 is set to the Y connection, the number of turns is adjusted so that the line voltage reaches the inverter maximum output voltage at the rotation speed N11 (rotation speed slightly lower than the rotation speed N1), and control is performed to switch from the Y connection to the delta connection at the rotation speed N0 higher than the rotation speed N1.

However, the motor efficiency cannot be sufficiently enhanced by simply switching the connection state of the coils 3 from the Y connection to the delta connection. This will be described below.

Figure 25:
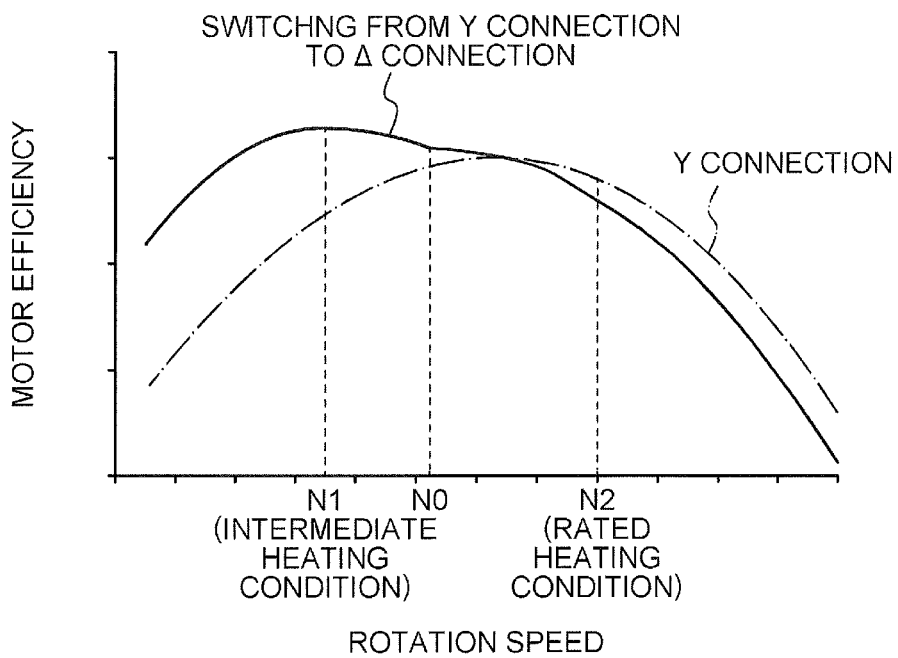
FIG. 25 is a graph showing a relationship between the motor efficiency and the rotation speed in a case where the connection state of the coils is the Y connection, the number of turns is adjusted so that the line voltage reaches an inverter maximum output voltage at a rotation speed slightly lower than that in an intermediate heating condition, and switching from the Y connection to the delta connection is performed.

FIG. 25 is a graph showing a relationship between the motor efficiency and the rotation speed in a case (solid line) where the connection state of the coils 3 is the Y connection, the number of turns is adjusted so that the line voltage reaches the inverter maximum output voltage at the rotation speed N11, and switching from the Y connection to the delta connection is performed at the rotation speed N0. The chain line shows a relationship between the motor efficiency and the rotation speed in a case where field-weakening control is performed while the connection state of the coils 3 is set to the Y-connection as shown in FIG. 21.

The line voltage is proportional to the rotation speed. For example, in a household air conditioner having a refrigeration capacity of 6.3 kW, the rotation speed N1 (intermediate heating condition) is 35 rps and the rotation speed N2 (rated heating condition) is 85 rps, and thus the line voltage in the rated heating condition is 2.4 times (=85/35) as high as the line voltage in the intermediate heating condition.

The line voltage in the rated heating condition (rotation speed N2) after the connection state of the coils 3 is switched to the delta connection is 1.4 times (=85/35/$\sqrt{3}$) as high as the inverter maximum output voltage. Since the line voltage cannot be made larger than the inverter maximum output voltage, the field-weakening control is started.

In the field-weakening control, the weakening current necessary for weakening the field flows in the coils 3, and thus the copper loss increases and the motor efficiency and the motor torque decrease. Consequently, as indicated by the solid line in FIG. 25, the motor efficiency in the rated heating condition (rotation speed N2) cannot be improved.

In order to reduce the degree of field-weakening (i.e., reduce the weakening current) in the rated heating condition (rotation speed N2), it is necessary to reduce a line voltage by reducing the number of turns of the coils 3. In this case, a line voltage in the intermediate heating condition (rotation speed N1) also decreases, and the improving effect of the motor efficiency by the connection switching decreases.

That is, if there are two load conditions for which performance is to be improved and the rotation speed N1 at the low-speed side and the rotation speed N2 at the high-speed side satisfy (N2/N1)>$\sqrt{3}$, the field-weakening control is necessary even when switching from the Y connection to the delta connection is performed. Thus, sufficient improving effect of the motor efficiency cannot be obtained by simply performing switching from the Y connection to the delta connection.

Thus, the driving device 100 according to the first embodiment switches the bus voltage of the converter 102 (step S123 in FIG. 10 and step S134 in FIG. 11), in addition to switching of the connection state of the coils 3 by the connection switching unit 60. The converter 102 is supplied with a power supply voltage (200 V) from the power source 101 and supplies the bus voltage to the inverter 103. The converter 102 is preferably constituted by an element exhibiting a small loss due to an increase in voltage (voltage raising), such as a SiC element or a GaN element.

Specifically, a bus voltage V1 (first bus voltage) when the connection state of the coils 3 is the Y connection is set to 280 V (DC). Meanwhile, a bus voltage V2 (second bus voltage) when the connection state of the coils 3 is the delta connection is set to 390 V (DC). That is, the bus voltage V2 in the case of the delta connection is set to 1.4 times as high as the bus voltage V1 in the case of the Y connection. In this regard, it is sufficient that the bus voltage V2 satisfies V2≥(V1/$\sqrt{3}$)×N2/N1 in relation to the bus voltage V1. The inverter 103 supplied with the bus voltage from the converter 102 supplies the line voltage to the coils 3. The inverter maximum output voltage is 1/$\sqrt{2}$ of the bus voltage.

Figure 26:
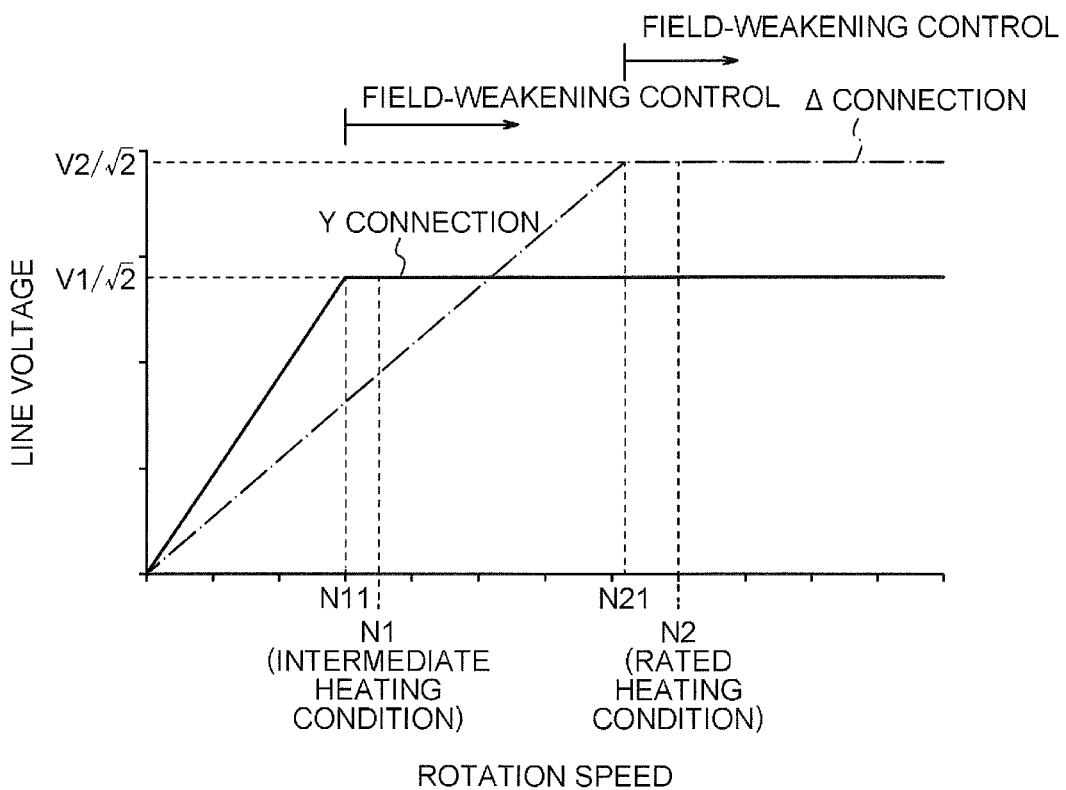
FIG. 26 is a graph showing a relationship between the line voltage and the rotation speed in a case where a bus voltage is switched by a converter.

FIG. 26 is a graph showing relationships between the line voltage and the rotation speed in a case where the bus voltage is switched by the converter 102 for the Y connection and the delta connection. As shown in FIG. 26, the line voltage (solid line) in the case where the connection state of the coils 3 is the Y connection is 1/$\sqrt{2}$ (i.e., V1×1/$\sqrt{2}$) of the bus voltage V1 at maximum. The line voltage (chain line) in the case where the connection state of the coils 3 is the delta connection is $1/\sqrt{2}$ (i.e., V2×$1/\sqrt{2}$) of the bus voltage V2 at maximum.

Figure 27:
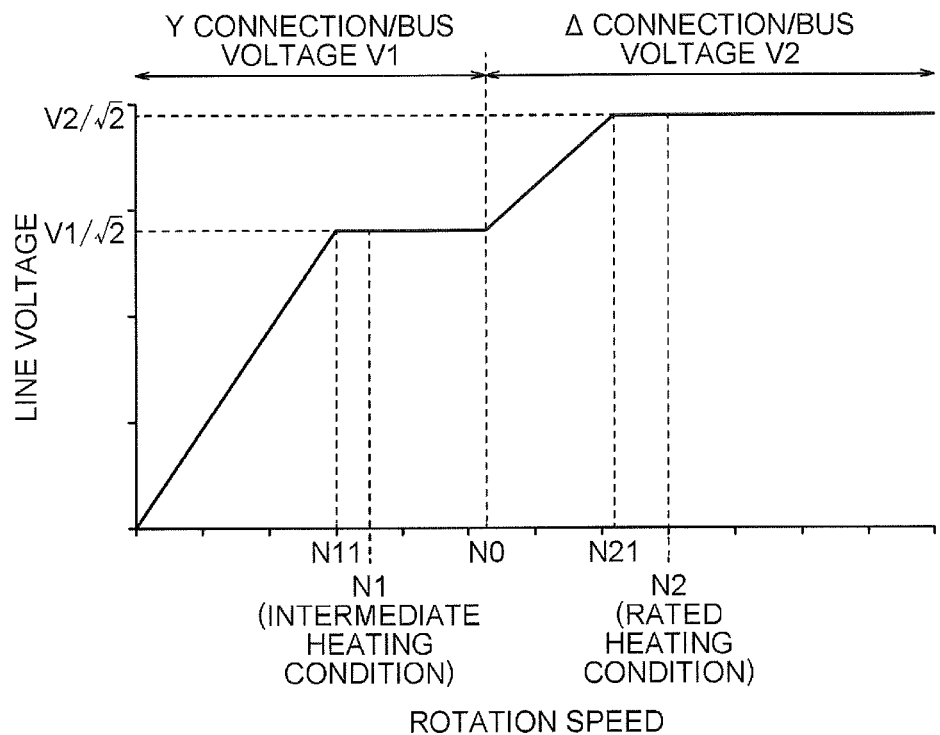
FIG. 27 is a graph showing a relationship between the line voltage and the rotation speed in a case where switching of the connection state of the coils and switching of the bus voltage of the converter are performed in the first embodiment.

FIG. 27 is a graph showing a relationship between the line voltage and the rotation speed in a case where the connection state is switched by the connection switching unit 60 and the bus voltage is switched by the converter 102. As shown in FIG. 27, in a rotation speed range including the rotation speed N1 (intermediate heating condition), the connection state of the coils 3 is the Y connection. As the rotation speed increases, the line voltage increases, and the line voltage reaches the inverter maximum output (V1×$1/\sqrt{2}$) at the rotation speed N11 slightly lower than the rotation speed N1. Thus, the field-weakening control is started.

When the rotation speed further increases to reach the rotation speed N0, the connection switching unit 60 switches the connection state of the coils 3 from the Y connection to the delta connection. At the same time, the converter 102 raises the bus voltage from V1 to V2. As the bus voltage is raised, the inverter maximum output becomes V2×$1/\sqrt{2}$. At this point of time, the line voltage is lower than the inverter maximum output, and thus the field-weakening control is not performed.

Thereafter, the line voltage increases as the rotation speed N increases, the line voltage reaches the inverter maximum output (V2×$1/\sqrt{2}$) at a rotation speed N21 slightly lower than the rotation speed N2 (rated heating condition), and the field-weakening control is started. In this regard, the rotation speed N21 is 5% lower than the rotation speed N2 (i.e., N21=N2×0.95).

In the first embodiment, the connection state of the coils 3 is switched based on the result of comparison between the rotation speed of the motor 1 and the threshold, as described above. The threshold is the set rotation speed N0 described above. Switching from the Y connection to the delta connection at the set rotation speed N0 corresponds to the switching from the Y connection to the delta connection shown in step S108 in FIG. 9 and steps S131 through S135 in FIG. 11.

Figure 28:
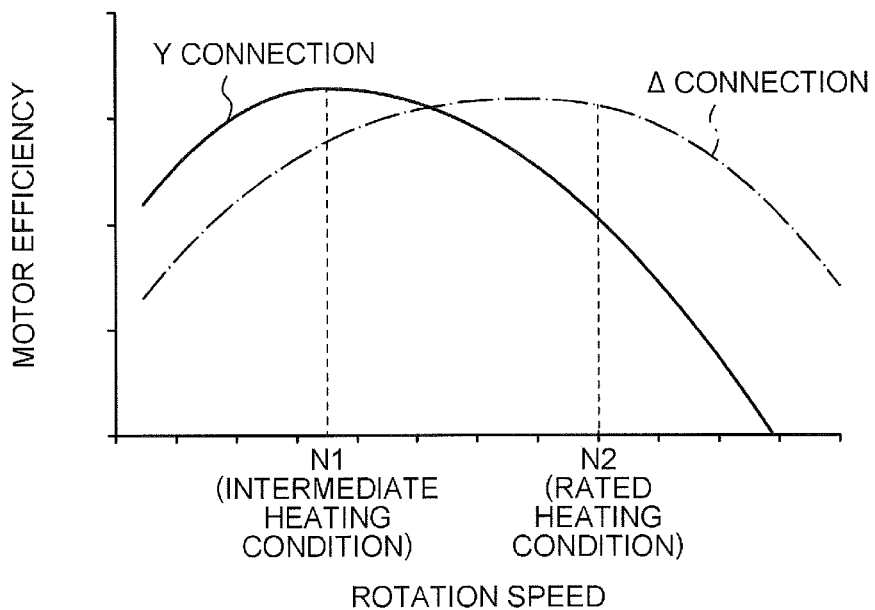
FIG. 28 is a graph showing relationships between the motor efficiency and the rotation speed in the case where the connection state of the coils is the Y connection and in the case where the connection state of the coils is the delta connection.

The improving effect of the motor efficiency in this case will be described. FIG. 28 is a graph showing relationships between the motor efficiency and the rotation speed for the Y connection and the delta connection. In FIG. 28, the motor efficiency (solid line) in the case where the connection state of the coils 3 is the Y connection is similar to the motor efficiency in the case of the Y connection shown in FIG. 24. Meanwhile, the motor efficiency (chain line) in the case where the connection state of the coils 3 is the delta connection is higher than the motor efficiency in the case of the delta connection shown in FIG. 24 because of an increase in the bus voltage of the converter 102.

Figure 29:
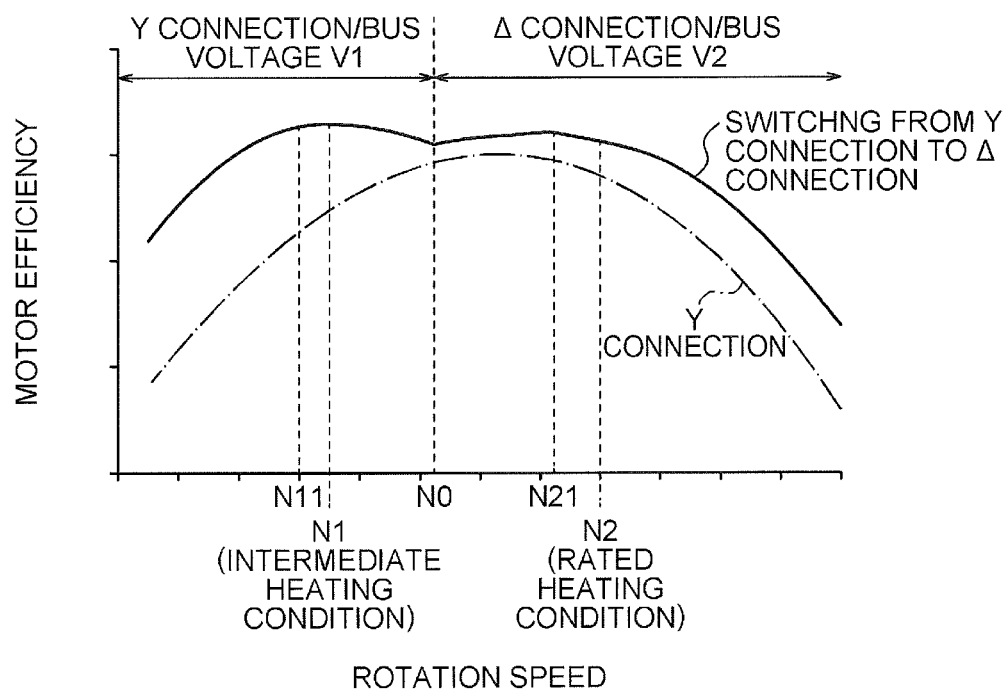
FIG. 29 is a graph showing a relationship between the motor efficiency and the rotation speed in a case where switching of the connection state of the coils and switching of the bus voltage of the converter are performed in the first embodiment.

FIG. 29 is a graph showing a relationship between the motor efficiency and the rotation speed in a case where the connection state is switched by the connection switching unit 60 and the bus voltage is switched by the converter 102. Since the connection state of the coils 3 is the Y connection and the number of turns is set so that the line voltage reaches the inverter maximum output voltage at the rotation speed N11 (rotation speed slightly lower than the rotation speed N1), high motor efficiency can be obtained in a rotation speed range including the rotation speed N1.

When the rotation speed reaches the rotation speed N11, the field-weakening control is started. When the rotation speed then reaches the rotation speed N0, the connection state of the coils 3 is switched from the Y connection to the delta connection, and the bus voltage is raised by the converter 102.

Since the inverter maximum output voltage increases with an increase in the bus voltage, the line voltage becomes lower than the inverter maximum output voltage, and accordingly the field-weakening control is stopped. As the field-weakening control is stopped, a copper loss caused by the weakening current is reduced, and thus the motor efficiency increases.

Thereafter, when the rotation speed N reaches the rotation speed N21 slightly lower than the rotation speed N2 (rated heating condition), the line voltage reaches the inverter maximum output voltage, and the field-weakening control is started. Although the copper loss increases as a result of start of the field-weakening control, high motor efficiency can be obtained since the bus voltage has been raised by the converter 102.

That is, as indicated by the solid line in FIG. 29, high motor efficiency can be obtained at both of the rotation speed N1 (intermediate heating condition) and the rotation speed N2 (rated heating condition).

In this regard, when the voltage of the converter 102 is raised, a loss due to the raising of the voltage occurs. Thus, in the connection state under the intermediate heating condition (i.e., Y connection) where a contribution ratio to the motor efficiency is the highest, it is preferable to use the power supply voltage without raising. The power supply voltage of the power source 101 is 200 V (effective value), and the maximum value is 280 V (=200V×$\sqrt{2}$). Accordingly, it can be said that the bus voltage (280 V) of the converter 102 in the case of the Y connection is the same as the maximum value of the power supply voltage.

Further, switching of the bus voltage supplied to the inverter 103 may be performed by raising or lowering the power supply voltage.

Further, in the operation control of the air conditioner 5 described above, the Y connection is set for the rotation speed N1 (intermediate heating condition) and the delta connection is set for the rotation speed N2 (rated heating condition). However, if no specific load condition is determined, the voltage level may be adjusted so that the rotation speed N1 is the maximum rotation speed during the operation in the Y connection and the rotation speed N2 is the maximum rotation speed during the operation in the delta connection. With such control, the efficiency of the motor 1 can be enhanced.

As described above, in the household air conditioner 5, the efficiency of the motor 1 can be enhanced by setting the rotation speed N1 at the rotation speed in the intermediate heating condition and the rotation speed N2 at the rotation speed in the rated heating condition.

It is difficult to detect an air-conditioning load accurately at the start of the operation of the air conditioner 5. Thus, in the first embodiment, the connection state of the coils 3 at the start of the motor 1 is set to the delta connection that enables coping with a larger air-conditioning load (see steps S110 and S102 in FIG. 9). Accordingly, the temperature difference ΔT between the indoor temperature Ta and the set temperature Ts can be converted in a shorter time period.

(Advantages of First Embodiment)

As described above, in the first embodiment of the present invention, when the connection state of the coils 3 is the Y connection (first connection state) and the rotation speed N of the motor 1 becomes higher than or equal to the first rotation speed (i.e., the set rotation speed N0), the motor 1 is rotated at the second rotation speed higher than the first rotation speed, and then the connection switching unit 60 switches the connection state of the coils 3 from the Y connection to the delta connection (second connection state). Thus, before the connection switching, the capacity (i.e., the heating capacity or the cooling capacity) of the air conditioner 5 can be temporarily increased. As a result, even if the rotation speed of the motor 1 is reduced and accordingly the capacity of the air conditioner 5 temporarily decreases at the time of the connection switching, decrease in comfort can be suppressed.

Further, in the first embodiment, when the connection state of the coils 3 is the Y connection and the operation frequency of the motor 1 becomes higher than or equal to the first operation frequency, the motor 1 is rotated at the second rotation speed higher than the first rotation speed (i.e., the set rotation speed N0) corresponding to the first operation frequency, and then the connection switching unit 60 switches the connection state of the coils 3 from the Y connection to the delta connection. Thus, before the connection switching, the capacity of the air conditioner 5 can be temporarily increased. As a result, even if the rotation speed of the motor 1 is reduced and accordingly the capacity of the air conditioner 5 temporarily decreases at the time of the connection switching, decrease in comfort can be suppressed.

Further, in the first embodiment, when the connection state of the coils 3 is in the Y connection and the temperature difference $\Delta T$ between the indoor temperature Ta detected by the indoor temperature sensor 54 and the set temperature Ts becomes larger than or equal to the set temperature difference $\Delta Tr$, the motor 1 is rotated at the second speed higher than the first rotation speed (i.e., the set rotation speed N0) at the time when the temperature difference $\Delta T$ becomes larger than or equal to the set temperature difference $\Delta Tr$, and then the connection switching unit 60 switches the connection state of the coils 3 from the Y connection to the delta connection. Thus, before the connection switching, the capacity of the air conditioner 5 can be temporarily increased. As a result, even if the rotation speed of the motor 1 is reduced and accordingly the capacity of the air conditioner 5 temporarily decreases at the time of the connection switching, decrease in comfort can be suppressed. In addition, since the connection state of the coils 3 is switched based on the indoor temperature Ta, it is possible to promptly cope with a rapid load change as in the case where a window of the room is opened, for example. Thus, comfort can be further enhanced.

Further, in the first embodiment, when the connection state of the coils 3 is the Y connection and the motor efficiency $E_Y$ becomes lower than the motor efficiency $E_V$ in the delta connection, the motor 1 is rotated at the second rotation speed higher than the first rotation speed (i.e., the set rotation speed N0) at the time when the motor efficiency $E_Y$ becomes lower than the motor efficiency $E_V$, and then the connection switching unit 60 switches the connection state of the coils 3 from the Y connection to the delta connection. Thus, before the connection switching, the capacity of the air conditioner 5 can be temporarily enhanced. As a result, even if the rotation speed of the motor 1 is reduced and accordingly the capacity of the air conditioner 5 temporarily decreases at the time of the connection switching, decrease in comfort can be suppressed.

Further, in the first embodiment of the present invention, when the connection state of the coils 3 is the Y connection and the inverter output voltage Vi becomes higher than or equal to the set voltage Vt, the motor 1 is rotated at the second rotation speed higher than the first rotation speed (i.e., the set rotation speed N0) at the time when the inverter output voltage Vi becomes higher than or equal to the set voltage Vt, and then the connection switching unit 60 switches the connection state of the coils 3 from the Y connection to the delta connection. Thus, before the connection switching, the capacity of the air conditioner 5 can be temporarily increased. As a result, even if the rotation speed of the motor 1 is reduced at the time of the connection switching and accordingly the capacity of the air conditioner 5 temporarily decreases, decrease in comfort can be suppressed.

Further, in the first embodiment of the present invention, when the connection state of the coils 3 is the Y connection and the inverter 103 starts the field-weakening control, the motor 1 is rotated at the second rotation speed higher than the first rotation speed (i.e., the set rotation speed N0) at the time when the field-weakening control is started, and then the connection switching unit 60 switches the connection state of the coils 3 from the Y connection to the delta connection. Thus, before the connection switching, the capacity of the air conditioner 5 can be temporarily increased. As a result, even if the rotation speed of the motor 1 is reduced and accordingly the capacity of the air conditioner 5 temporarily decreases at the time of the connection switching, decrease in comfort can be suppressed.

Further, in the first embodiment of the present invention, when the connection state of the coils 3 is the Y connection and a signal serving as a trigger for switching the connection state from the Y connection to the delta connection is received, the motor 1 is rotated at the second rotation speed higher than the first rotation speed (i.e., the set rotation speed N0) at the time when the signal serving as the trigger is received, and then the connection switching unit 60 switches the connection state of the coils 3 from the Y connection to the delta connection. Thus, before the connection switching, the capacity of the air conditioner 5 can be temporarily increased. As a result, even if the rotation speed of the motor 1 is reduced and accordingly the capacity of the air conditioner 5 temporarily decreases at the time of the connection switching, decrease in comfort can be suppressed.

Further, since the second rotation speed of the motor 1 is 1.2 times the first rotation speed, the heating capacity or the cooling capacity of the air conditioner 5 can be sufficiently increased before the connection switching of the coils 3, and thus the effect of suppressing decrease in comfort can be enhanced.

In addition, after the motor 1 is rotated at the second rotation speed, the motor 1 is rotated at the third rotation speed lower than the first rotation speed, and then the connection switching unit 60 switches the connection state of the coils 3. Thus, reliability of the connection switching operation can be ensured.

In addition, since the converter 102 changes the level of the bus voltage in accordance with switching of the connection state of the coils 3 by the connection switching unit 60, both of high motor efficiency and high motor torque can be obtained before and after the switching of the connection state.

Furthermore, since the connection state of the coils 3 is switched between the Y connection (first connection state) and the delta connection (second connection state) in which the line voltage is lower than that in the first connection state. Thus, the connection state suitable for the rotation speed of the motor 1 can be selected.

Moreover, since the connection switching unit 60 includes the semiconductor elements (semiconductor switches 61, 62, and 63), connection switching can be performed without stopping rotation of the motor 1.

SECOND EMBODIMENT

Next, a second embodiment of the present invention will be described. In the first embodiment described above, the rotation speed of the motor 1 is increased before switching from the Y connection to the delta connection. In the second embodiment, before switching from the Y connection to the delta connection, the rotation speed of the motor 1 is increased and the voltage of the converter 102 is raised.

Figure 30:
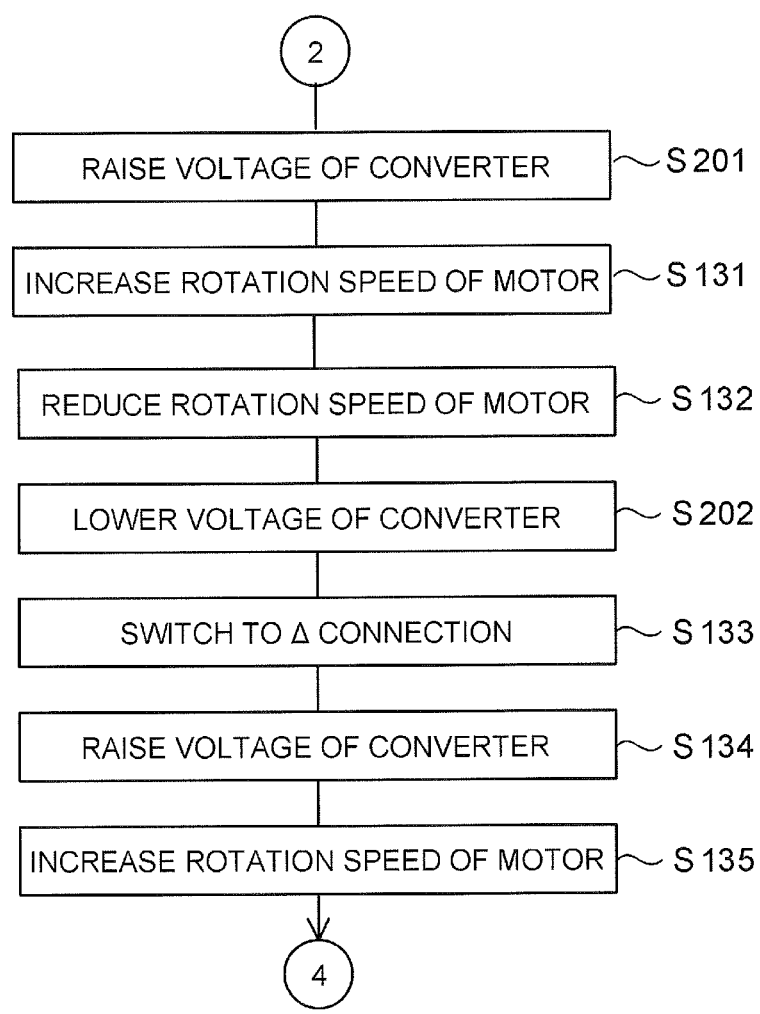
FIG. 30 is a flowchart showing a switching operation from the Y connection to the delta connection in a second embodiment.

A basic operation of the air conditioner 5 in the second embodiment is as described in the first embodiment with reference to FIG. 9. FIG. 30 is a flowchart showing a switching operation from the Y connection to the delta connection in the second embodiment, and corresponds to FIG. 11 in the first embodiment.

As shown in FIG. 30, when switching from the Y connection to the delta connection is performed, the controller 50 raises the bus voltage of the converter 102 (step S201). For example, the bus voltage supplied from the converter 102 to the inverter 103 is raised from a bus voltage (first voltage) of 280 V before the connection switching to a higher voltage of 350 V (second voltage).

Then, in a manner similar to step S131 shown in FIG. 11, the controller 50 increases the rotation speed of the motor 1 to the second rotation speed (for example, 85 rps) higher than the first rotation speed (i.e., the set rotation speed N0) that is a rotation speed immediately therebefore (step S106 shown in FIG. 9) (step S131).

Subsequently, in a manner similar to step S132 shown in FIG. 11, the controller 50 reduces the rotation speed of the motor 1 from the second rotation speed to the third rotation speed (for example, 20 rps) lower than the first rotation speed (step S132).

Then, the controller 50 lowers the bus voltage of the converter 102 (step S202). For example, the bus voltage supplied from the converter 102 to the inverter 103 is lowered from 350 V (second voltage) to 280 V (first voltage), i.e., from the voltage raised in step S201 to the voltage before the raising.

Thereafter, in a manner similar to steps S133 through S135 shown in FIG. 11, the controller 50 causes the connection switching unit 60 to performs switching from the Y connection to the delta connection, and raises the bus voltage of the converter 102 to, for example, 390 V. Then, the controller 50 increases the rotation speed of the motor 1, and returns to step S105 in FIG. 9.

The bus voltage of the converter 102 is raised to 350 V in step S201 (FIG. 30), and is raised to 390 V in step S134. However, the degree of the raising is not limited to these examples. For example, the bus voltage may be raised to the same voltage (for example, 390 V) in both steps S201 and S134.

Figure 31:
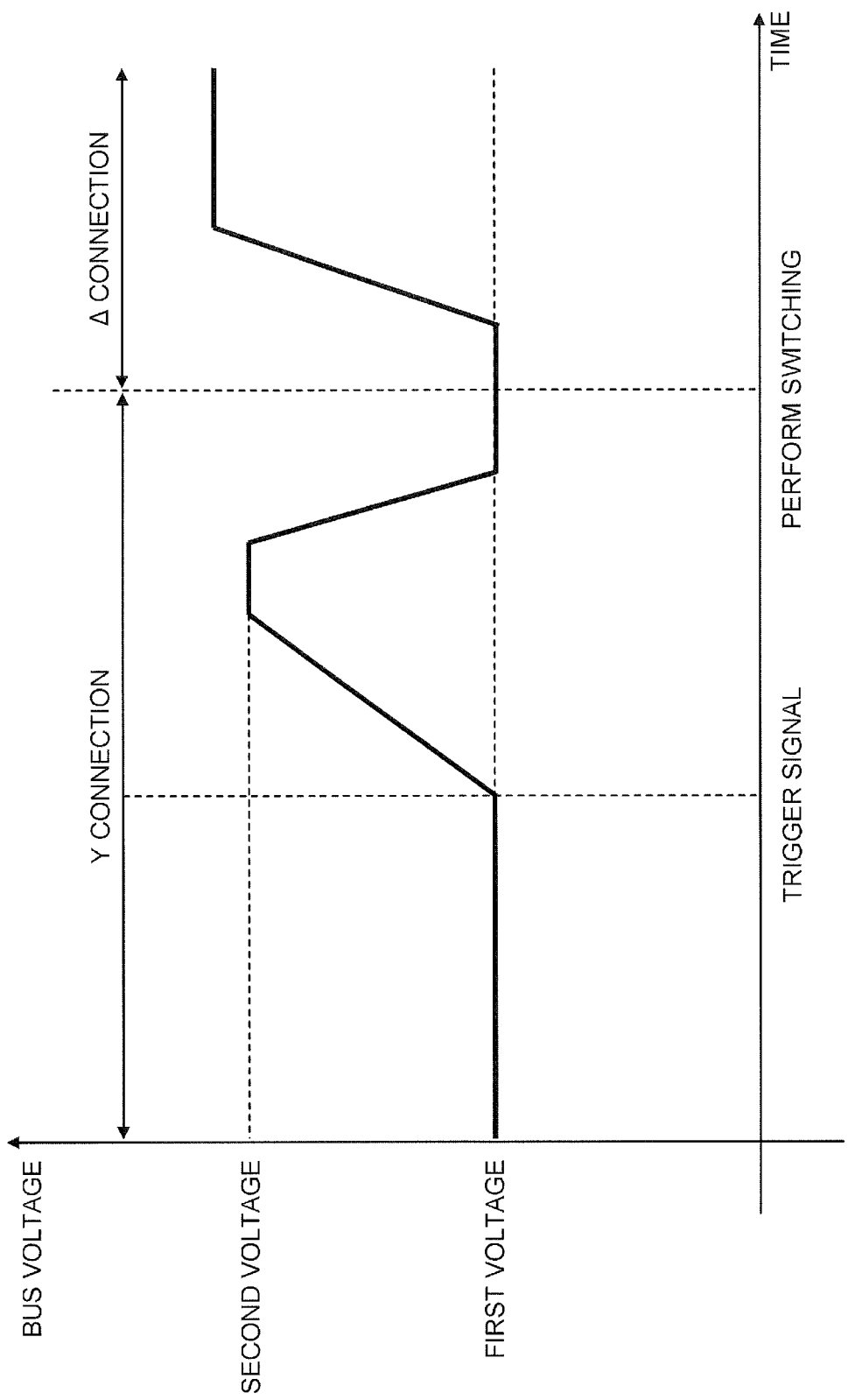
FIG. 31 is a graph showing a change in bus voltage of a converter according to the second embodiment.
Figure 32:
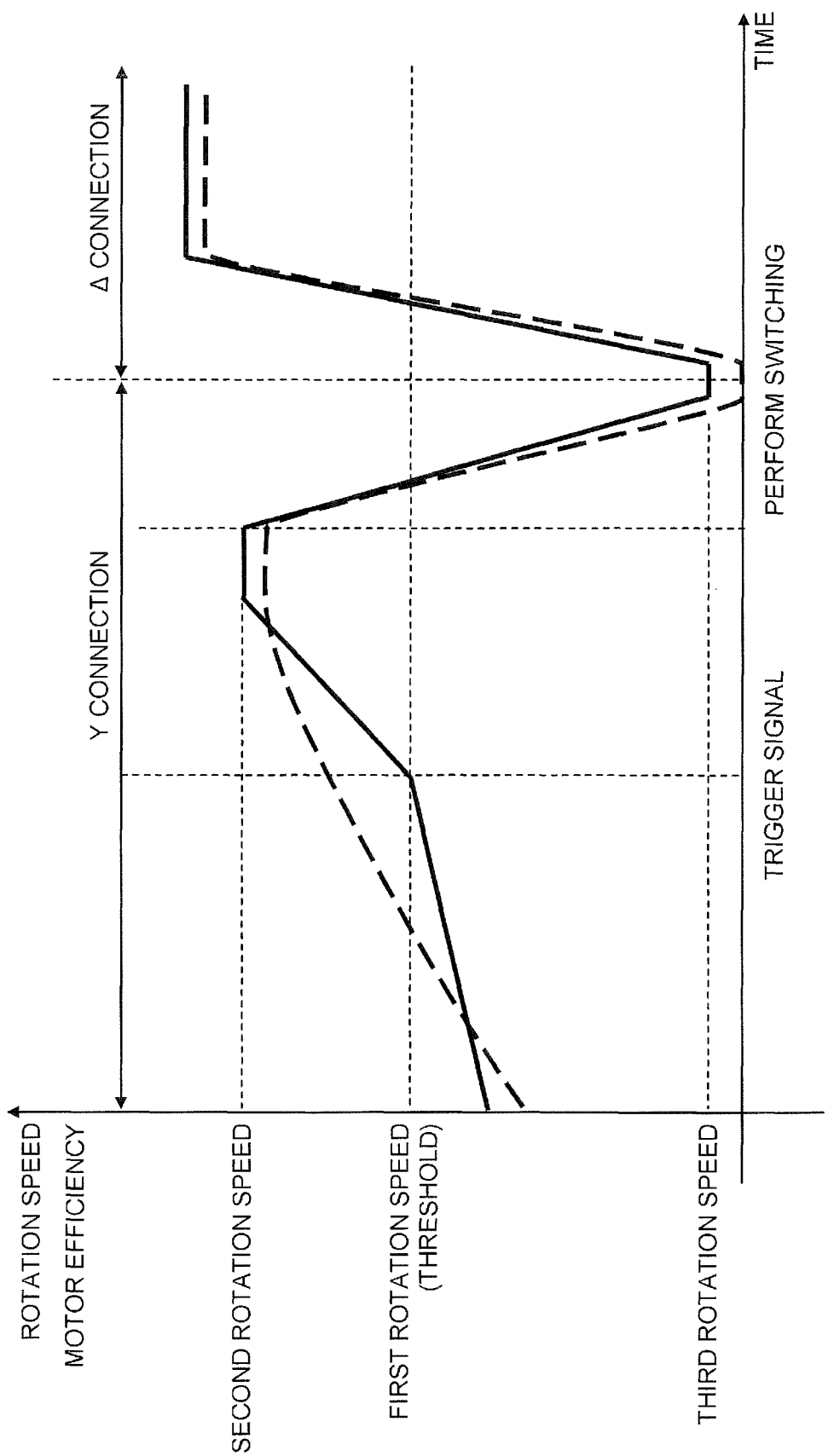
FIG. 32 is a graph showing changes in rotation speed and motor efficiency of the motor in the second embodiment.

FIG. 31 is a graph showing a change in the bus voltage output from the converter 102 to the inverter 103. The vertical axis represents the bus voltage, and the horizontal axis represents the time. FIG. 32 is a graph showing changes in the rotation speed (solid line) and the motor efficiency (broken line) of the motor 1 in a case where the rotation speed of the motor 1 is increased and the bus voltage of the converter 102 is raised before switching from the Y connection to the delta connection. The vertical axis represents the rotation speed and the motor efficiency of the motor 1, and the horizontal axis represents the time.

When the rotation speed of the motor 1 increases due to an increase in air-conditioning load, the rotation speed of the motor 1 reaches the first rotation speed (for example, 60 rps) as the set rotation speed N0. When the rotation speed of the motor 1 reaches the first rotation speed, the controller 50 raises the bus voltage of the converter 102 from the first voltage (for example, 280 V) to the second voltage (for example, 350 V) as shown in FIG. 31, and increases the rotation speed of the motor 1 to, for example, 85 rps (second rotation speed) as shown in FIG. 32.

Thereafter, the bus voltage of the converter 102 is lowered to the first bus voltage that is the voltage before the raising, and the rotation speed of the motor 1 is reduced. Then, switching from the Y connection to the delta connection is performed. The sum of a time for the speed to increase from the first rotation speed to the second rotation speed (acceleration time) and a time during which the second rotation speed is maintained is, for example, 5 to 20 minutes. After the switching to the delta connection, the bus voltage of the converter 102 is raised, and the rotation speed of the motor 1 is increased.

In the motor 1, the number of turns of the coils 3 or the like is set so that the motor efficiency in the Y connection is at the maximum at the first rotation speed (i.e., the set rotation speed N0) or a rotation speed slightly lower than the first rotation speed. That is, when the rotation speed of the motor 1 reaches the first rotation speed, the field-weakening control is started. However, since the bus voltage of the converter 102 is raised at the same time as the start of the field-weakening control, the motor efficiency does not level off but further increases. As a result, the motor efficiency can be enhanced while suppressing decrease in comfort due to the connection switching.

Configurations of the motor 1, the driving device 100, the compressor 41, and the air conditioner 5 in the second embodiment are the same as those described in the first embodiment.

The basis for the determination on whether or not to perform connection switching is not limited to the rotation speed of the motor 1 (FIG. 9), but may be the operation frequency (FIG. 9), the temperature difference $\Delta T$ (FIG. 15), the motor efficiency (FIG. 16), the inverter output voltage (FIG. 17), whether the field-weakening control starts or not (FIG. 19), or the like.

As described above, in the second embodiment of the present invention, when the connection state is switched from the Y connection (first connection state) to the delta connection (second connection state), the rotation speed of the motor 1 is increased, and the bus voltage supplied from the converter 102 to the inverter 103 is raised. Thus, even when the field-weakening control is started, decrease in the motor efficiency can be suppressed by raising the bus voltage. As a result, the motor efficiency can be enhanced while suppressing decrease in comfort due to connection switching.

THIRD EMBODIMENT

Next, a third embodiment of the present invention will be described. In the first embodiment described above, the connection switching unit 60 including the semiconductor switches 61, 62, and 63 is used. In the third embodiment, a connection switching unit 70 including switches 71, 72, and 73 each of which is constituted by a relay contact is used.

FIG. 33 is a block diagram illustrating a configuration of a driving device 100A according to the third embodiment. The driving device 100A is different from the driving device 100 illustrated in FIG. 6 in the configuration of the connection switching unit 70.

The connection switching unit 70 includes the switches 71, 72, and 73 each of which is constituted by a relay contact. The switch 71 connects the terminal 32U of the coil 3U to one of the wire 105 and the neutral point 33. The switch 72 connects the terminal 32V of the coil 3V to one of the wire 106 and the neutral point 33. The switch 73 connects the terminal 32W of the coil 3W to one of the wire 104 and the neutral point 33.

In the state shown in FIG. 33, the switch 71 connects the terminal 32U of the coil 3U to the neutral point 33, the switch 72 connects the terminal 32V of the coil 3V to the neutral point 33, and the switch 73 connects the terminal 32W of the coil 3W to the neutral point 33. That is, the terminals 31U, 31V, and 31W of the coils 3U, 3V, and 3W are connected to the inverter 103, and the terminals 32U, 32V, and 32W are connected to the neutral point 33. In this case, the connection state of the coils 3U, 3V, and 3W is the Y connection shown in FIG. 7(A).

Figure 34:
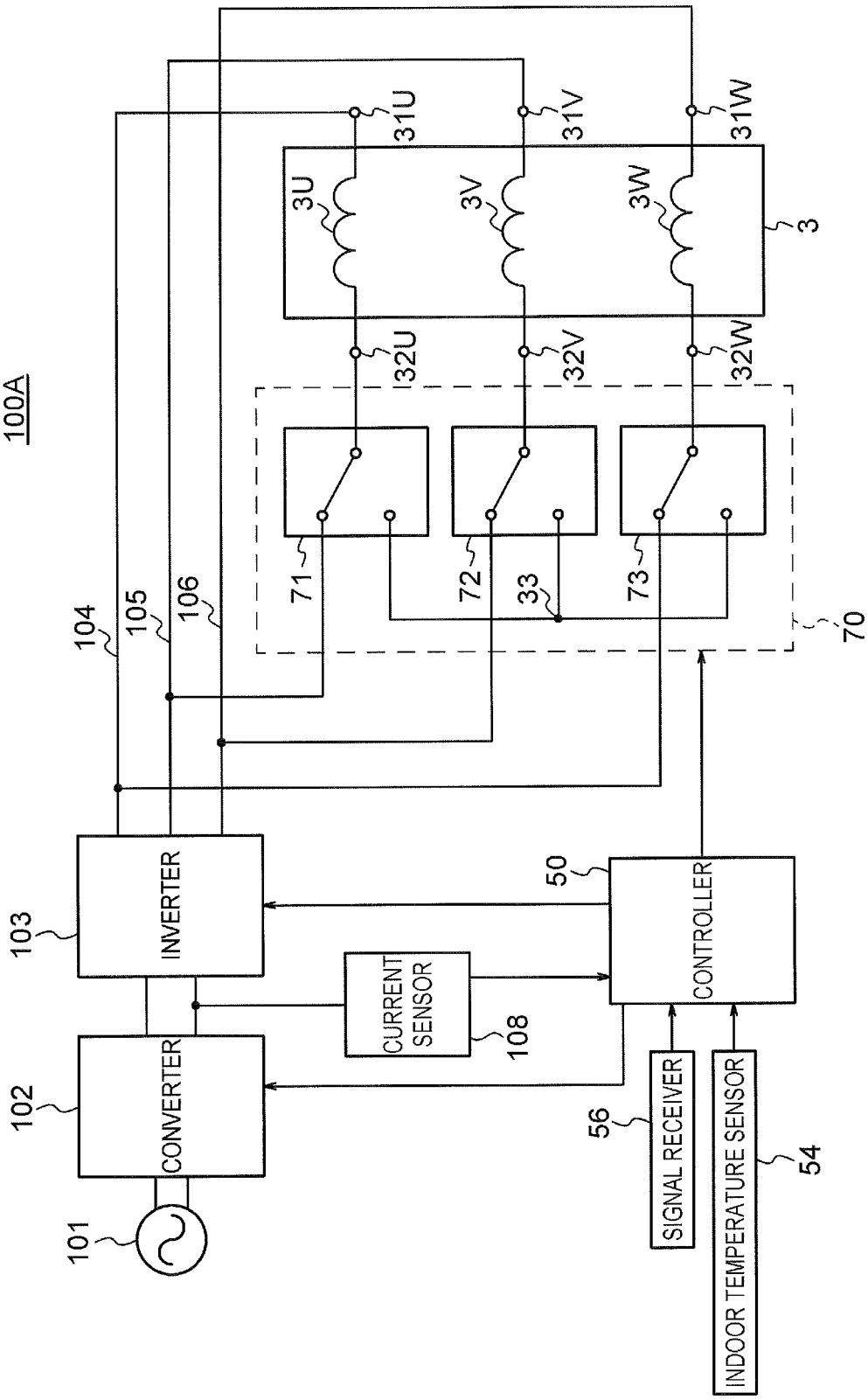
FIG. 34 is a block diagram illustrating a configuration of the driving device according to the third embodiment.

FIG. 34 is a block diagram illustrating a state where the switches 71, 72, and 73 of the connection switching unit 70 in the driving device 100A are switched. In the state shown in FIG. 34, the switch 71 connects the terminal 32U of the coil 3U to the wire 105, the switch 72 connects the terminal 32V of the coil 3V to the wire 106, and the switch 73 connects the terminal 32W of the coil 3W to the wire 104. In this case, the connection state of the coils 3U, 3V, and 3W is the delta connection shown in FIG. 7(B).

Configurations of the motor 1, the driving device 100, the compressor 41, and the air conditioner 5 in the third embodiment are the same as those described in the first embodiment, except for the connection switching unit 70.

In the first embodiment described above, connection switching is performed after the rotation speed of the motor 1 is reduced to the third rotation speed (for example, 20 rps). In the third embodiment, since the connection switching unit 70 includes the relay contacts (switches 71, 72, and 73), connection switching is preferably performed after rotation of the motor 1 is stopped.

FIG. 35 is a flowchart showing a switching operation from the Y connection to the delta connection in the third embodiment, and corresponds to FIG. 11 in the first embodiment.

As shown in FIG. 35, in the case of the switching from the Y connection to the delta connection, the controller 50 increases the rotation speed of the motor 1 to the second rotation speed (for example, 85 rps) higher than the first rotation speed (i.e., the set rotation speed N0) (step S131) in a manner similar to step S131 shown in FIG. 11.

Subsequently, the controller 50 reduces the rotation speed of the motor 1 to zero (step S132A). That is, rotation of the motor 1 is stopped. In a state where rotation of the motor 1 is stopped, the controller 50 performs switching from the Y connection to the delta connection by the connection switching unit 70 (step S133).

Since rotation of the motor 1 is stopped, reliability of operation of the connection switching unit 70 using the relay contacts (switches 71, 72, and 73) can be obtained.

Thereafter, in a manner similar to steps S134 through S135 shown in FIG. 11, the controller 50 raises the bus voltage of the converter 102 to, for example, 390 V, and then increases the rotation speed of the motor 1. Then, the process returns to step S105 in FIG. 9.

FIG. 36 is a graph showing a change in the rotation speed of the motor 1 in the case of the switching from the Y connection to the delta connection. The vertical axis represents the rotation speed of the motor 1, and the horizontal axis represents the time.

When the rotation speed of the motor 1 reaches the first rotation speed (for example, 60 rps) as the set rotation speed N0, the controller 50 increases the rotation speed of the motor 1 to the second rotation speed (for example, 85 rps). Thereafter, the controller 50 reduces the rotation speed of the motor 1 and stops rotation of the motor 1. After rotation of the motor 1 is stopped, the switching from the Y connection to the delta connection is performed. After the switching to the delta connection, the rotation speed of the motor 1 is increased as in the first embodiment.

In this example, rotation of the motor 1 is stopped before switching from the Y connection to the delta connection (step S132A in FIG. 35). It is preferable to also stop rotation of the motor 1 before switching from the delta connection to the Y connection (step S121 in FIG. 10).

As described above, in the third embodiment of the present invention, rotation of the motor 1 is stopped before connection switching. Thus, even when the connection switching unit 70 has the relay contacts (switches 71, 72, and 73), reliability of the connection switching unit 70 can be obtained.

In the configuration in which the connection switching unit 60 has the semiconductor switches 61, 62, and 63 as in the first embodiment, rotation of the motor 1 may be stopped before connection switching as in the third embodiment. In the configuration of the second embodiment, rotation of the motor 1 may be stopped before connection switching as in the third embodiment.

FOURTH EMBODIMENT

Next, fourth embodiment will be described. In the first embodiment described above, the connection state of the coils 3 is switched between the Y connection and the delta connection. However, the connection state of the coils 3 may be switched between a series connection and a parallel connection.

Figure 37A:
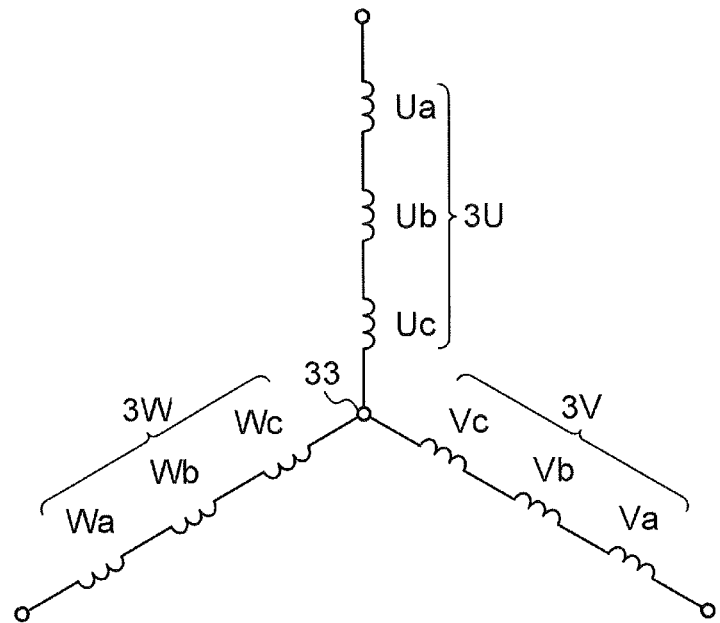
FIGS. 37(A) and 37(B) are schematic diagrams for illustrating a switching operation of a connection state of coils according to a fourth embodiment.
Figure 37B:
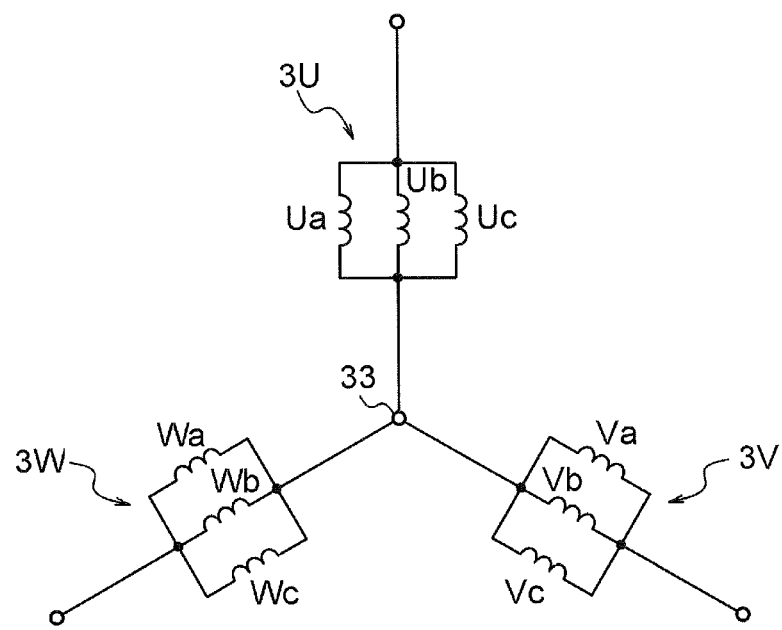

FIGS. 37(A) and 37(B) are schematic diagrams for describing switching of the connection state of the coils 3 according to the fourth embodiment. In FIG. 37(A), the three-phase coils 3U, 3V, and 3W are connected in the Y connection. Further, the coil portions Ua, Ub, and Uc of the coil 3U are connected in series, the coil portions Va, Vb, and Vc of the coil 3V are connected in series, and the coil portions Wa, Wb, and Wc of the coil 3W are connected in series. That is, the coil portions of each phase of the coils 3 are connected in series.

In contrast, in FIG. 37(B), the three-phase coils 3U, 3V, and 3W are connected in the Y connection, but the coil portions Ua, Ub, and Uc of the coil 3U are connected in parallel, the coil portion Va, Vb, and Vc of the coil 3V are connected in parallel, and the coil portions Wa, Wb, and Wc of the coil 3W are connected in parallel. That is, the coil portions of each phase of the coils 3 are connected in parallel. Switching of the connection state of the coils 3 as illustrated in FIGS. 37(A) and 37(B) can be achieved by, for example, providing each of the coil portions of the coils 3U, 3V, and 3W with a selector switch.

Suppose that the number of coil portions (i.e., the number of rows) connected in parallel in each phase is n, the line voltage decreases to 1/n times by switching from the series connection (FIG. 37(A)) to the parallel connection (FIG. 37(B)). Thus, by switching the connection state of the coils 3 from the series connection to the parallel connection when the line voltage approaches the inverter maximum output voltage, the degree of field-weakening can be reduced (i.e., weakening current can be reduced).

In a case where there are two load conditions for which performance is to be improved and the rotation speed N1 at the low-speed side and the rotation speed N2 at the high-speed side satisfy (N2/N1)>n, the line voltage becomes higher than the inverter maximum output voltage even when the connection state of the coils 3 is switched from the series connection to the parallel connection, and thus the field-weakening control is necessary.

Thus, the bus voltage of the converter 102 is raised at the same time as when the connection state of the coils 3 is switched from the series connection to the parallel connection. It is sufficient that the raised bus voltage V2 satisfies the relationship of V2≥(V1/n)×N2/N1 with respect to the bus voltage V1 before the raising. Accordingly, high motor efficiency and high motor torque can be obtained in both of the rotation speed range including the rotation speed N1 and the rotation speed range including the rotation speed N2.

Figure 38A:
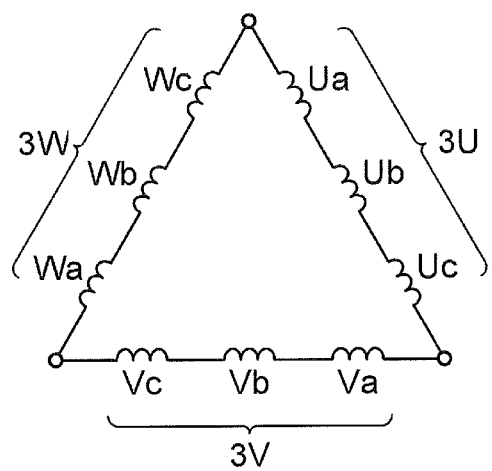
FIGS. 38(A) and 38(B) are schematic diagrams for illustrating another example of the switching operation of the connection state of the coils according to the fourth embodiment.
Figure 38B:
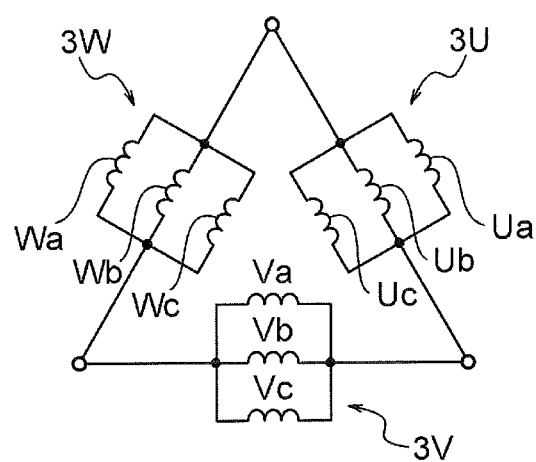

FIGS. 38(A) and 38(B) are schematic diagrams for describing another configuration example of the fourth embodiment. In FIG. 38(A), the three-phase coils 3U, 3V, and 3W are connected in the delta connection. Further, the coil portions Ua, Ub, and Uc of the coil 3U are connected in series, the coil portions Va, Vb, and Vc of the coil 3V are connected in series, and the coil portions Wa, Wb, and Wc of the coil 3W are connected in series. That is, the coil portions of each phase of the coils 3 are connected in series.

In contrast, in FIG. 38(B), the three-phase coils 3U, 3V, and 3W are connected in the delta connection, but the coil portions Ua, Ub, and Uc of the coil 3U are connected in parallel, the coil portions Va, Vb, and Vc of the coil 3V are connected in parallel, and the coil portions Wa, Wb, and Wc of the coil 3W are connected in parallel. That is, the coil portions of each phase of the coils 3 are connected in parallel.

In this case, similarly to the examples illustrated in FIGS. 37(A) and 37(B), when the low-speed side rotation speed N1 and the high-speed side rotation speed N2 of the two load conditions for which performance is to be improved satisfy (N2/N1)>n, the connection state of the coils 3 is switched from the series connection (FIG. 38(A)) to the parallel connection (FIG. 38(B)), and at the same time, the bus voltage of the converter 102 is raised. It is sufficient that the raised bus voltage V2 satisfies V2≥(V1/n)×N2/N1 in relation to the bus voltage V1 before the raising. The other operations and configurations in the fourth embodiment are similar to those in the first embodiment.

As described above, in the fourth embodiment, the connection state of the converter 102 is switched between the series connection and the parallel connection, and therefore the degree of field-weakening can be reduced and the motor efficiency can be increased. Further, the bus voltages V1 and V2 and the rotation speeds N1 and N2 satisfy V2≥(V1/n)× N2/N1, and therefore high motor efficiency and high motor torque can be obtained at the rotation speeds N1 and N2.

In the first, second and third embodiments, switching between the series connection (first connection state) and the parallel connection (second connection state) may be performed as in the fourth embodiment.

Although the rotary compressor 8 has been described as an example of the compressor, the motor of each of the embodiment may be applied to a compressor other than the rotary compressor 8. The motor 1 is not necessarily incorporated in the compressor (rotary compressor 8), and may be independent from the compressor. That is, it is sufficient that the motor 1 drives the compressor.

Although the preferred embodiments of the present invention have been specifically described above, the present invention is not limited to the above-described embodiments, and various modifications or variations may be made without departing from the gist of the present invention.

What is claimed is:

1. A driving device to drive a motor having coils, the driving device comprising:

a connection switching device to switch a connection state of the coils between a first connection state and a second connection state in which a line voltage is lower than in the first connection state;

a controller to control the motor and the connection switching device; and a rotation speed detector to detect a rotation speed of the motor, wherein when the connection state of the coils is the first connection state and the rotation speed detected by the rotation speed detector becomes higher than or equal to a first rotation speed, the controller causes the motor to rotate at a second rotation speed higher than the first rotation speed, and then causes the connection switching device to switch the connection state of the coils from the first connection state to the second connection state.

2. The driving device according to claim 1, wherein the second rotation speed is higher than or equal to 1.2 times the first rotation speed.

3. The driving device according to claim 1, wherein, after the controller causes the motor to rotate at the second rotation speed, the controller causes the motor to rotate at a third rotation speed lower than the first rotation speed, and then causes the connection switching device to switch the connection state of the coils from the first connection state to the second connection state.

4. The driving device according to claim 1, wherein, after the controller causes the motor to rotate at the second rotation speed, the controller stops the motor, and then causes the connection switching device to switch the connection state of the coils from the first connection state to the second connection state.

5. The driving device according to claim 1, further comprising:

a converter to generate a bus voltage; and an inverter to convert the bus voltage and output the converted voltage to the coils, wherein when the controller causes the motor to rotate at the second rotation speed, the controller makes the bus voltage generated by the converter higher than the bus voltage when the controller causes the motor to rotate at the first rotation speed.

6. The driving device according to claim 1, wherein the coils are three-phase coils, wherein the first connection state is a state where the three-phase coils are connected in a Y connection, and wherein the second connection state is a state where the three-phase coils are connected in a delta connection.

7. The driving device according to claim 1, wherein the coils are three-phase coils connected in a Y connection or a delta connection, wherein the first connection state is a state where the three-phase coils are connected in series for each phase, and wherein the second connection state is a state where the three-phase coils are connected in parallel for each phase.

8. The driving device according to claim 1, wherein the connection switching device has a relay contact.

9. The driving device according to claim 1, wherein the connection switching device has a semiconductor element.

10. An air conditioner comprising:

a motor having coils;

a compressor driven by the motor, and the driving device according to claim 1, the driving device driving the motor.

11. A driving device to drive a motor having coils, the driving device comprising:
a connection switching device to switch a connection state of the coils between a first connection state and a second connection state in which a line voltage is lower than in the first connection state;
a controller to control the motor and the connection switching device; and
an operation frequency acquiring device to acquire an operation frequency of the motor,
wherein when the connection state of the coils is the first connection state and the operation frequency acquired by the operation frequency acquiring device becomes higher than or equal to a first operation frequency, the controller causes the motor to rotate at a second rotation speed higher than a first rotation speed corresponding to the first operation frequency, and then causes the connection switching device to switch the connection state of the coils from the first connection state to the second connection state.

12. A driving device to drive a motor having coils, the driving device comprising:
a connection switching device to switch a connection state of the coils between a first connection state and a second connection state in which a line voltage is lower than in the first connection state;
a controller to control the motor and the connection switching device; and
a temperature sensor to detect an indoor temperature,
wherein when the connection state of the coils is the first connection state and a temperature difference between the indoor temperature detected by the temperature sensor and a set temperature becomes larger than or equal to a set temperature difference, the controller causes the motor to rotate at a second rotation speed higher than a first rotation speed at a time when the temperature difference becomes larger than or equal to the set temperature difference, and then causes the connection switching device to switch the connection state of the coils from the first connection state to the second connection state.

13. A driving device to drive a motor having coils, the driving device comprising:
a connection switching device to switch a connection state of the coils between a first connection state and a second connection state in which a line voltage is lower than in the first connection state; and
a controller to control the motor and the connection switching device,
wherein when the connection state of the coils is the first connection state and a motor efficiency in the first connection state becomes lower than a motor efficiency in the second connection state, the controller causes the motor to rotate at a second rotation speed higher than a first rotation speed at a time when the motor efficiency in the first connection state becomes lower than the motor efficiency in the second connection state, and then causes the connection switching device to switch the connection state of the coils from the first connection state to the second connection state.

14. A driving device to drive a motor having coils, the driving device comprising:
an inverter to output a voltage to the coils to thereby control rotation of the motor;
a connection switching device to switch a connection state of the coils between a first connection state and a second connection state in which a line voltage is lower than in the first connection state; and
a controller to control the inverter and the connection switching device,
wherein when the connection state of the coils is the first connection state and an output voltage of the inverter becomes higher than or equal to a set voltage, the controller causes the inverter to rotate the motor at a second rotation speed higher than a first rotation speed at a time when the output voltage of the inverter becomes higher than or equal to the set voltage, and then causes the connection switching device to switch the connection state of the coils from the first connection state to the second connection state.

15. The driving device according to claim 14, further comprising a converter to generate a bus voltage and supply the bus voltage to the inverter,
wherein when the controller causes the motor to rotate at the second rotation speed, the controller makes the bus voltage generated by the converter higher than a bus voltage when the controller causes the motor to rotate at the first rotation speed.

16. A driving device to drive a motor having coils, the driving device comprising:
an inverter to output a voltage to the coils to thereby control rotation of the motor, the inverter performing field-weakening control in accordance with a rotation speed of the motor;
a connection switching device to switch a connection state of the coils between a first connection state and a second connection state in which a line voltage is lower than in the first connection state; and
a controller to control the inverter and the connection switching device,
wherein when the connection state of the coils is the first connection state and the inverter starts the field-weakening control, the controller causes the inverter to rotate the motor at a second rotation speed higher than a first rotation speed at a time when the field-weakening control is started, and then causes the connection switching device to switch the connection state of the coils from the first connection state to the second connection state.

17. A driving device to drive a motor having coils, the driving device comprising:
a connection switching device to switch a connection state of the coils between a first connection state and a second connection state in which a line voltage is lower than in the first connection state; and
a controller to control the motor and the connection switching device,
wherein when the connection state of the coils is the first connection state and the controller receives a signal as a trigger to switch the connection state of the coils to the second connection state, the controller causes the motor to rotate at a second rotation speed higher than a first rotation speed at a time when the signal is received, and then causes the connection switching device to switch the connection state of the coils from the first connection state to the second connection state.

* * * * *